(12) United States Patent
Wilkins

(10) Patent No.: US 9,341,110 B2
(45) Date of Patent: May 17, 2016

(54) INTERNAL COMBUSTION ENGINE WITH IMPROVED FUEL EFFICIENCY AND/OR POWER OUTPUT

(75) Inventor: Larry C. Wilkins, Ft. Lauderdale, FL (US)

(73) Assignee: WILKINS IP, LLC, New Albany, IN (US)

( * ) Notice: Subject to any disclaimer, the term of this patent is extended or adjusted under 35 U.S.C. 154(b) by 2006 days.

(21) Appl. No.: 12/406,417

(22) Filed: Mar. 18, 2009

(65) Prior Publication Data

US 2010/0012095 A1    Jan. 21, 2010

Related U.S. Application Data

(60) Provisional application No. 61/193,410, filed on Nov. 26, 2008, provisional application No. 61/081,074, filed on Jul. 16, 2008.

(51) Int. Cl.
*F02B 75/04* (2006.01)
*F02B 41/04* (2006.01)

(52) U.S. Cl.
CPC ............... *F02B 41/04* (2013.01); *F02B 75/045* (2013.01); *Y02T 10/14* (2013.01)

(58) Field of Classification Search
CPC ...... F02B 75/045; F02B 75/32; F02B 75/048; F02B 75/044
USPC ....... 123/48 B, 48 R, 48 A, 78 R, 78 A, 78 B, 123/78 BA, 78 F
See application file for complete search history.

(56) References Cited

U.S. PATENT DOCUMENTS

| 266,980 | A | * | 11/1882 | Easton .............................. 124/7 |
| 1,574,573 | A | | 2/1926 | Hale |

(Continued)

FOREIGN PATENT DOCUMENTS

| DE | 103 09 650 A1 | 9/2004 |
| WO | WO 88/07620 A1 | 10/1988 |

(Continued)

OTHER PUBLICATIONS

International Search Report issued Sep. 30, 2009 for corresponding PCT Application No. PCT/US2009/050493.

(Continued)

*Primary Examiner* — Lindsay Low
*Assistant Examiner* — Long T Tran
(74) *Attorney, Agent, or Firm* — Finnegan, Henderson, Farabow, Garrett & Dunner, L.L.P.

(57) ABSTRACT

An internal combustion engine may include a bushing defining an external circumferential diameter and an aperture defining an internal circumferential diameter. A center defined by the external circumferential diameter and a center defined by the internal circumferential diameter are offset with respect to one another. The internal circumferential diameter is operably coupled to a crankpin, and the external circumferential diameter is operably coupled to a connecting rod, thereby operably coupling the connecting rod to the crankpin. The engine may further include a bushing control assembly, wherein the bushing control assembly is configured to delay initiation of a power stroke of the engine until a crankshaft of the engine has rotated at least about 15 degrees beyond a first stroke termination angle of a compression stroke of the engine.

55 Claims, 81 Drawing Sheets

(56) References Cited

U.S. PATENT DOCUMENTS

| | | | |
|---|---|---|---|
| 1,875,180 A | | 8/1932 | Rider |
| 1,926,077 A | * | 9/1933 | Winslow .................... 123/79 R |
| 2,669,980 A | * | 2/1954 | Yarrington ................. 123/73 A |
| 3,656,412 A | * | 4/1972 | Wilson ............................. 92/82 |
| 4,085,628 A | | 4/1978 | McWhorter |
| 4,152,955 A | | 5/1979 | McWhorter |
| 4,301,695 A | | 11/1981 | Reiher |
| 4,887,560 A | * | 12/1989 | Heniges ...................... 123/78 F |
| 5,261,359 A | * | 11/1993 | Hull ............................ 123/65 V |
| 5,711,267 A | | 1/1998 | Williams |
| 5,979,375 A | | 11/1999 | Ballardini |
| 6,202,622 B1 | | 3/2001 | Raquiza, Jr. |
| 6,349,684 B1 | | 2/2002 | de Gooijer |
| 6,510,831 B2 | | 1/2003 | Wiseman |
| 6,581,552 B2 | | 6/2003 | Kreuter |
| 6,701,885 B2 | * | 3/2004 | Klomp et al. ............. 123/197.4 |
| 6,729,423 B2 | * | 5/2004 | Kobayashi et al. ........ 180/65.21 |
| 7,028,647 B2 | | 4/2006 | Styron |
| 7,178,497 B2 | * | 2/2007 | Berger et al. .............. 123/192.1 |
| 2004/0021320 A1 | * | 2/2004 | Yamada et al. ................ 290/1 B |
| 2008/0115769 A1 | | 5/2008 | Mason |
| 2008/0184966 A1 | | 8/2008 | Marchisseau |
| 2009/0272259 A1 | * | 11/2009 | Cook et al. ...................... 92/140 |

FOREIGN PATENT DOCUMENTS

| | | |
|---|---|---|
| WO | WO 00/08325 A1 | 2/2000 |
| WO | WO 2004/053345 A1 | 6/2004 |

OTHER PUBLICATIONS

Written Opinion issued Sep. 30, 2009 for corresponding PCT Application No. PCT/US2009/050493.
Co-pending U.S. Appl. No. 12/850,674, filed Aug. 5, 2010.
Co-pending U.S. Appl. No. 13/049,396, filed Mar. 16, 2011.
Co-pending U.S. Appl. No. 13/187,947, filed Jul. 21, 2011.

* cited by examiner crankshaft - zero degrees crankshaft - 8 degrees crankshaft - 20 degrees crankshaft - 28 degrees crankshaft - 40 degrees crankshaft - 48 degrees crankshaft - 60 degrees crankshaft - 100 degrees

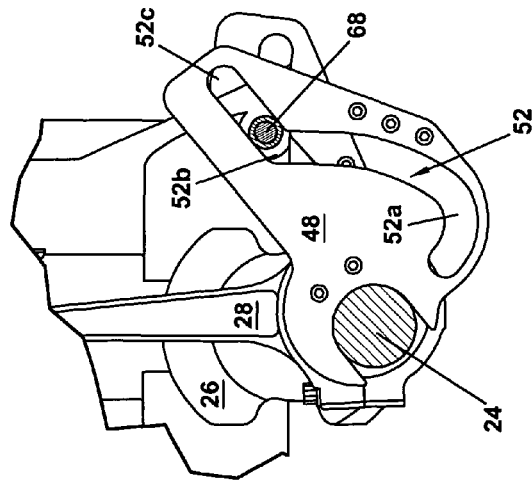
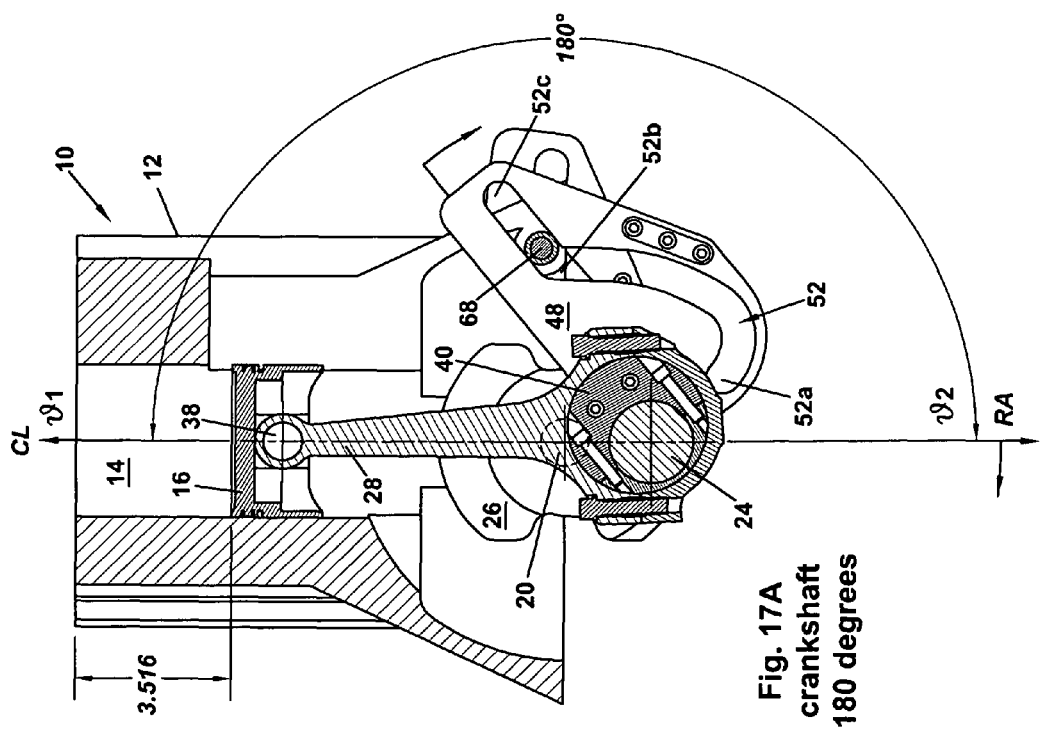
Fig. 17B
Fig. 17A
crankshaft
180 degrees crankshaft - 225 degrees crankshaft
270 degrees

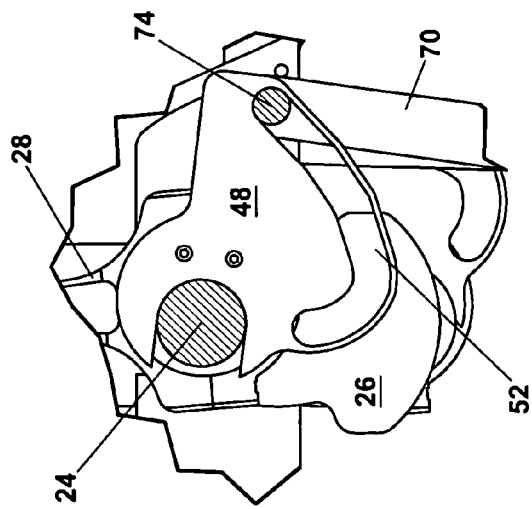
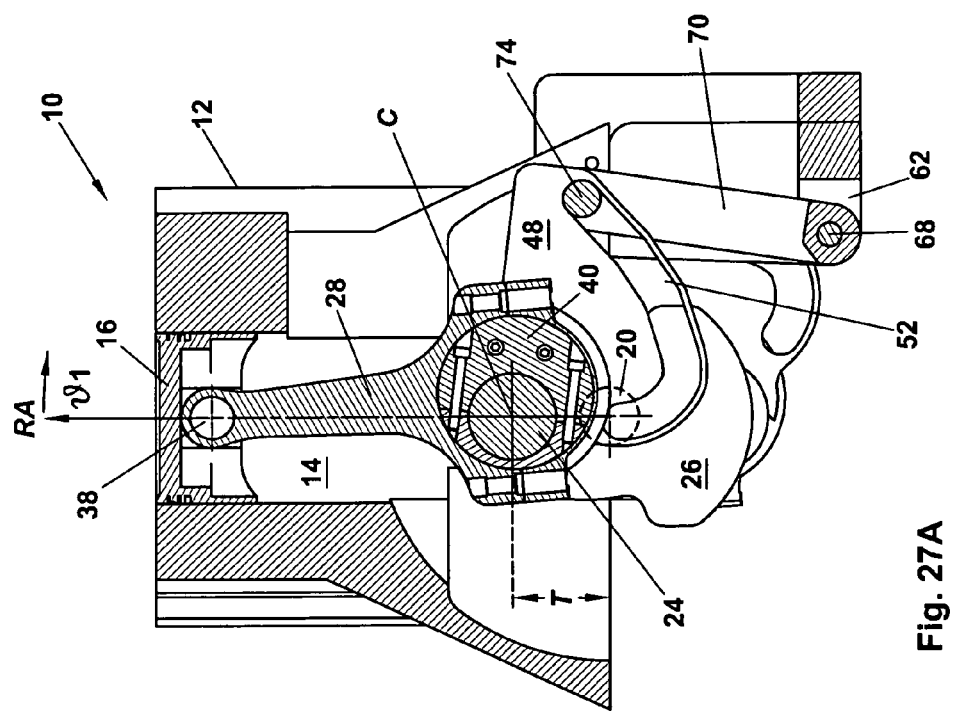
Fig. 27B
Fig. 27A
crankshaft - zero degrees crankshaft - 8 degrees crankshaft - 20 degrees crankshaft - 28 degrees crankshaft - 40 degrees crankshaft - 48 degrees crankshaft - 60 degrees crankshaft - 100 degrees crankshaft - 180 degrees crankshaft - 225 degrees crankshaft - 270 degrees crankshaft - 8 deg.

crankshaft - 20 deg.

crankshaft - 28 deg.

crankshaft - 40 deg.

crankshaft - 48 deg.

crankshaft - 60 deg.

Fig. 52 crankshaft - 90 deg.

crankshaft - 120 deg.

Fig. 54A crankshaft - 180 deg.

crankshaft - 270 deg.

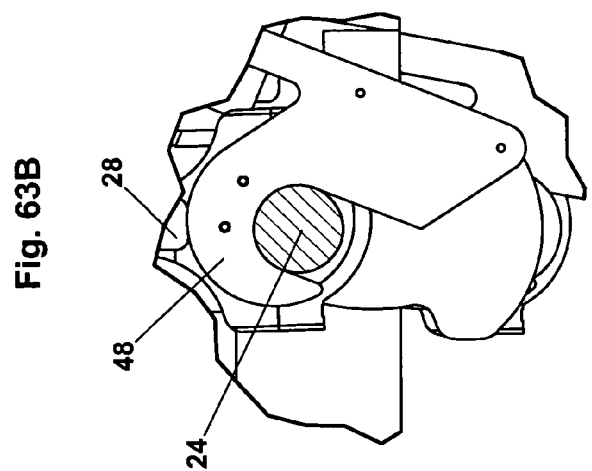
Fig. 63B
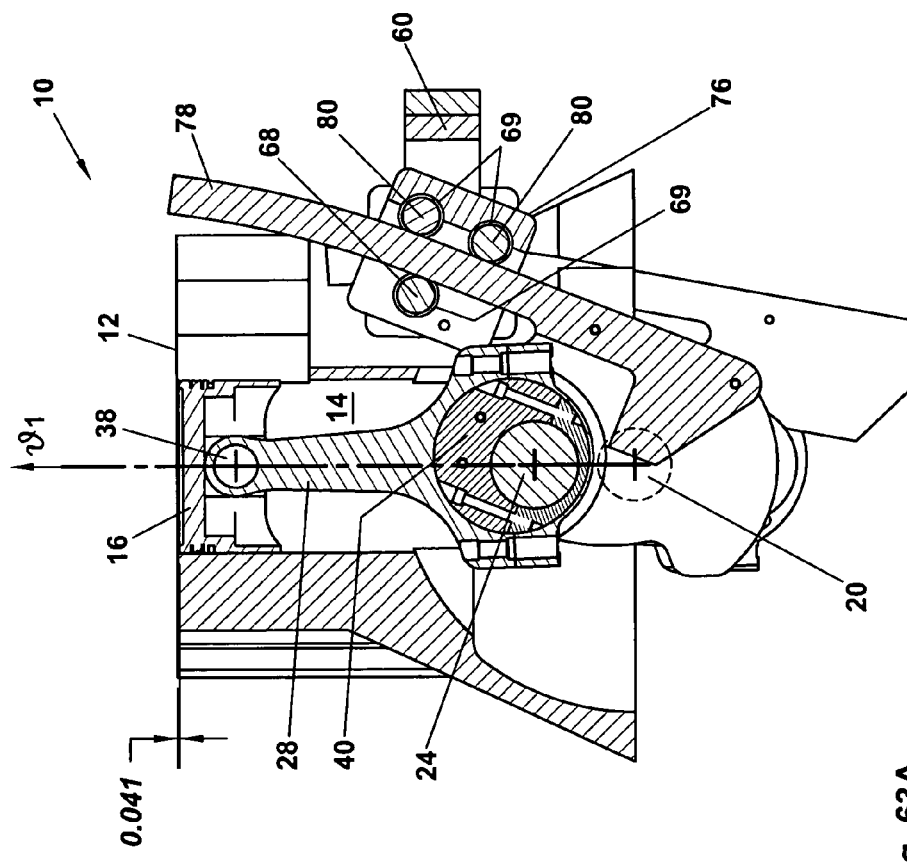
Fig. 63A crankshaft zero degrees crankshaft - 30 deg.

crankshaft - 60 deg.

crankshaft - 120 deg.

Fig. 67A crankshaft - 180 deg.

crankshaft - 240 deg.

crankshaft - 360 deg.

Fig. 77A crankshaft zero degrees

Fig. 78A crankshaft 40 degrees

Fig. 79A crankshaft 60 degrees crankshaft
100 degrees crankshaft
180 degrees

INTERNAL COMBUSTION ENGINE WITH IMPROVED FUEL EFFICIENCY AND/OR POWER OUTPUT

RELATED APPLICATIONS

This application claims the benefit of priority under 35 U.S.C. §119(e) of U.S. Provisional Application No. 61/193,410, filed Nov. 26, 2008, and U.S. Provisional Application No. 61/081,074, filed Jul. 16, 2008, the disclosures of which are incorporated herein by reference.

FIELD OF THE DISCLOSURE

The present disclosure relates to internal combustion engines. In particular, the present disclosure relates to internal combustion engines with improved fuel efficiency and/or power output.

BACKGROUND

High fuel costs and a desire to reduce undesirable emissions associated with operation of internal combustion engines has renewed interest in improving fuel efficiency during operation. Thus, it may be desirable to improve the efficiency of conventional internal combustion engines.

A conventional internal combustion engine includes a cylinder block defining journals for receiving a crankshaft and one or more cylinders housing a piston that is operably coupled to the crankshaft at a crankpin via a connecting rod. During conventional operation, the piston reciprocates within the cylinder, such that during a power stroke of the internal combustion engine, combustion of an air/fuel mixture within a combustion chamber defined by the piston and the cylinder forces the piston toward the crankshaft. As the piston travels toward the crankshaft, the crankshaft is rotated via the connecting rod and crankpin, thereby converting the potential energy associated with the air/fuel mixture into mechanical work.

Due to the architecture of a conventional internal combustion engine, when the piston is at a position within the cylinder that coincides with the maximum compression (i.e., the combustion chamber is at its lowest volume when the piston is farthest from the crankshaft), the axis of the connecting rod and the axis of the crankpin tend to be nearly co-linear, if not co-linear. At these relative positions, as the piston first begins its movement toward the crankshaft during the power stroke, there is only a very short moment arm (if any) created between the axis of the connecting rod and the axis of the crankpin. As a result, the force initially created by the air/fuel mixture at the moment of combustion does not transfer as much torque to the crankshaft as it would if the length of the moment arm were greater. This situation may be particularly undesirable because during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connection rod and the axis of the crankpin during the time of maximum force on the piston, efficiency of the work generated from the combustion process may be less than desired.

Thus, it may be desirable to provide an internal combustion engine with a configuration that improves the efficiency of the internal combustion engine during operation. Further, it may be desirable to provide an internal combustion engine with a configuration that permits tailoring of desired performance characteristics.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to an internal combustion engine. The internal combustion engine may include a cylinder block defining a cylinder, the cylinder defining a longitudinal axis. The internal combustion engine may further include a crankshaft defining a crankpin, wherein the crankshaft is rotatably received by the cylinder block and rotates along a longitudinal axis, wherein the crankpin defines a longitudinal axis parallel to and offset by a distance with respect to the longitudinal axis along which the crankshaft rotates. A line extending between the longitudinal axis along which the crankshaft rotates and the longitudinal axis of the crankpin defines a radial axis of the crankshaft. The internal combustion engine may further include a connecting rod defining a first end, a second end, and a longitudinal axis extending between the first and second ends. The first end of the connecting rod defines an aperture operably coupled to the crankpin. The internal combustion engine may also include a piston operably coupled to the second end of the connecting rod. The internal combustion may further include a bushing defining an external circumferential diameter and an aperture defining an internal circumferential diameter. A center defined by the external circumferential diameter and a center defined by the internal circumferential diameter are offset with respect to one another. The internal circumferential diameter is operably coupled to the crankpin and the external circumferential diameter is operably coupled to the aperture defined by the connecting rod, thereby operably coupling the connecting rod to the crankpin. The internal combustion engine may further include a bushing control assembly operably coupled to the bushing and configured to control oscillation of the bushing with respect to the aperture of the connecting rod. Rotation of the crankshaft results in reciprocating movement of the piston via the connecting rod within the cylinder, the reciprocating movement defining a compression stroke terminating when the radial axis of the crankshaft is substantially aligned with the longitudinal axis defined by the cylinder at a first stroke termination angle and the crankpin is located proximate the cylinder with respect to the longitudinal axis defined by the crankshaft. The reciprocating movement may further define a power stroke that terminates when the radial axis of the crankshaft is substantially aligned with the longitudinal axis defined by the cylinder at a second stroke termination angle and the crankpin is located distal the cylinder with respect to the longitudinal axis defined by the crankshaft. The bushing control assembly may include a bushing control plate defining an elongated profile having a shape, and a bushing control rod configured to follow the elongated profile, such that oscillation of the bushing is controlled to delay initiation of the power stroke according to the shape of the elongated profile.

According to another aspect, an internal combustion engine may include a cylinder block defining a cylinder, the cylinder defining a longitudinal axis. The internal combustion engine may further include a crankshaft defining a crankpin, wherein the crankshaft is rotatably received by the cylinder block and rotates along a longitudinal axis, wherein the crankpin defines a longitudinal axis parallel to and offset by a distance with respect to the longitudinal axis along which the crankshaft rotates. A line extending between the longitudinal axis along which the crankshaft rotates and the longitudinal axis of the crankpin defines a radial axis of the crankshaft. The internal combustion engine may further include a connecting rod defining a first end, a second end, and a longitudinal axis extending between the first and second ends. The first end of the connecting rod defines an aperture operably coupled to the crankpin. The internal combustion engine may also include a piston operably coupled to the second end of the connecting rod. The internal combustion may further include a bushing defining an external circumferential diameter and an aperture defining an internal circumferential diameter. A center defined by the external circumferential diameter and a center defined by the internal circumferential diameter are offset with respect to one another. The internal circumferential diameter is operably coupled to the crankpin and the external circumferential diameter is operably coupled to the aperture defined by the connecting rod, thereby operably coupling the connecting rod to the crankpin. The internal combustion engine may further include a bushing control assembly operably coupled to the bushing and configured to control oscillation of the bushing with respect to the aperture of the connecting rod. Rotation of the crankshaft results in reciprocating movement of the piston via the connecting rod within the cylinder, the reciprocating movement defining a compression stroke terminating when the radial axis of the crankshaft is substantially aligned with the longitudinal axis defined by the cylinder at a first stroke termination angle and the crankpin is located proximate the cylinder with respect to the longitudinal axis defined by the crankshaft. The reciprocating movement may further define a power stroke that terminates when the radial axis of the crankshaft is substantially aligned with the longitudinal axis defined by the cylinder at a second stroke termination angle and the crankpin is located distal the cylinder with respect to the longitudinal axis defined by the crankshaft. The bushing control assembly may include a bushing control plate defining an internal cam having a shape, and a bushing control rod defining a cam follower configured to follow the shape of the internal cam. The bushing control plate may be operably coupled to the crankpin via the bushing, and the cam follower may be operably coupled to the cylinder block, and oscillation of the bushing is controlled to delay initiation of the power stroke according to the shape of the internal cam.

According to still a further aspect, an internal combustion engine may include may include a cylinder block defining a cylinder, the cylinder defining a longitudinal axis. The internal combustion engine may further include a crankshaft defining a crankpin, wherein the crankshaft is rotatably received by the cylinder block and rotates along a longitudinal axis, wherein the crankpin defines a longitudinal axis parallel to and offset by a distance with respect to the longitudinal axis along which the crankshaft rotates. A line extending between the longitudinal axis along which the crankshaft rotates and the longitudinal axis of the crankpin defines a radial axis of the crankshaft. The internal combustion engine may further include a connecting rod defining a first end, a second end, and a longitudinal axis extending between the first and second ends. The first end of the connecting rod defines an aperture operably coupled to the crankpin. The internal combustion engine may also include a piston operably coupled to the second end of the connecting rod. The internal combustion may further include a bushing defining an external circumferential diameter and an aperture defining an internal circumferential diameter. A center defined by the external circumferential diameter and a center defined by the internal circumferential diameter are offset with respect to one another. The internal circumferential diameter is operably coupled to the crankpin and the external circumferential diameter is operably coupled to the aperture defined by the connecting rod, thereby operably coupling the connecting rod to the crankpin. The internal combustion engine may further include a bushing control assembly operably coupled to the bushing and configured to control oscillation of the bushing with respect to the aperture of the connecting rod. Rotation of the crankshaft results in reciprocating movement of the piston via the connecting rod within the cylinder, the reciprocating movement defining a compression stroke terminating when the radial axis of the crankshaft is substantially aligned with the longitudinal axis defined by the cylinder at a first stroke termination angle and the crankpin is located proximate the cylinder with respect to the longitudinal axis defined by the crankshaft. The reciprocating movement may further define a power stroke that terminates when the radial axis of the crankshaft is substantially aligned with the longitudinal axis defined by the cylinder at a second stroke termination angle and the crankpin is located distal the cylinder with respect to the longitudinal axis defined by the crankshaft. The bushing control assembly may be configured to delay initiation of the power stroke until the crankshaft has rotated at least about 15 degrees beyond the first stroke termination angle of the compression stroke.

Additional objects and advantages of the disclosure will be set forth in part in the description which follows, and in part will be obvious from the description, or may be learned by practice of the disclosed embodiments.

Aside from the structural and procedural arrangements set forth above, the embodiments could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this description, illustrate several exemplary embodiments and together with the description, serve to explain the principles of the embodiments. In the drawings.

FIG. 17A is a schematic partial section end view of the exemplary embodiment shown in FIG. 1 with the crankshaft at 180 degrees;

FIG. 17B is a detail view of a portion of FIG. 17A;

FIG. 27A is a schematic partial section end view of the exemplary embodiment shown in FIG. 20 with the crankshaft at 0 degrees;

FIG. 27B is a detail view of a portion of FIG. 27A;

FIG. 54A is a schematic partial section end view of the exemplary embodiment shown in FIG. 38 with the crankshaft at 180 degrees;

FIG. 63A is a schematic partial section end view of the exemplary embodiment shown in FIG. 56 with the crankshaft at 0 degrees;

FIG. 63B is a detail view of a portion of FIG. 63A;

FIG. 67A is a schematic partial section end view of the exemplary embodiment shown in FIG. 56 with the crankshaft at 180 degrees;

FIG. 77A is a schematic partial section end view of the exemplary embodiment shown in FIG. 70 with the crankshaft at 0 degrees;

FIG. 78A is a schematic partial section end view of the exemplary embodiment shown in FIG. 70 with the crankshaft at 40 degrees;

FIG. 79A is a schematic partial section end view of the exemplary embodiment shown in FIG. 70 with the crankshaft at 60 degrees;

DESCRIPTION OF EXEMPLARY EMBODIMENTS

Figure 1:
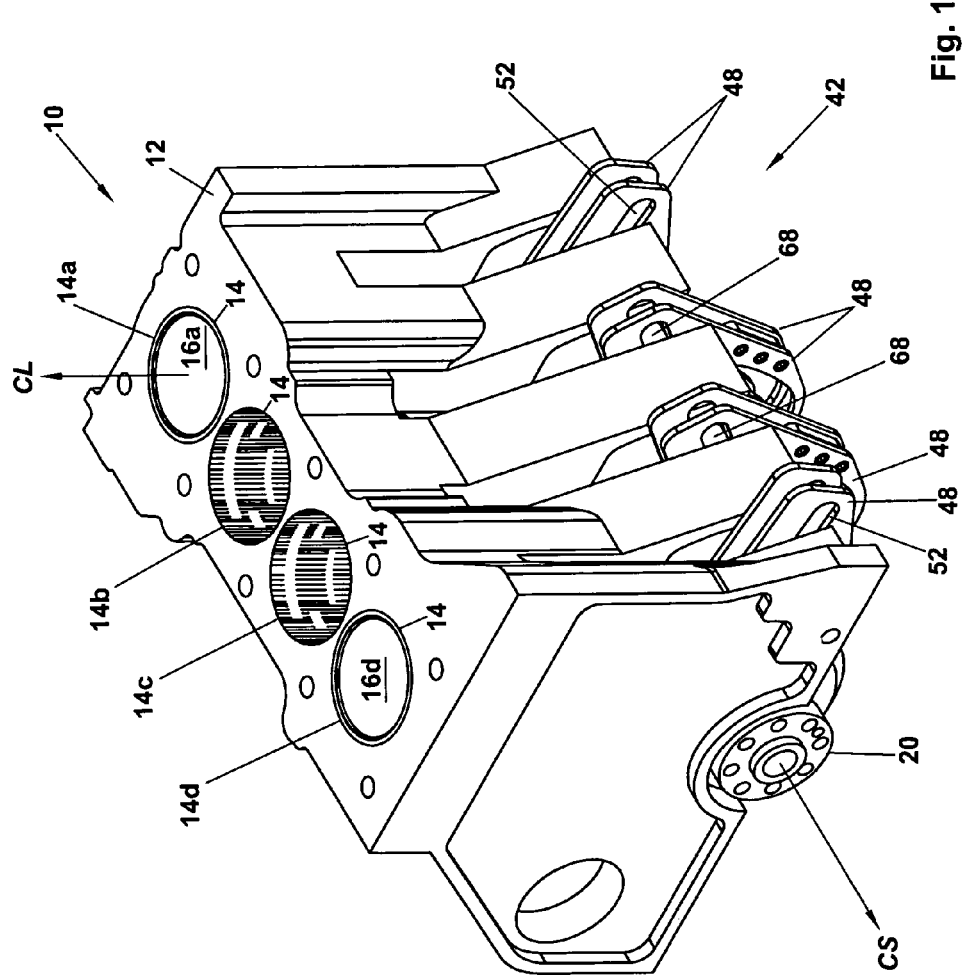
FIG. 1 is a schematic partial perspective view of an exemplary embodiment of an engine.

Reference will now be made in detail to exemplary embodiments. Wherever possible, the same reference numbers are used in the drawings and the description to refer to the same or like parts.

FIGS. 1-19 schematically illustrate a first exemplary embodiment of an engine 10. Four other exemplary embodiments are described, respectively, with respect to FIGS. 20-37, FIGS. 38-55, FIGS. 56-69, and FIGS. 70-81B.

In the first exemplary embodiment, exemplary engine 10 is a reciprocating-piston internal combustion engine. As shown in FIG. 1, engine 10 includes a cylinder block 12 defining a number of cylinders 14, each defining a longitudinal axis CL. In the exemplary embodiment shown, engine 10 has an in-line configuration and four cylinders 14a, 14b, 14c, and 14d. Although exemplary engine 10 has a configuration commonly referred to as an "in-line four" configuration, engine 10 may have other configurations known to those skilled in the art, such as, for example, configurations commonly referred to as "V," "W," "H," "flat," "horizontally-opposed," and "radial". Further, although exemplary engine 10 has four cylinders, engine 10 may have other numbers of cylinders known to those skilled in the art, such as, for example, one, two, three, five, six, eight, twelve, sixteen, twenty, and twenty-four. Thus, engine 10 may have, for example, any one of configurations commonly referred to as "flat-four," "flat-six," "in-line six," "straight-eight," "V-8," "V-10," "V-12," "W-12," and "H-16." Further, although exemplary engine 10 is described herein in relation to four-stroke operation, other operations known to those skilled in the art are contemplated, such as, for example, two-stroke, three-stroke, five-stroke, and six-stroke operation.

As shown in FIG. 1, exemplary engine 10 includes pistons 16 corresponding to cylinders 14, for example, four pistons 16a, 16b (see FIG. 4), 16c (see FIG. 4), and 16d. As shown in FIG. 1, pistons 16a and 16d are positioned in the upper end (i.e., "upper" being relative to the orientation of engine 10 shown in FIG. 1) of cylinders 14a and 14d, respectively, while pistons 16b and 16c are not visible in FIG. 1 due to being positioned lower in the cylinders 14b and 14c, respectively. To the extent that the relative positions of the pistons 16 in the cylinders 14 indicate a relative firing order of engine 10 (i.e., the sequential order of combustion events as identified by cylinders), exemplary engine 10 may be configured to have a different firing order, as is known to those skilled in the art.

Figure 2:
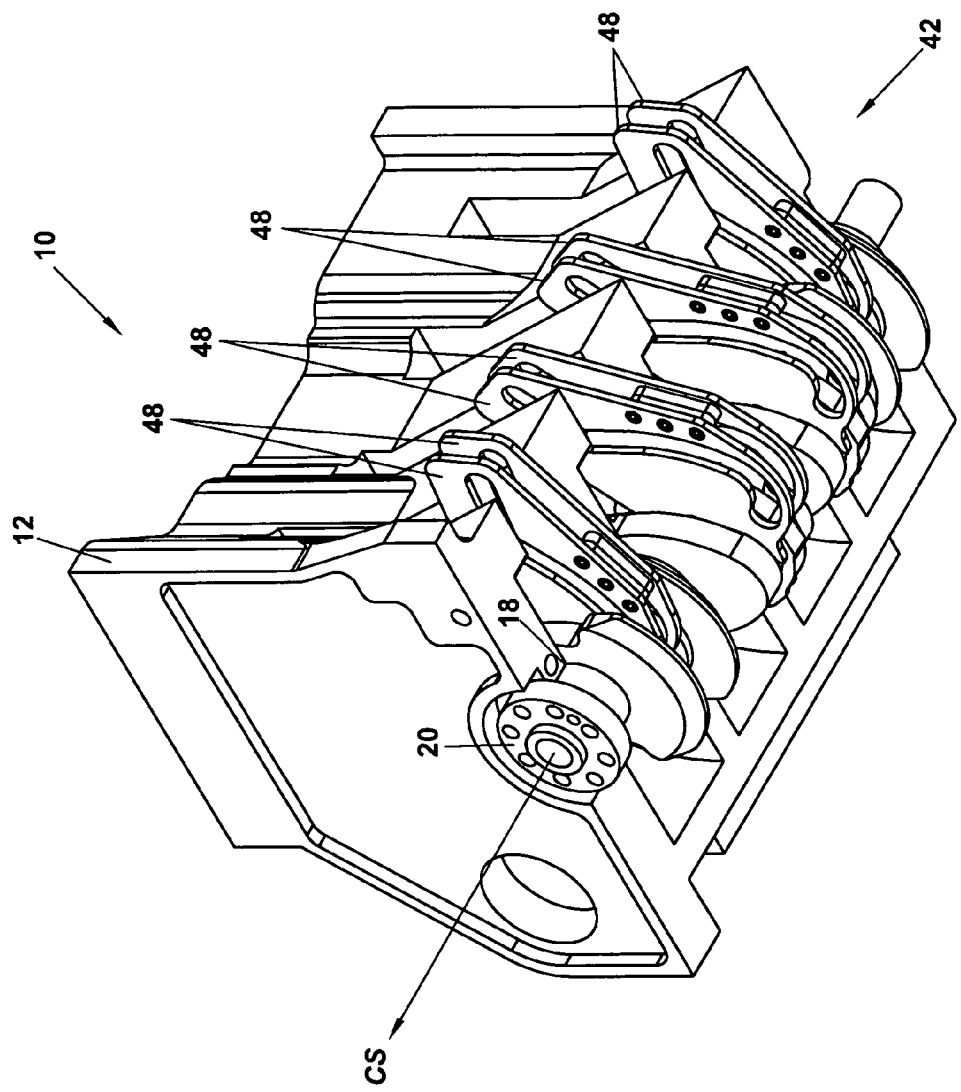
FIG. 2 is a schematic partial perspective view from below of the exemplary embodiment shown in FIG. 1.

As shown in FIG. 2, cylinder block 12 of exemplary engine 10 defines a number of bearings 18 for receiving a crankshaft 20, such that crankshaft 20 may rotate relative to cylinder block 12 about a longitudinal axis CS defined by crankshaft 20. For example, as shown in FIG. 3, crankshaft 20 defines a number of journals 22 corresponding to the number of bearings 18 defined by cylinder block 12, and journals 22 are received by bearings 18, such that crankshaft 20 may rotate about longitudinal axis CS.

Figure 3:
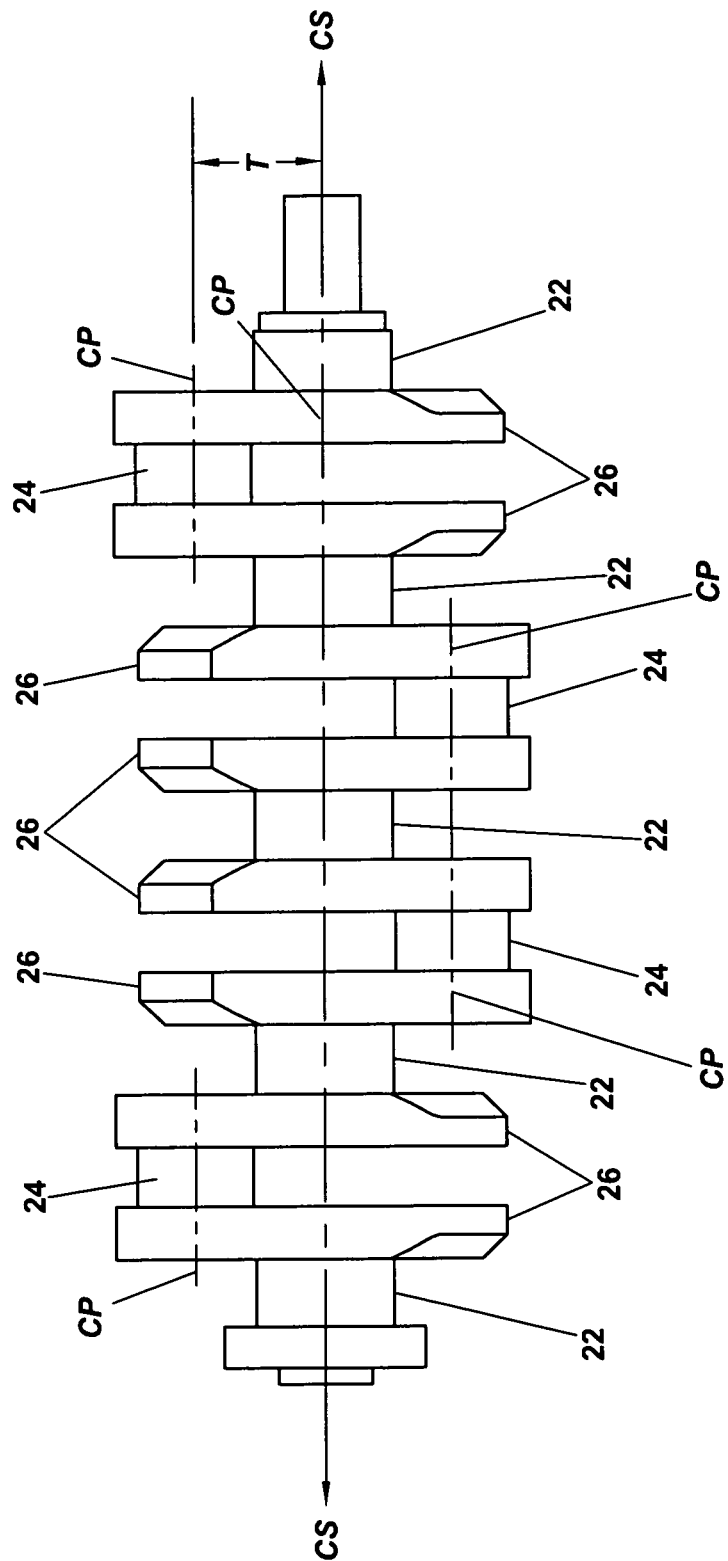
FIG. 3 is a schematic side view of an exemplary crankshaft.

Exemplary crankshaft 20, as shown in FIG. 3, also defines a number of crankpins 24 corresponding to the number of pistons 16. Crankpins 24 are circular in cross section, and the respective circular cross-sections may define a center C (see FIG. 8), which, in turn, defines a longitudinal crankpin axis CP extending in a perpendicular manner through center C of the cross-section of the respective crankpin 24, such that crankpin axis CP is parallel and offset with respect to crankshaft axis CS. For example, crankpin axis CP is spaced a distance T from the longitudinal axis CS of crankshaft 20. Crankshaft 20 may also include a number of counterbalance weights 26 for providing (or improving) rotational balance of crankshaft 20 when assembled with pistons 14 and connecting rods.

Figure 4B:
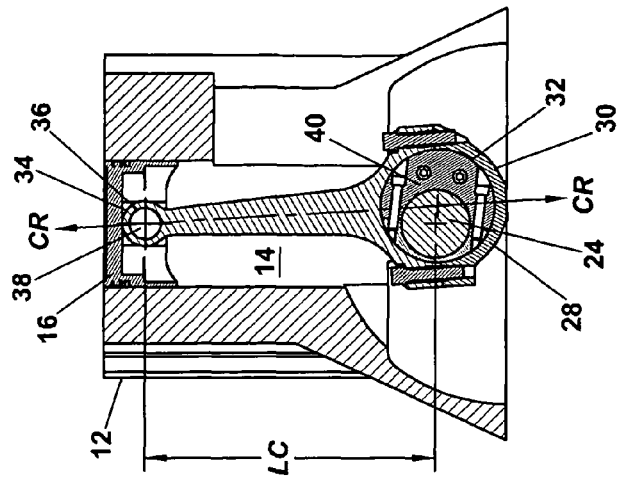
FIG. 4B is a schematic partial section end view of the exemplary embodiment shown in FIG. 1.
Figure 4A:
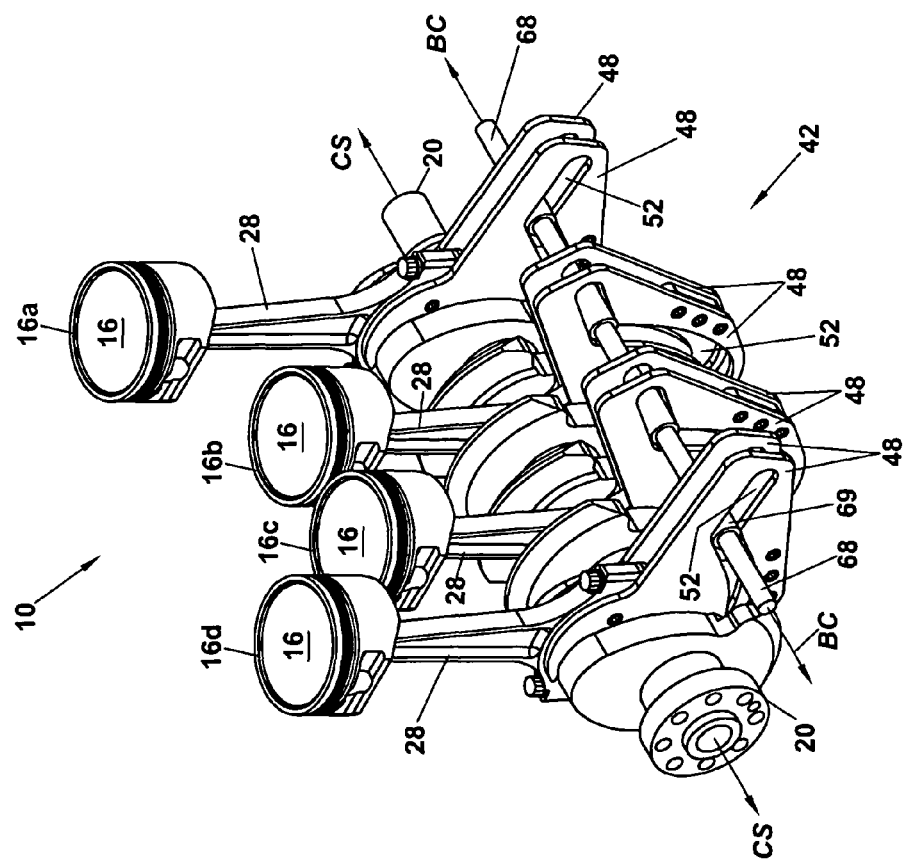
FIG. 4A is a schematic partial perspective view of a portion of the exemplary embodiment shown in FIG. 1.

Referring to FIGS. 4A and 4B, in exemplary engine 10, pistons 16 are operably coupled to crankshaft 20 via a number of connecting rods 28 corresponding to the number of pistons 16. In particular, connecting rods 28 define a first end 30 defining a first end aperture 32 for operably coupling connecting rod 28 to crankshaft 20 at crankpin 24. Connecting rod 28 further defines a second end 34 defining a second end aperture 36 for operably coupling connecting rod 28 to piston 16 via, for example, a pin 38. Connecting rod 28 further defines a longitudinal axis CR extending between the center of first end aperture 32 and second end aperture 36.

During operation of exemplary engine 10, as crankshaft 20 rotates, crankpins 24 revolve around crankshaft longitudinal axis CR, such that crankpin centers C define a circular path having a radius defined by the distance T defined along a radial axis RA (see FIGS. 9A-19) extending between the longitudinal axis CS of crankshaft 20 and the longitudinal axis CP of the respective crankpins 24. Thus, first end apertures 32 of connecting rods 28, which are rotatably coupled with respect to crankpins 24, also revolve about the crankshaft axis CS. Second end apertures 36 of connecting rods 28 are constrained to move in a reciprocating and linear manner due to being operably coupled to pistons 16, which are likewise constrained to move in a reciprocating and linear manner within respective cylinders 14 defined by cylinder block 12. As a result, as crankshaft 20 rotates, pistons 16 reciprocate within respective cylinders 14, defining a piston stroke generally corresponding to twice the distance T between the crankpin axis CP and the crankshaft axis CS, except as altered and as explained in greater detail herein.

During operation of a conventional engine, a piston reciprocates within the cylinder, such that during a power stroke of the internal combustion engine, combustion of an air/fuel mixture within a combustion chamber defined by the piston and the cylinder (and cylinder-head (not shown)) forces the piston toward the crankshaft. As the piston travels toward the crankshaft, the crankshaft is rotated via the connecting rod and crankpin, thereby converting the potential energy associated with the air/fuel mixture into mechanical work.

Due to the architecture of a conventional internal combustion engine, however, when the piston is at a position within the cylinder that coincides with the maximum compression (i.e., the combustion chamber is at its lowest volume, this condition coinciding with maximum compression, when the piston is farthest from the crankshaft), the axis of the connecting rod and the axis of the crankpin tend to be nearly co-linear, if not co-linear. At these relative positions, as the piston first begins its movement toward the crankshaft during the power stroke, there is only a very short moment arm (if any) extending between the axis of the connecting rod and the axis of the crankpin. As a result, the force initially created by the air/fuel mixture at the moment of combustion does not transfer as much torque to the crankshaft as it would if the length of the moment arm were greater. This situation may be particularly undesirable because during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connection rod and the axis of the crankpin during the time of maximum force on the piston, efficiency of the work generated from the combustion process in a conventional internal combustion engine may be less than desired.

Exemplary engine 10 is configured to employ a strategy that delays any substantial movement of pistons 16 toward crankshaft 20 during the power stroke, until crankshaft 20 has rotated to point at which there is a more effective moment arm between connecting rod axis CR and radial axis RA extending between crankshaft axis CS and a respective crankpin axis CP. As a result, a greater amount of the energy of the combustion event may be captured because the maximum force acting on pistons 16 coincides with a greater moment arm, thereby resulting in more torque at crankshaft 20 during the power stroke.

According to the exemplary embodiment of engine 10 shown in FIGS. 1-19, engine 10 includes a number of bushings 40 (see FIGS. 5A-5C) configured to operably couple respective connecting rods 28 to respective crankpins 24. Engine 10 further includes a bushing control assembly 42 operably coupled to bushings 40 and configured to control movement of bushings 40.

Figure 5C:
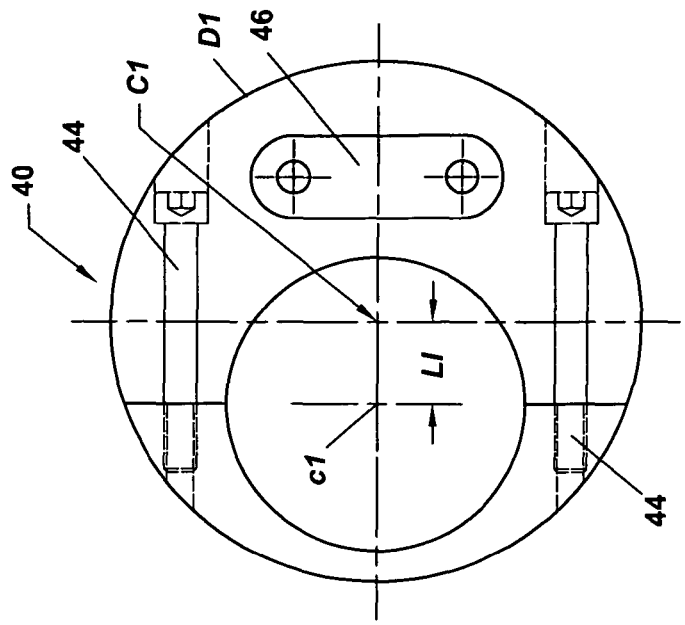
FIG. 5C is a schematic partial section back view of the exemplary bushing shown in FIG. 5A.
Figure 5B:
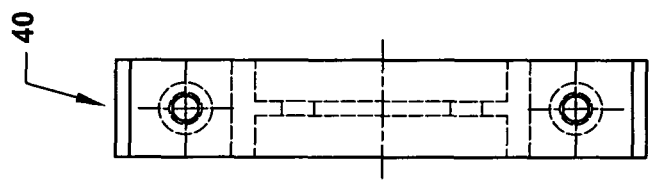
FIG. 5B is a schematic partial section side view of the exemplary bushing shown in FIG. 5A.
Figure 5A:
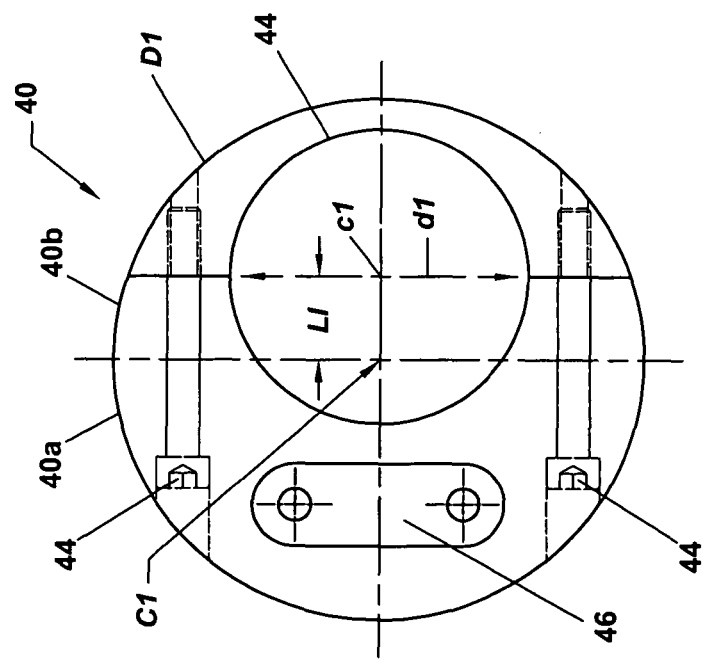
FIG. 5A is a schematic partial section front view of an exemplary embodiment of a bushing.

Referring to FIGS. 5A-5C, exemplary bushings 40 define an external circumferential diameter D1 and an aperture 44 defining an internal circumferential diameter d1, wherein a center C1 defined by external circumferential diameter D1 and a center c1 defined by internal circumferential diameter d1 are offset with respect to one another by a distance L1. Internal circumferential diameter d1 is configured to be operably coupled to one of crankpins 24, and external circumferential diameter D1 is configured to be operably coupled to first end aperture 32 of connecting rod 28, thereby operably coupling connecting rod 28 to crankpin 24 (see FIGS. 9A-19).

By virtue of center C1 of bushing 40 being offset from c1 by a distance L1, the center C of crankpin 34 is not concentric with respect to the center of first end aperture 32 of connecting rod 28 upon assembly to crankpin 24. Thus, by rotating bushing 40 relative to first end aperture 32 of connecting rod 28 while coupled to crankpin 24, it is possible to alter and control the effective length of connecting rod 28. Specifically, the effective length of connecting rod 28 is defined by a distance LC (see FIG. 4B) extending between the center of crankpin 24 and the center of second end aperture 36 of connecting rod 28, which operably couples connecting rod 28 to piston 16 via pin 38. In particular, by moving bushing 40 relative to connecting rod 28, the center of first end aperture 32 of connecting rod 28 may be moved closer and farther away from the center of second end aperture 36 of connecting rod 28, thereby altering the effective length LC of connecting rod 28.

Exemplary bushings 40 may have a split construction, for example, such that bushings 40 define two portions 40a and 40b, which may be separated from one another to facilitate assembly on crankpin 24. Upon assembly, bushing portions 40a and 40b may coupled to one another around crankpin 24 via one or more fasteners 44, such as, for example, bolts. Bushings 40 may define one or more locator elements 46, for example, an elongated recess, as shown in FIGS. 5A and 5C.

Locator element 46 may facilitate connection and/or alignment between bushings 40 and bushing control assembly 42.

Figure 6:
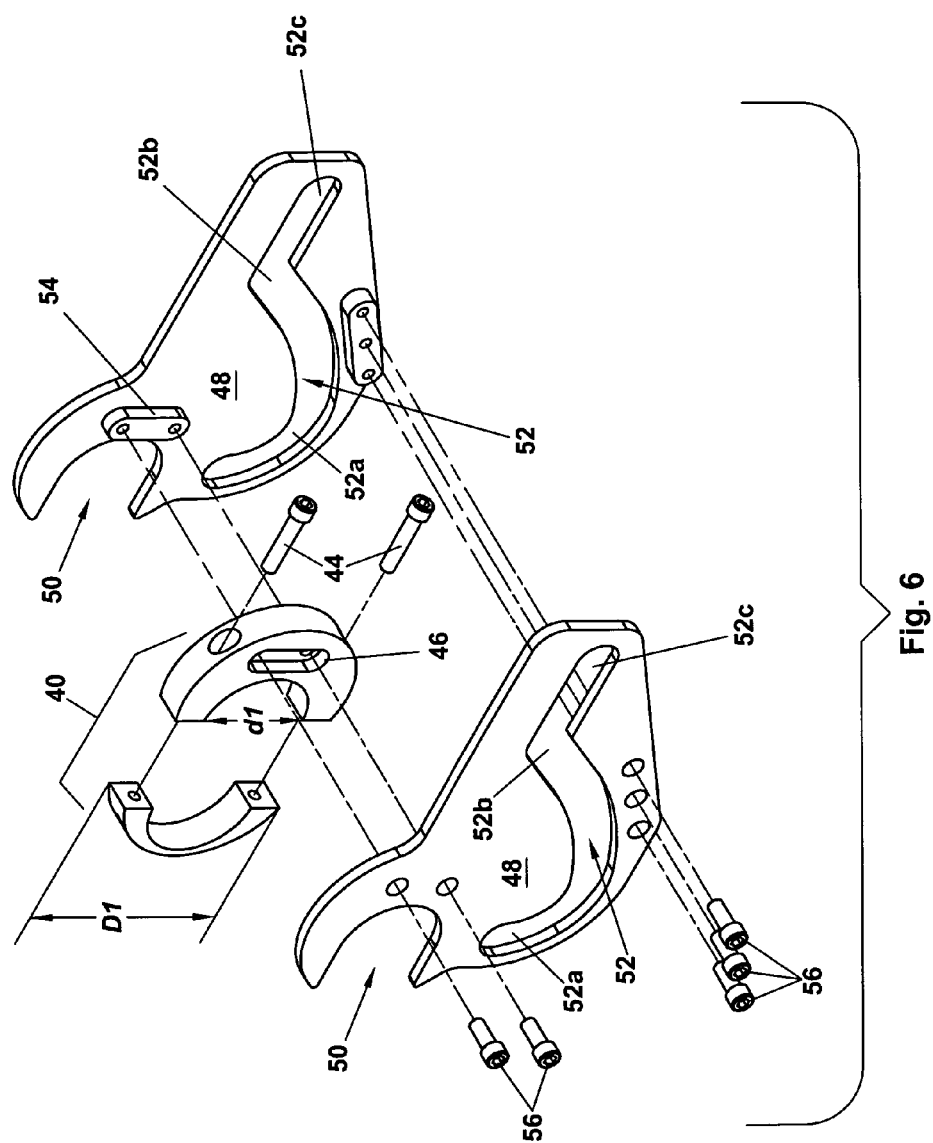
FIG. 6 is a schematic perspective exploded view of exemplary embodiments of a bushing and bushing control plates.
Figure 7:
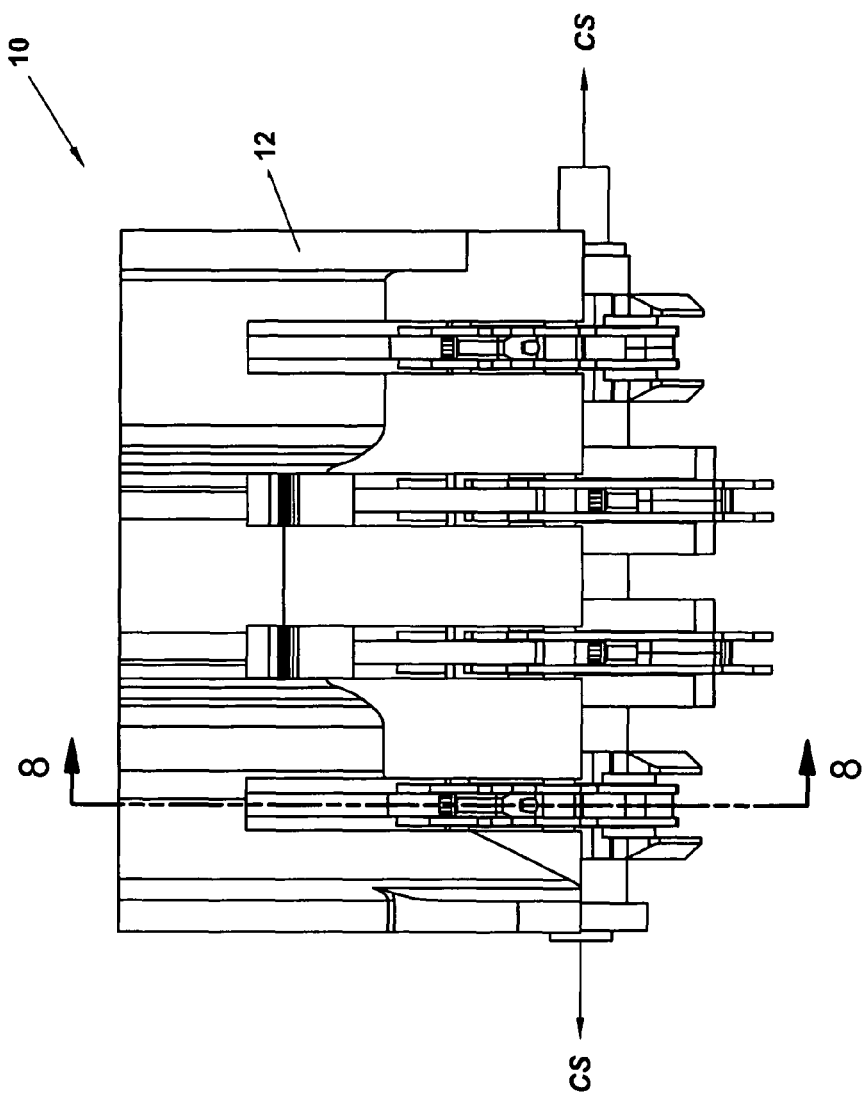
FIG. 7 is a schematic top view of the exemplary embodiment shown in FIG. 1.
Figure 8:
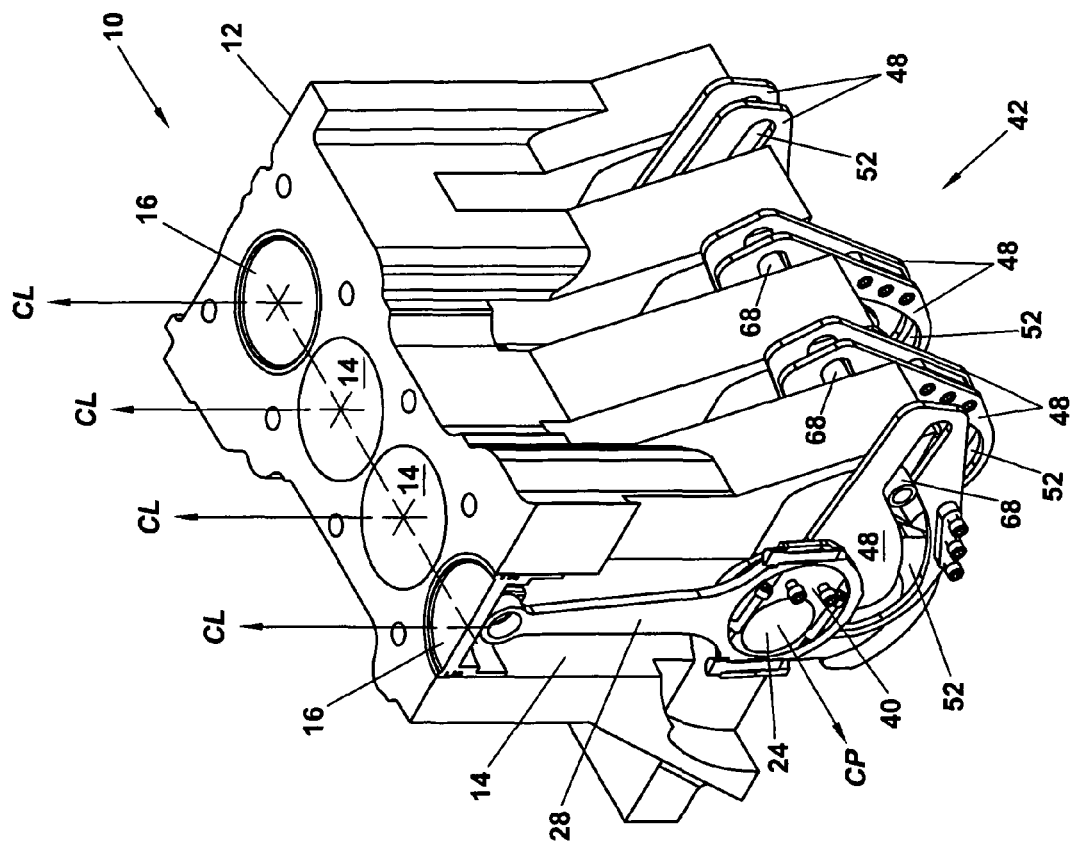
FIG. 8 is a schematic perspective partial section view of the exemplary embodiment shown in FIG. 1.

Referring to FIG. 6, exemplary bushing control assembly 42 includes one or more bushing control plates 48. Exemplary bushing control plates 48 define a clearance 50 for crankpins 24 and an elongated profile 52 having, for example, a predetermined shape. For example, exemplary elongated profile shown in FIG. 6 includes a first curved portion 52a, which curves in a first direction, a second curved portion 52b, which curves in a direction opposite the first direction (e.g., in a radius smaller than a radius defined by first curved portion 52a), and a substantially straight portion 52c extending from second curved portion 52b. Although FIG. 6 schematically depicts a relatively sharp radius at second curved portion 52b, this radius may be increased to provide a less abrupt transition between first curved portion 52a and substantially straight portion 52c.

Bushing control plates 48 may also include one or more plate locator elements 54, which are configured to cooperate with locator elements 46 of bushings 40 in a complimentary manner in order to provide a predetermined relationship between bushings 40 and bushing control plate 48. For example, plate locator elements 54 may include a protrusion having a predetermined shape configured to fit within, for example, an elongated recess of locator element 46 of bushing 40. According to some embodiments, the protrusion may be part of bushing 40, and the recess may be defined by one or more bushing control plates 48.

According to some embodiments, bushing control assembly 40 includes two bushing control plates 48, for example, as shown in FIG. 6, which sandwich bushing 40, such that protrusion of plate locator element 54 extends through recess of locator element 46 of bushing 40, and bushing control plates 48 are coupled to one another via one or more fasteners 56, such as, for example, bolts.

Referring to FIGS. 1 and 4A, a bushing control rod 68 may extend longitudinally with respect to cylinder block 12, such that a longitudinal axis BC defined by bushing control rod 68 extends parallel with respect to crankshaft axis CS. According to the exemplary embodiment shown, a mount (not shown) may operably couple bushing control rod 68 to engine 10 (e.g., via cylinder block 12), for example, in a fixed position or in a selectively movable manner. Bushing control rod 68 may extend through elongate profile 52, so as to travel along and within elongate profile 52 of bushing control plates 48. For example, as bushing control plates 48 move with respect to bushing control rod 68, bushing control rod 68 follows elongated profile 52. Thus, in the exemplary embodiment shown, elongated profile 52 of bushing control plates 48 functions as an internal cam, and bushing control rod 68 functions as a cam follower.

Figure 9B:
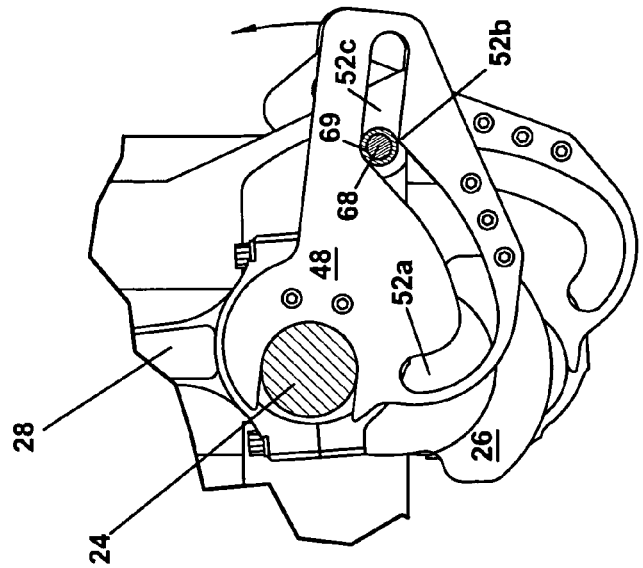
FIG. 9B is a detail view of a portion of FIG. 9A.
Figure 9A:
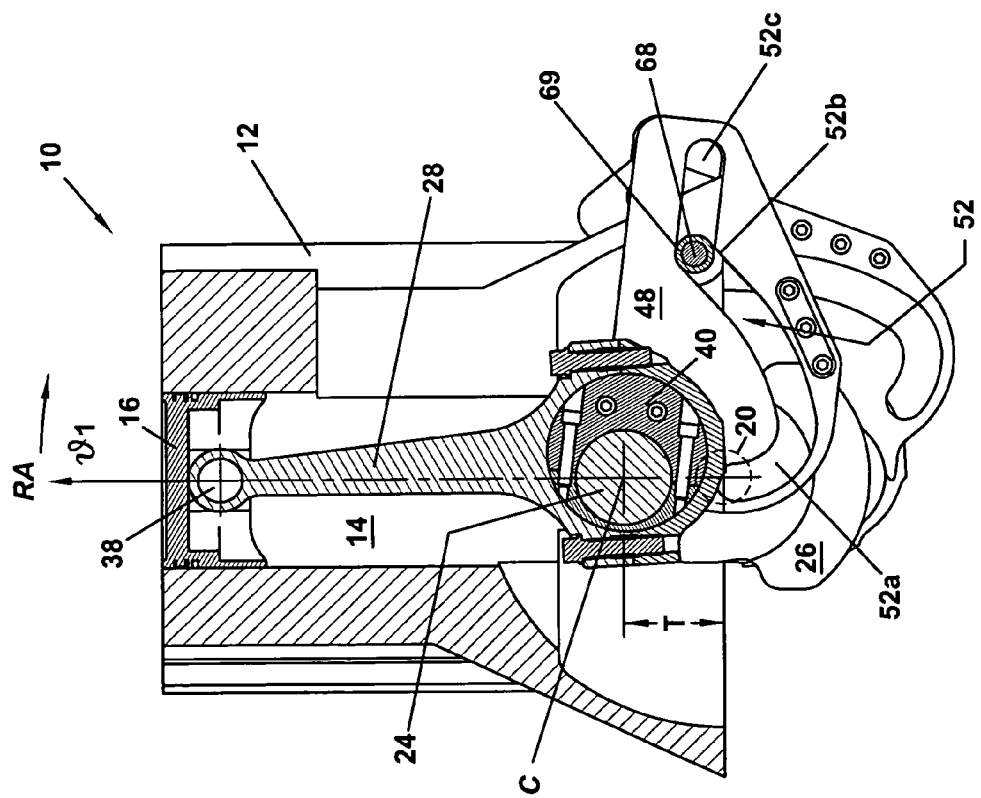
FIG. 9A is a schematic partial section end view of the exemplary embodiment shown in FIG. 1 with the crankshaft at 0 degrees.

In the exemplary embodiment shown in FIGS. 1-19, one or more sleeves 69 may be provided on bushing control rod 68. For example, as shown in FIGS. 4A, 9A, and 9B, as well as others, exemplary sleeves 69 are positioned between bushing control rod 68 and elongate profiles 52 of respective bushing control plates 48. Sleeves 69 may be formed from, for example, hardened tool steel or a material having similar properties. Sleeves 69 may be, or may include, rollers bearings. Sleeves 69 may serve to reduce friction and/or wear of elongate profiles 52 and/or bushing control rod 68.

As shown in FIGS. 1, 2, and 4A, the configuration of elongated profile 52 of bushing control plates 48 may be tailored to control movement of bushings 40 with respect to respective connecting rods 28 and crankpins 34. Specifically, bushing control plates 48 are operably coupled to bushings 40 as outlined previously herein. Thus, as bushing control plates 48 oscillate with respect to connecting rods 28 and crankpins 24, bushing control plates 48 control orientation of bushings 40 within first end apertures 32 of connecting rods 28. Thus, as bushing control plates 48 oscillate based on the shape of elongated profile 52, bushings 40 oscillate within first end apertures 32 of connecting rods 28. As a result, it is possible to tailor the oscillation of bushings 40 by changing the shape of elongated profile 52 of bushing control plates 48, as explained in more detail herein, and alter the effective length LC of connecting rod 28.

FIGS. 7-19 schematically illustrate exemplary operation of engine 10 having exemplary bushings 40 and exemplary bushing control assembly 42, which serve to delay piston 16's travel at the beginning of the power stroke of engine 10. In particular, by placing exemplary bushing 40 between crankpin 24 and connecting rod 28, selective rotation of bushing 40 may be manipulated, such that the distance between the center CP of crankpin 24 and the center of second end aperture 36 of connecting rod 28 attached to piston 16 (i.e., the effective length LC, as shown in FIG. 4B) may be selectively varied. Such an exemplary embodiment renders it possible to effectively hold piston 16 in cylinder 14 at a substantially fixed position for a short period of time, even as crankpin 24 continues to revolve around crankshaft 20 as crankshaft 20 rotates. As a result, it is possible to hold piston 16 at the point of highest compression in the combustion chamber while crankpin 24 revolves to a position in which there is an increased moment arm formed between the connecting rod axis CR and the crankpin axis CP. In this exemplary manner, the delaying strategy outlined below may be implemented.

For example, as shown in FIGS. 9A and 9B, crankshaft 20 is oriented such that radial axis RA defined by the center of crankshaft 20 and the center of crankpin 24 is oriented at 0 degrees, which corresponds generally a first stroke termination angle $\theta_1$ that generally coincides with the end of the compression stroke. As shown in FIG. 9A, bushing 40 is oriented relative to connecting rod 28, such that the effective length LC of connecting rod 28 is generally unaltered. As shown in FIG. 9B, bushing control plate 48 and bushing control rod 68 are related to one another such that bushing control rod 68 is positioned generally at second curved portion 52b of elongated profile 52. In this orientation, piston 16 is located generally at its farthest point from crankshaft axis CS, its maximum stroke.

Figure 10:
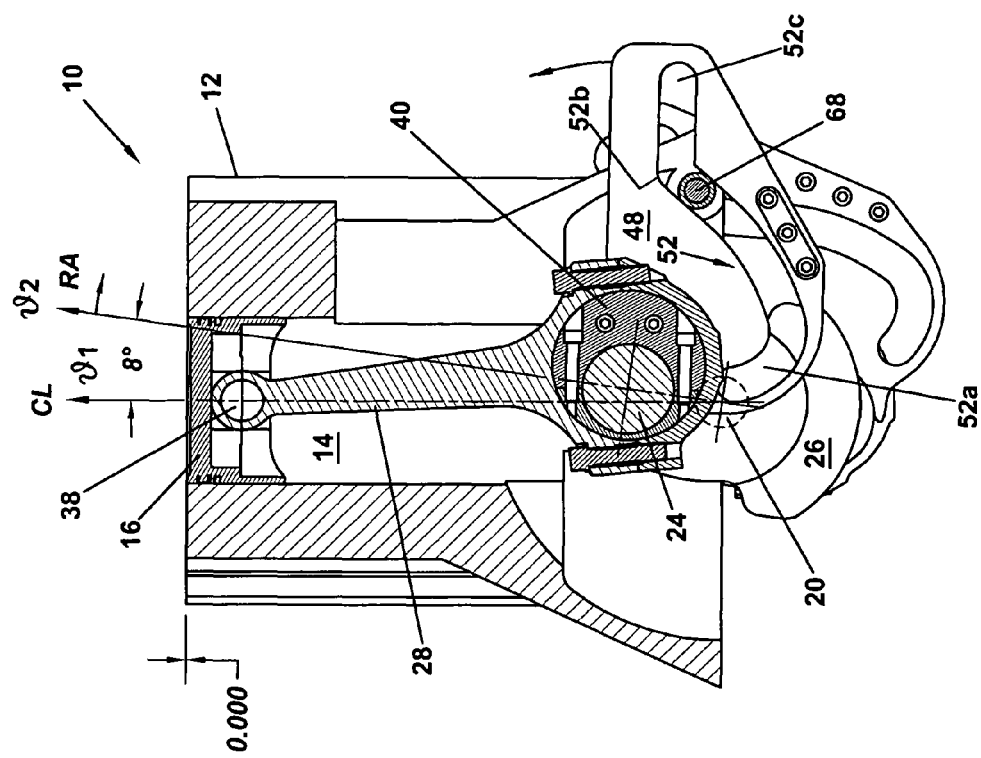
FIG. 10 is a schematic partial section end view of the exemplary embodiment shown in FIG. 1 with the crankshaft at 8 degrees.

Referring to FIG. 10, radial axis RA of crankshaft 20 and crankpin 24 has rotated 8 degrees from first stroke termination angle $\theta_1$. In a conventional engine, such rotation would result in a substantial amount of movement of piston 16 downward away from the point of maximum stroke. As can be seen in FIG. 10, however, piston 16 has not moved from the point of maximum stroke. This results from slight rotation of bushing 40 within first end aperture 36 of connecting rod 28, which compensates for the movement of crankpin 24, the effective length LC of connecting rod 28 growing to offset the downward portion of the motion of crankpin 24's center. Movement of bushing 40 is controlled by virtue of movement of bushing control plate 48, which results from interaction between elongated profile 52 and bushing control rod 68. As can be seen, bushing control rod 68 has moved away from second curved portion 52b of elongated profile 52 and into first curved portion 52a by virtue of movement of crankpin 24 toward bushing control rod 68. As outlined in more detail herein, bushing control rod 68 may be movably mounted relative to cylinder block 12. However, as described with respect to FIGS. 1-19, bushing control rod 68 is fixed with respect to cylinder block 12, and thus, when bushing control rod 68 is described as having moved relative to elongate profile 52, such movement is the result of movement of bushing control plates 48 rather than movement of bushing control rod 68 relative to cylinder block 12.

Figure 11:
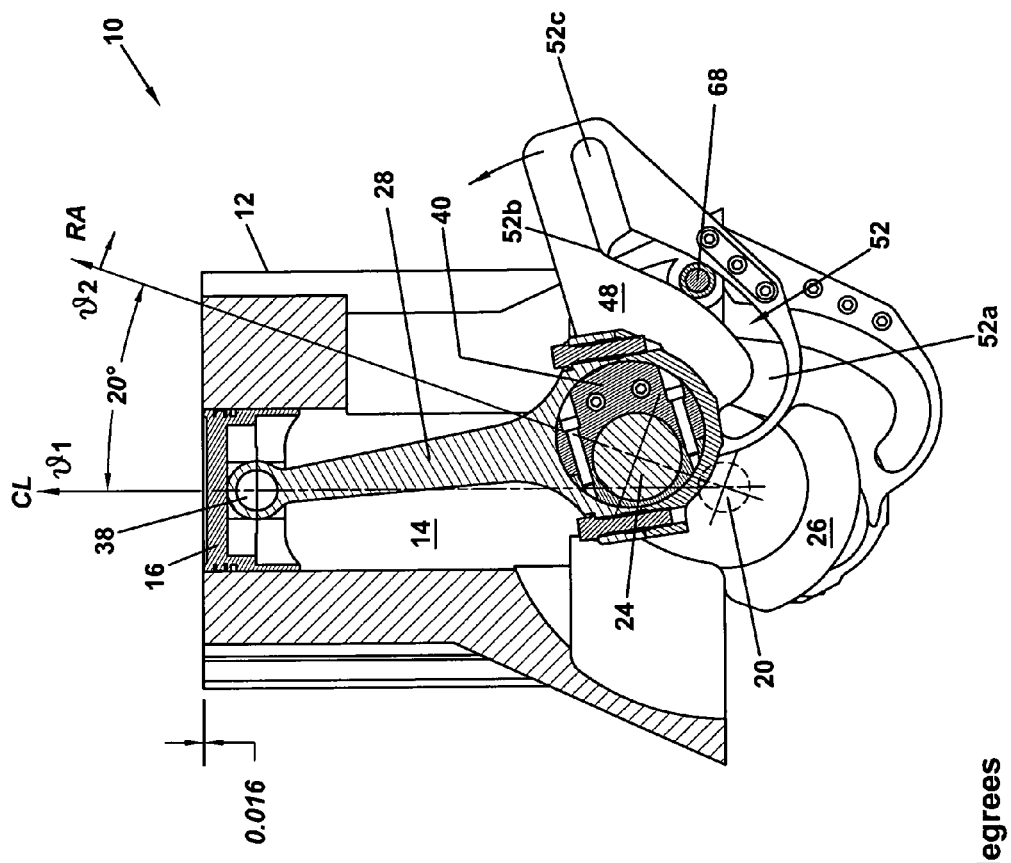
FIG. 11 is a schematic partial section end view of the exemplary embodiment shown in FIG. 1 with the crankshaft at 20 degrees.

Referring to FIG. 11, radial axis RA of crankshaft 20 and crankpin 24 has rotated 20 degrees from first stroke termination angle $\theta_1$. In a conventional engine, such rotation would result in a significant amount of movement of piston 16 downward away from the point of maximum stroke. As can be seen in FIG. 11, however, piston 16 has moved only 0.016 inch from the point of maximum stroke. This results from a more significant amount of rotation of bushing 40 (in the counterclockwise direction, as shown) within first end aperture 36 of connecting rod 28, which compensates for the movement of crankpin 24, the effective length LC of connecting rod 28 increasing to offset the downward portion of the motion of crankpin 24's center. Movement of bushing 40 is controlled by virtue of movement of bushing control plate 48, which results from interaction between elongated profile 52 and bushing control rod 68. As can be seen in FIG. 11, bushing control rod 68 has moved farther away from second curved portion 52b and farther into first curved portion 52a of elongated profile 52 relative to FIG. 10 by virtue of movement of crankpin 24 farther toward bushing control rod 68.

Figure 12:
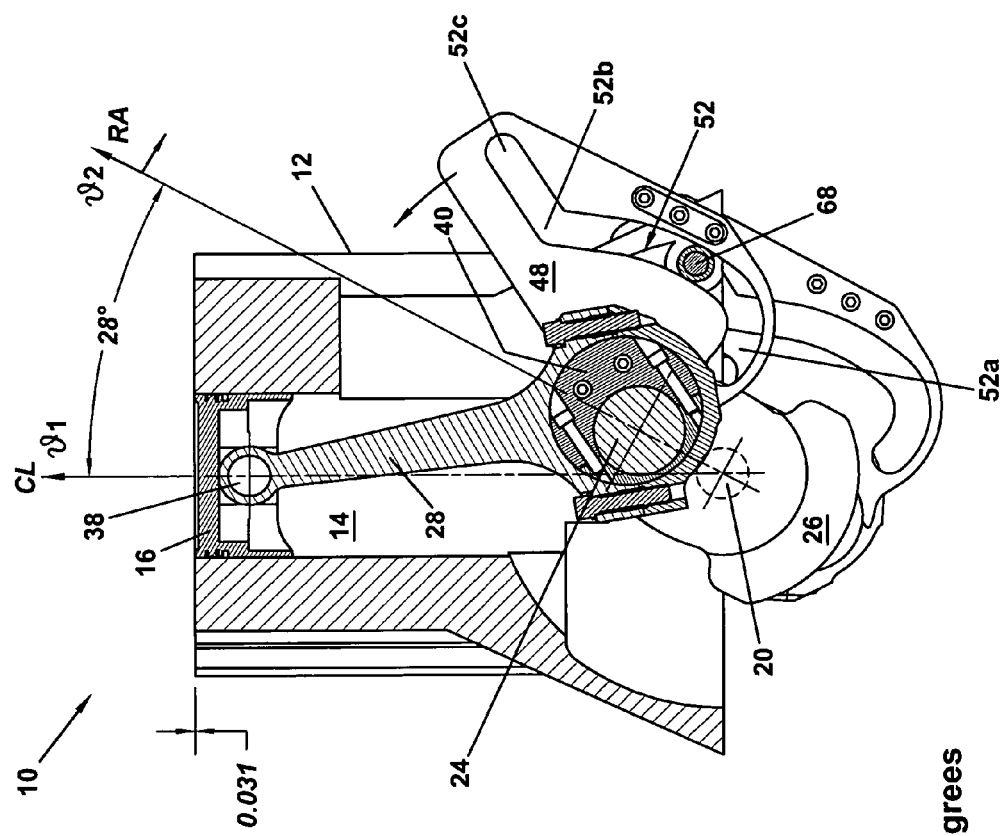
FIG. 12 is a schematic partial section end view of the exemplary embodiment shown in FIG. 1 with the crankshaft at 28 degrees.

As shown in FIG. 12, radial axis RA of crankshaft 20 and crankpin 24 has rotated 28 degrees from first stroke termination angle $\theta_1$. In a conventional engine, such rotation would result in a very significant amount of movement of piston 16 downward away from the point of maximum stroke. As can be seen in FIG. 12, piston 16 has moved only 0.031 inch from the point of maximum stroke. This results from a more significant amount of rotation of bushing 40 in the counterclockwise direction within first end aperture 36 of connecting rod 28, which compensates for the movement of crankpin 24, the effective length LC of connecting rod 28 continuing to increase to offset the downward portion of the motion of crankpin 24's center. As can be seen in FIG. 12, bushing control rod 68 has moved even farther away from second curved portion 52b of elongated profile 52 farther into first curved portion 52a relative to FIG. 11 by virtue of movement of crankpin 24 farther toward bushing control rod 68.

Figure 13:
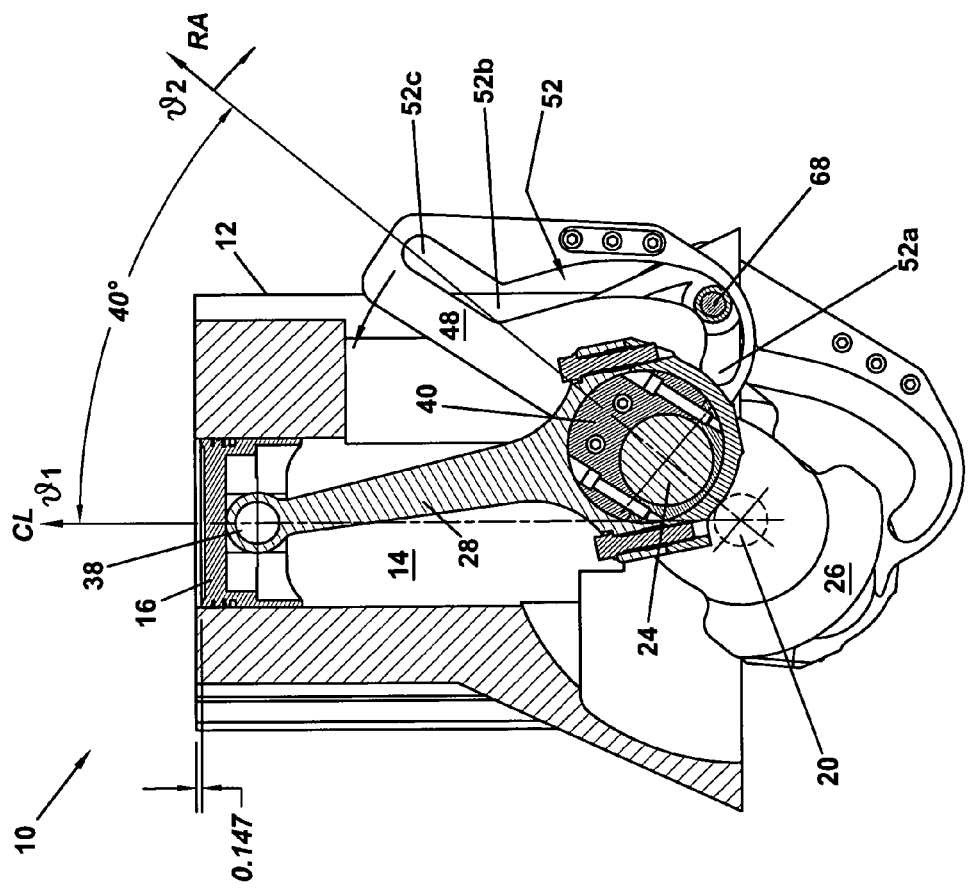
FIG. 13 is a schematic partial section end view of the exemplary embodiment shown in FIG. 1 with the crankshaft at 40 degrees.

As shown in FIG. 13, radial axis RA of crankshaft 20 and crankpin 24 has rotated 40 degrees from first stroke termination angle $\theta_1$, and still piston 16 has moved only 0.147 inch from the point of maximum stroke. Bushing 40 has continued to rotate even farther in the counterclockwise direction within first end aperture 36 of connecting rod 28, thereby continuing to compensate for movement of crankpin 24, the effective length LC of connecting rod 28 continuing to increase to offset the downward portion of the motion of crankpin 24's center. As a result of interaction between elongated profile 52 and bushing control rod 68, bushing control rod 68 has moved even farther away from second curved portion 52b and even father into first curved portion 52a of elongated profile 52 relative to FIG. 12 by virtue of movement of crankpin 24 farther toward bushing control rod 68.

Figure 14:
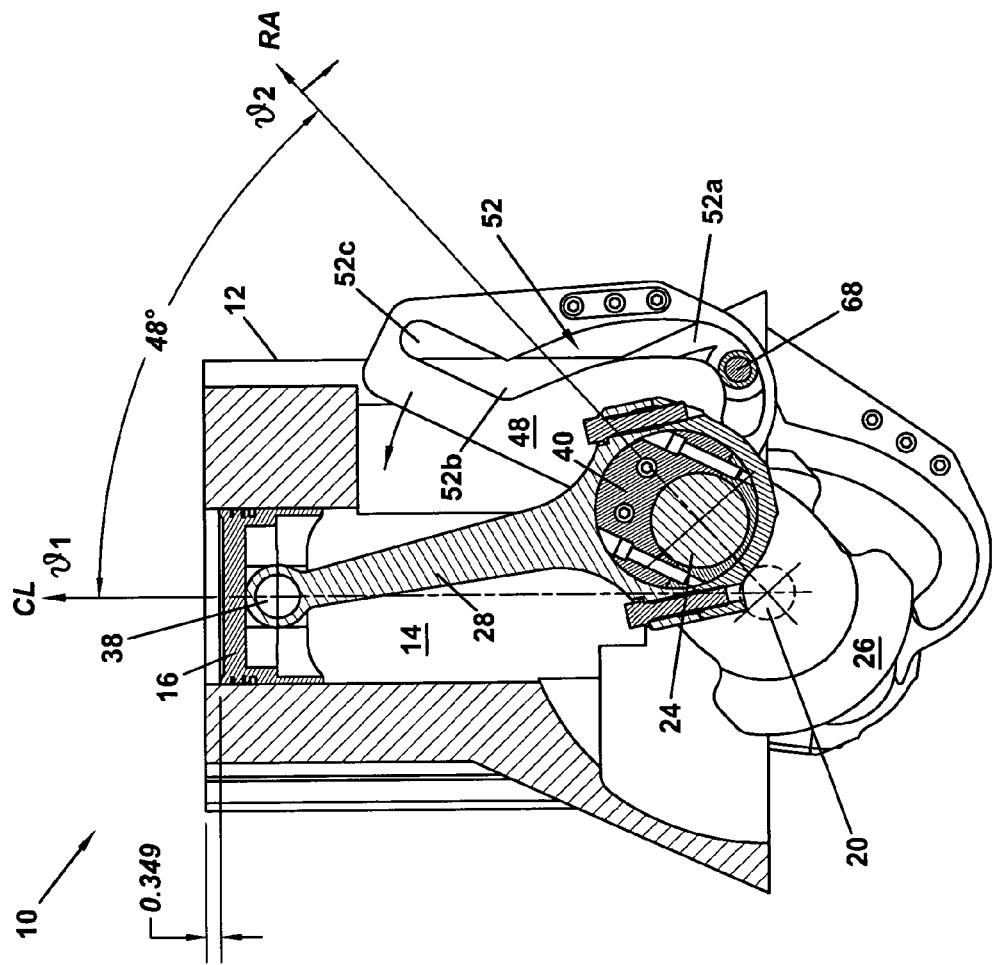
FIG. 14 is a schematic partial section end view of the exemplary embodiment shown in FIG. 1 with the crankshaft at 48 degrees.

Referring to FIG. 14, radial axis RA of crankshaft 20 and crankpin 24 has rotated 48 degrees from first stroke termination angle $\theta_1$, and piston 16 has started to exhibit a substantial amount of movement of 0.349 inch from the point of maximum stroke. Thus, while it took 40 degrees of crankshaft rotation for piston 16 to move 0.147 inch, in the 8 degrees between 40 degrees and 48 degrees, piston 16 moved an additional 0.202 inch from the point of maximum stroke. Although bushing 40 has continued to rotate even farther in the counterclockwise direction within first end aperture 36 of connecting rod 28, the effect of the rotation no longer significantly compensates for movement of crankpin 24, as the effective length LC of connecting rod 28 approaches its maximum. As a result of interaction between elongated profile 52 and bushing control rod 68, bushing control rod 68 has moved only slightly in elongated profile 52 relative to FIG. 13.

Figure 15:
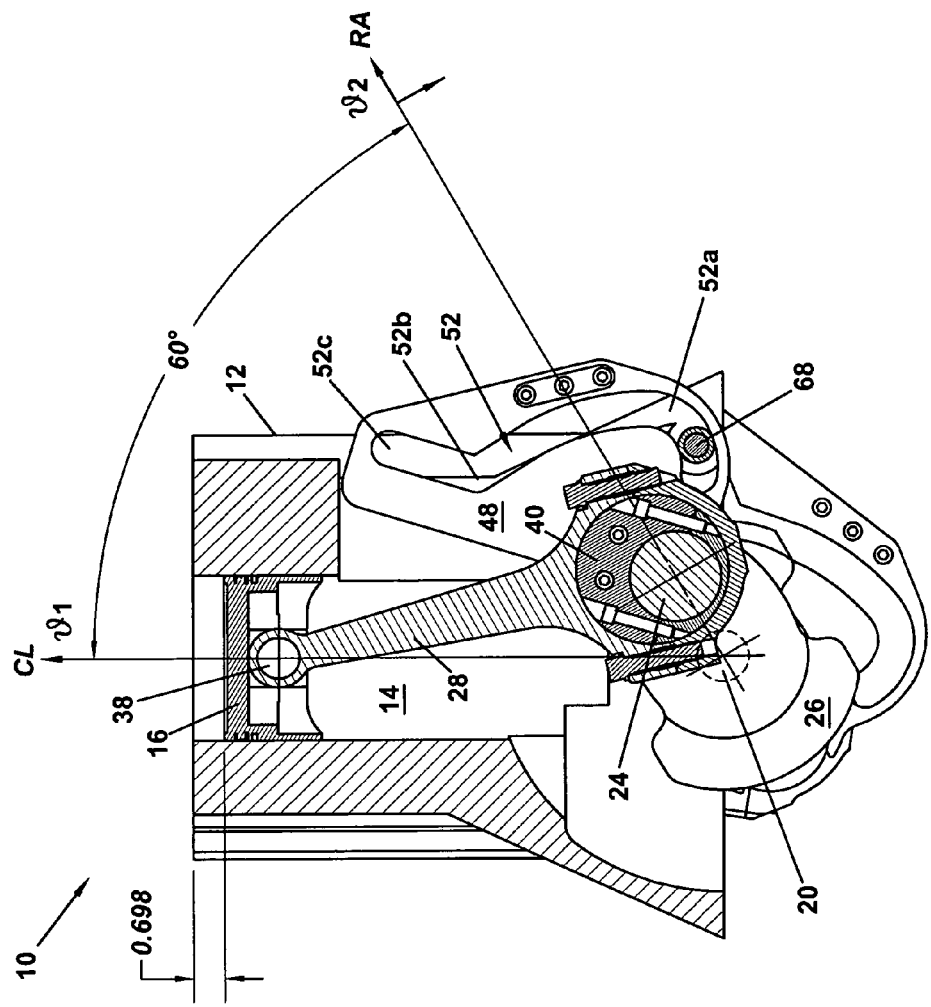
FIG. 15 is a schematic partial section end view of the exemplary embodiment shown in FIG. 1 with the crankshaft at 60 degrees.

FIG. 15 shows radial axis RA of crankshaft 20 and crankpin 24 as having rotated 60 degrees from first stroke termination angle $\theta_1$, and piston 16 exhibits a significant movement of 0.698 inch from the point of maximum stroke. Although bushing 40 has continued to rotate even farther in the counterclockwise direction within first end aperture 36 of connecting rod 28, the effect of the rotation no longer significantly compensates for movement of crankpin 24, as the effective length LC of connecting rod 28 has generally approached its maximum. As a result of interaction between elongated profile 52 and bushing control rod 68, bushing control rod 68 has moved only slightly in elongated profile 52 relative to FIG. 14.

Figure 16:
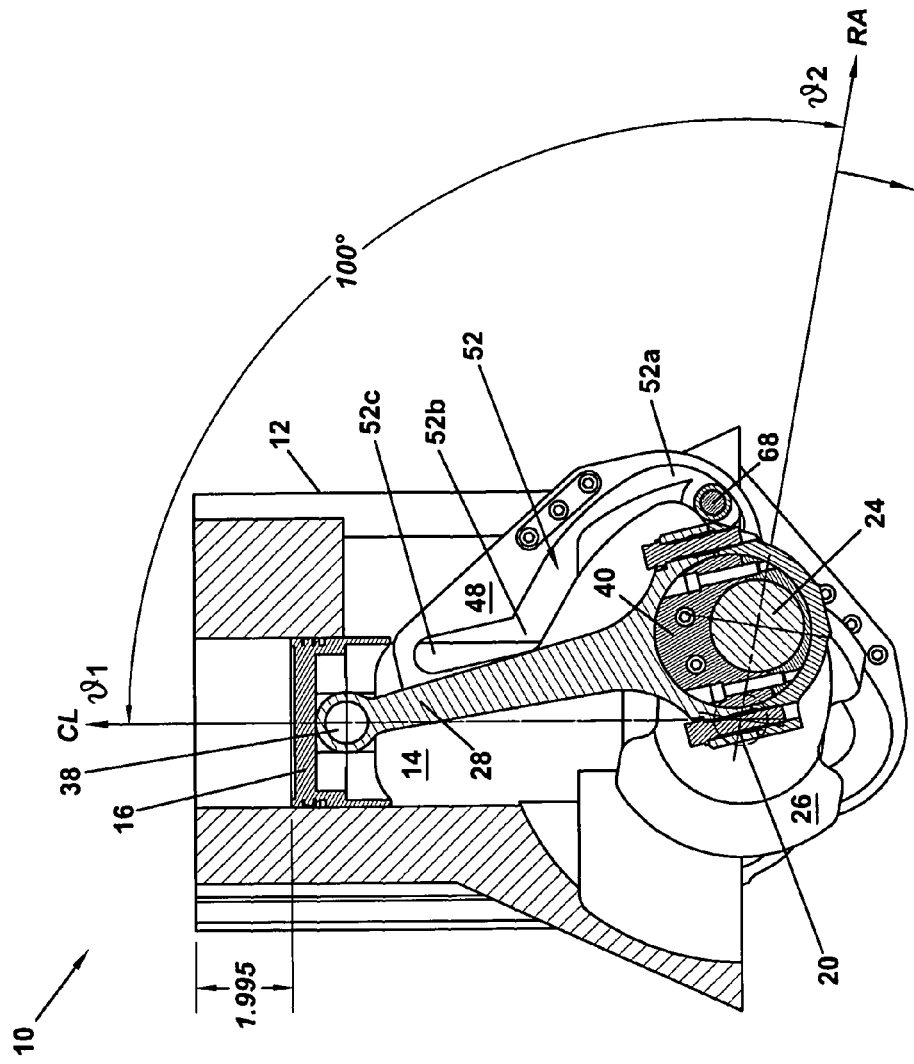
FIG. 16 is a schematic partial section end view of the exemplary embodiment shown in FIG. 1 with the crankshaft at 100 degrees.

In FIG. 16, radial axis RA of crankshaft 20 and crankpin 24 has rotated 100 degrees from first stroke termination angle $\theta_1$, and piston 16 has moved 1.995 inches from the point of maximum stroke. FIGS. 17A and 17B show radial axis RA of crankshaft 20 and crankpin 24 rotated 180 degrees from first stroke termination angle $\theta_1$, such that radial axis RA has reached a second stroke termination angle $\theta_2$ (i.e., the point of minimum stroke), and piston 16 has moved 3.516 inches from the point of maximum stroke. As can be seen in FIGS. 17A and 17B, bushing 40 and bushing control plate 48 have started to reverse direction of rotation, now rotating clockwise, as shown. As a result of interaction between elongated profile 52 and bushing control rod 68, bushing control rod 68 has moved back toward second curved portion 52b of elongate profile 52 by virtue of movement of crankpin 24 farther downward and away from bushing control rod 68.

According to some embodiments, cylinder block 12, pistons 16, and/or connecting rods 28, may be configured to provide clearance for bushing control plates 48 as bushing control plates 48 rotate to a position, for example, as shown in FIGS. 14-16. For example, relative to some conventional engines, cylinder block 12 may be configured to be taller (e.g., cylinder block 12 may have a greater distance between crankshaft bearings 18 and the distal end of cylinders 14), pistons 16 may be configured to be shorter (e.g., pistons 16 may have shorter skirts), and/or connecting rods 28 may be longer (e.g., there may be a greater distance between the centers of first end apertures 32 and second end apertures 36) (see FIG. 4B).

Figure 18:
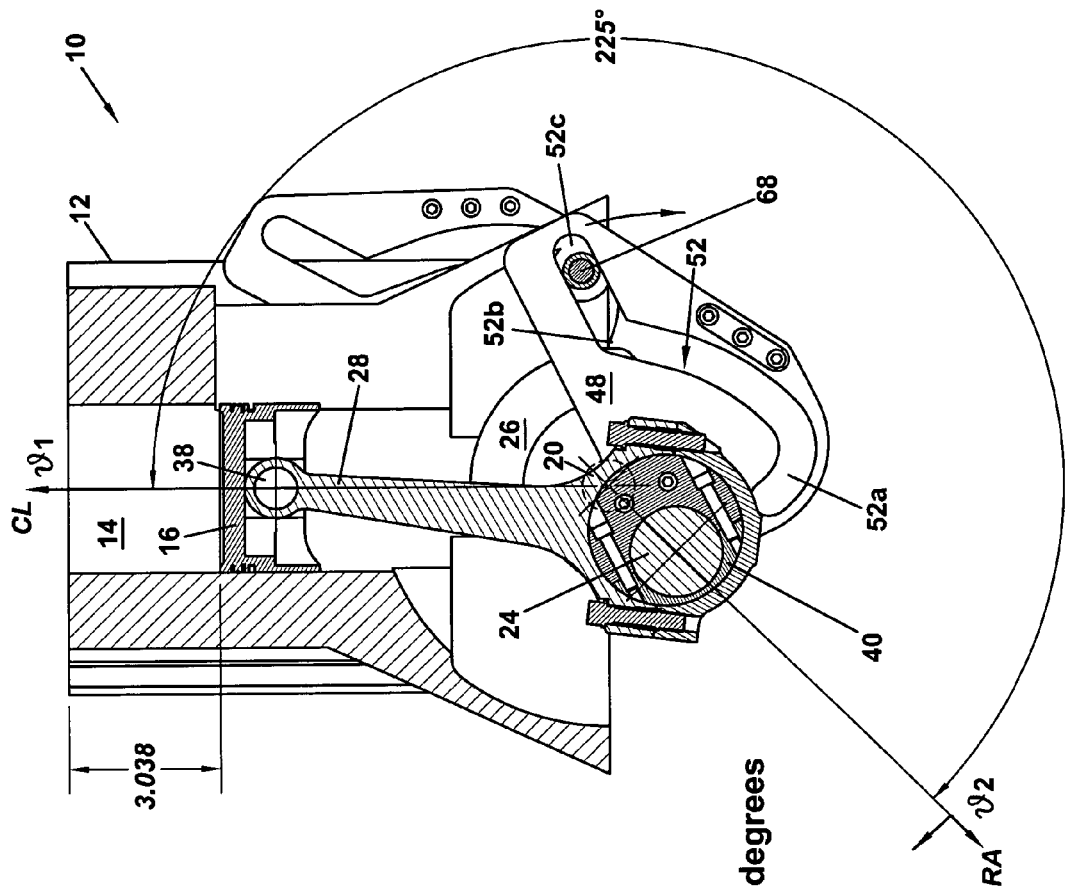
FIG. 18 is a schematic partial section end view of the exemplary embodiment shown in FIG. 1 with the crankshaft at 225 degrees.

Referring to FIG. 18, radial axis RA of crankshaft 20 and crankpin 24 has rotated 225 degrees from first stroke termination angle $\theta_1$, such that piston 16 has reversed direction and has started to travel back toward the point of maximum stroke and is 3.038 inches from the point of maximum stroke. As can be seen in FIG. 18, bushing 40 and bushing control plate 48 continue rotate clockwise. As a result of interaction between elongated profile 52 and bushing control rod 68, bushing control rod 68 has moved well into substantially straight portion 52c of elongate profile 52 due to movement of crankpin 24 even farther away from bushing control rod 68 relative to FIGS. 17A and 17B.

Figure 19:
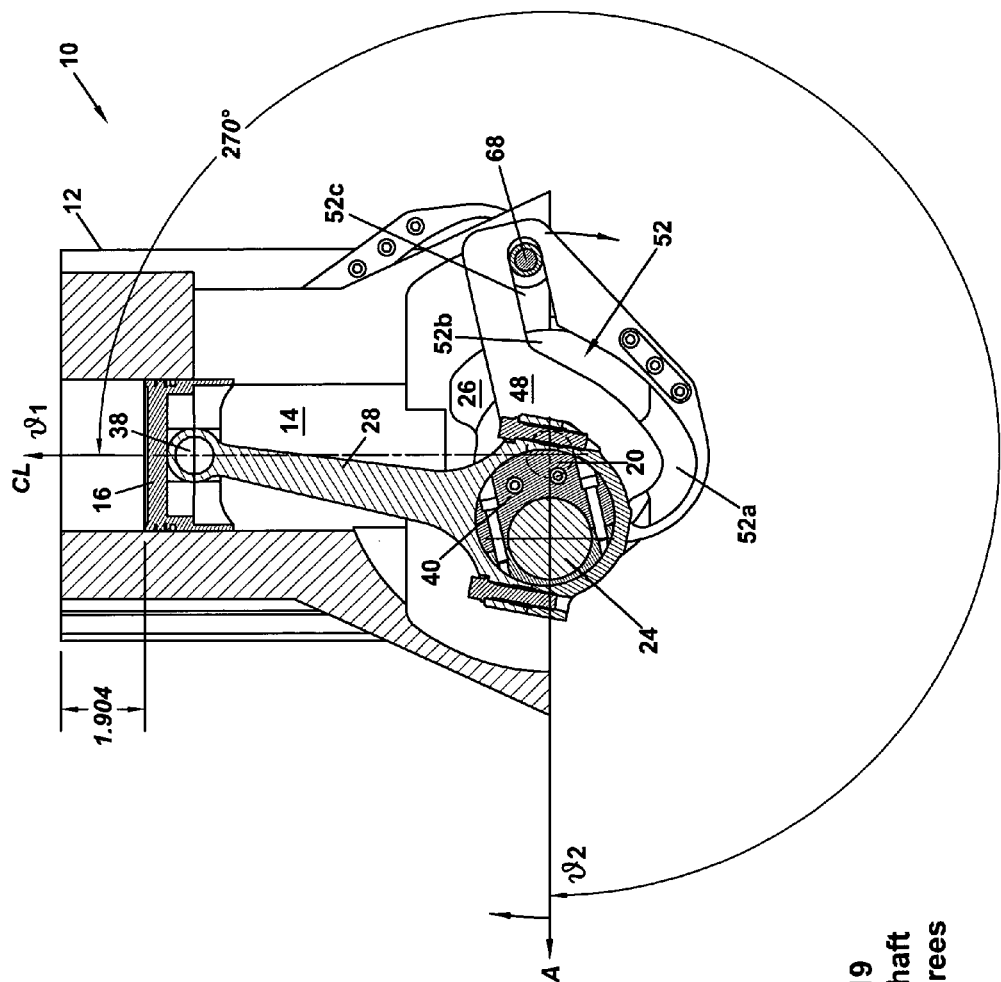
FIG. 19 is a schematic partial section end view of the exemplary embodiment shown in FIG. 1 with the crankshaft at 270 degrees.

In FIG. 19, radial axis RA of crankshaft 20 and crankpin 24 has rotated 270 degrees from first stroke termination angle $\theta_1$, and piston 16 continues to travel back toward the point of maximum stroke and is 1.904 inches from the point of maximum stroke. As can be seen in FIG. 19, bushing 40 and bushing control plate 48 continue rotate clockwise. As a result of interaction between elongated profile 52 and bushing control rod 68, bushing control rod 68 remains in substantially straight portion 52c of elongate profile 52, in particular, almost at the very distal end of substantially straight portion 52c. This is due to movement of crankpin 24 even farther away from bushing control rod 68 relative to FIG. 18. As bushing 40 and bushing control plate 48 continue rotate clockwise, they return to the relative orientations shown in FIGS. 9A and 9B, which coincide with radial axis RA being at the first stroke termination angle $\theta_1$ of 0 degrees.

Thus, as demonstrated by the exemplary embodiment shown in FIGS. 1-19, the effective length of connecting rod 28 is controlled to delay and slow the downward travel of piston 16 based on the configuration of and/or interaction between bushing 40, bushing control plate 48, elongated profile 52, and bushing control rod 68. According to some embodiments, this configuration and/or interaction can be tailored to achieve desired performance characteristics of exemplary engine 10, such as, for example, improved efficiency, improved power output, improved responsiveness, and/or improved torque. For example, the shape of elongated profile 52 may be tailored to improve efficiency and/or power of exemplary engine 10.

According to some embodiments, bushing control rod 68 may be fixed relative to cylinder block 12. According to other embodiments, bushing control rod 68 may be movably coupled with respect to cylinder block 12, such that, for example, movement of bushing control rod 68 changes at least one of the timing and magnitude of the delay of initiation of the power stroke.

According to some embodiments, initiation of the power stroke of exemplary engine 10 may be delayed until crankshaft 20 has rotated at least about 15 degrees beyond the first stroke termination angle $\theta_1$ of the compression stroke. In other embodiments, initiation of the power stroke may be delayed until crankshaft 20 has rotated at least about 20 degrees beyond the first stroke termination angle $\theta_1$ of the compression stroke (e.g., at least about 25 degrees beyond the first stroke termination angle $\theta_1$). In other embodiments, rotation may be set to about 30, 35, or 40 degrees (see, e.g., FIG. 13) beyond the first stroke termination angle $\theta_1$ of the compression stroke.

Exemplary engine 10, may be incorporated into a power train, for example, including a transmission operably coupled to engine 10 and a drive member configured to perform work, the drive member being operably coupled to the transmission. For example, the drive member may include a propulsion device, such as, for example, a wheel or a propeller. According to some embodiments, such a power train may include a generator configured to convert rotational power into electrical power, the generator being operably coupled to exemplary engine 10. Such a power train may include a power storage device (e.g., one or more batteries) operably coupled to the generator and configured to store electrical power. According to some embodiments, the transmission may include one or more electric motors.

Moreover, exemplary engine 10 may be incorporated into a vehicle including a transmission operably coupled to engine 10 and a drive member configured to perform work and being operably coupled to the transmission. For example, the drive member may include a propulsion device, such as, for example, a wheel or a propeller. For example, the vehicle may be a car, van, truck, boat, ship, train, or air vehicle. Such a vehicle may include exemplary engine 10 operably coupled to a generator configured to convert rotational power into electrical power, and a power storage device operably coupled to the generator and configured to store electrical power. The transmission may be, for example, an electric motor.

FIGS. 20-37 schematically illustrate a second exemplary embodiment of engine 10. The exemplary embodiment shown in FIGS. 20-37 is similar to exemplary engine 10 shown in FIGS. 1-19. For example, exemplary embodiment of engine 10 shown in FIGS. 20-37 includes a number of bushings 40 configured to operably couple respective connecting rods 28 to respective crankpins 24. Engine 10 further includes a bushing control assembly 42 operably coupled to bushings 40 and configured to control movement of bushings 40.

Figure 24:
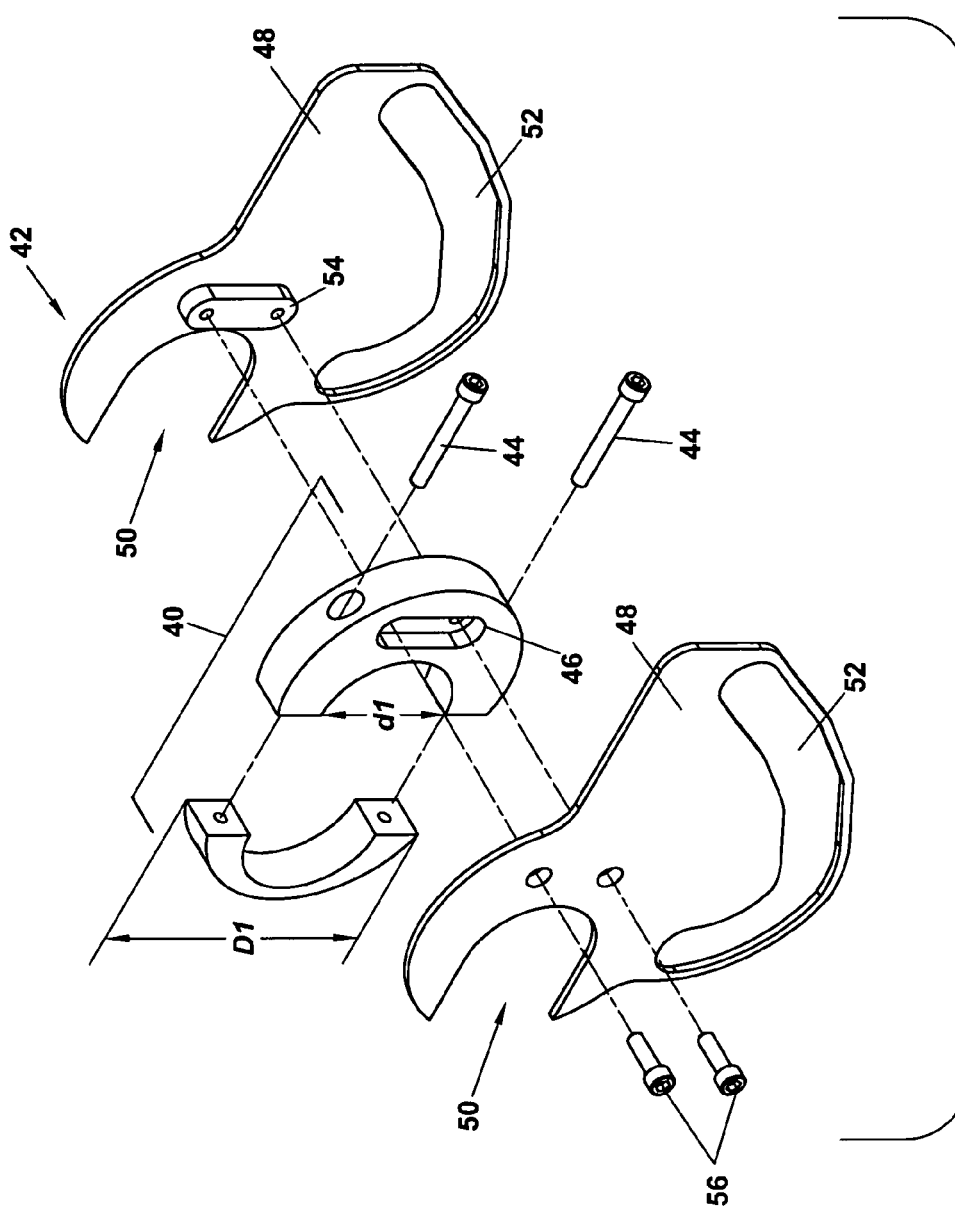
FIG. 24 is a schematic perspective exploded view of exemplary embodiments of a bushing and bushing control plates.
Figure 25:
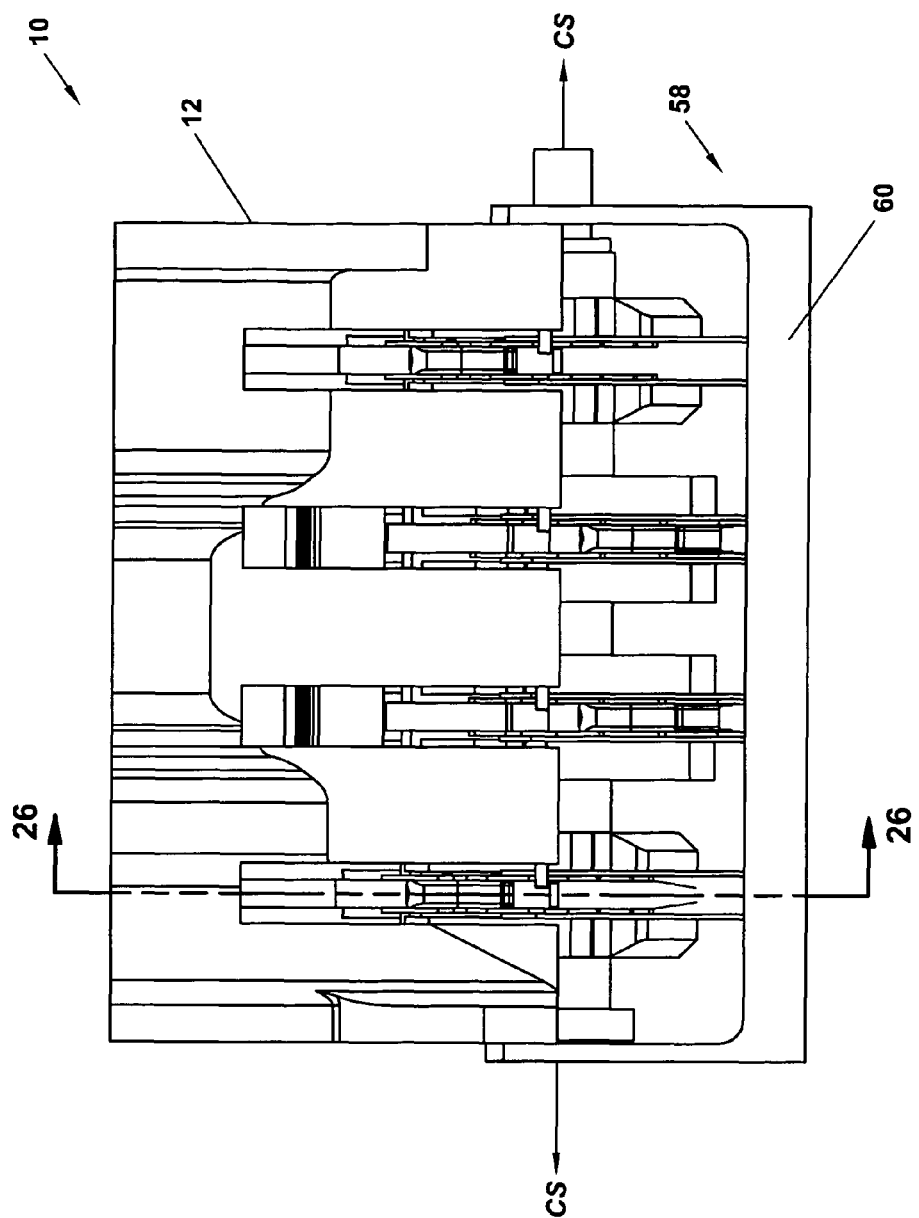
FIG. 25 is a schematic top view of the exemplary embodiment shown in FIG. 20.
Figure 26:
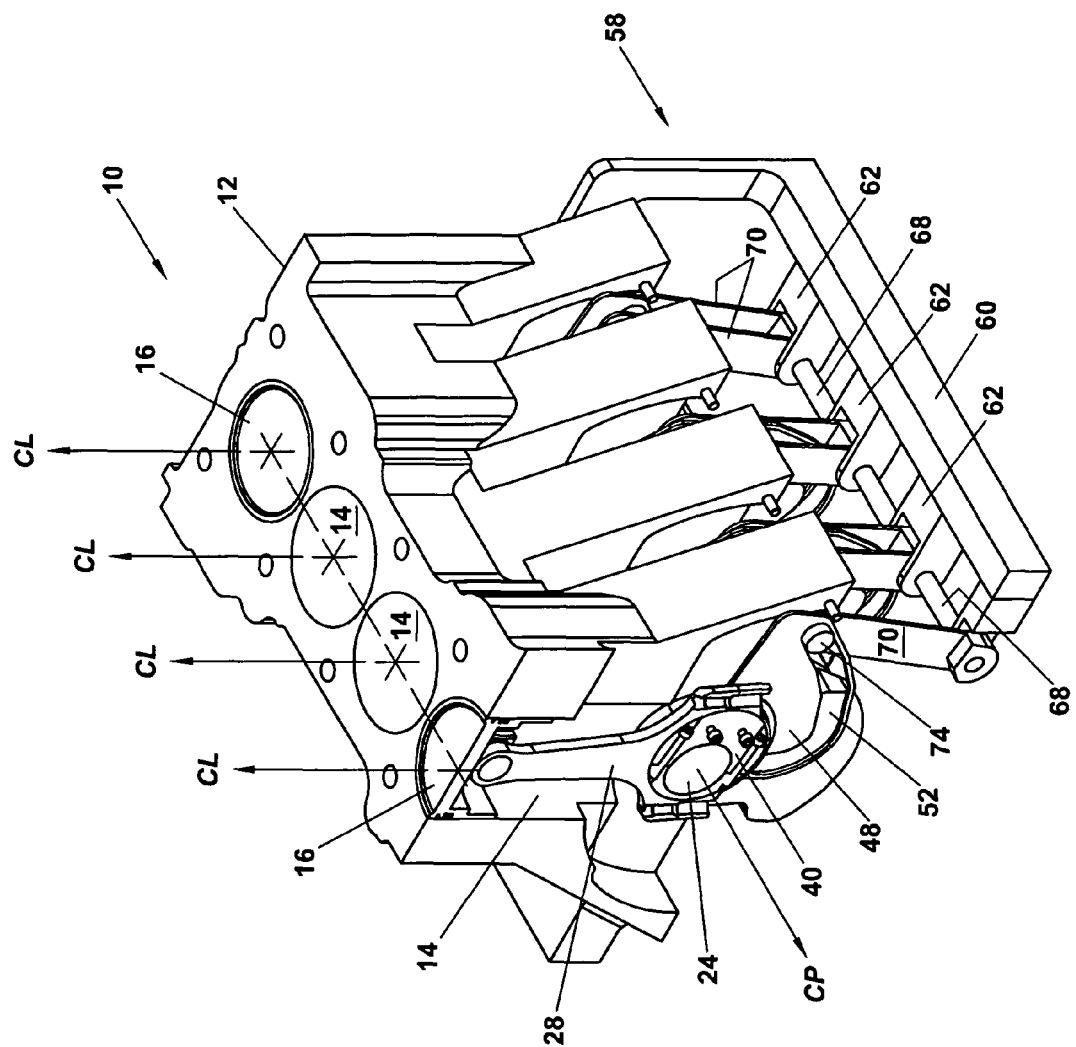
FIG. 26 is a schematic perspective partial section view of the exemplary embodiment shown in FIG. 20.

Referring to FIG. 24, exemplary bushing control assembly 42 includes one or more bushing control plates 48. Exemplary bushing control plates 48 define a clearance 50 for crankpins 24 and an elongated profile 52 having, for example, a predetermined shape, as explained in more detail herein. Bushing control plates 48 may also include one or more plate locator elements 54, which are configured to cooperate with locator elements 46 of bushings 40 in a complimentary manner in order to provide a predetermined relationship between bushings 40 and bushing control plate 48. For example, plate locator elements 54 may include a protrusion having a predetermined shape configured to fit within, for example, an elongated recess of locator element 46 of bushing 40. According to some embodiments, the protrusion may be part of bushing 40, and the recess may be defined by one or more bushing control plates 48.

According to some embodiments, bushing control assembly 40 includes two bushing control plates 48, for example, as shown in FIG. 24, which sandwich bushing 40, such that protrusion of plate locator element 54 extends through recess of locator element 46 of bushing 40, and bushing control plates 48 are coupled to one another via one or more fasteners 56, such as, for example, bolts.

Figure 20:
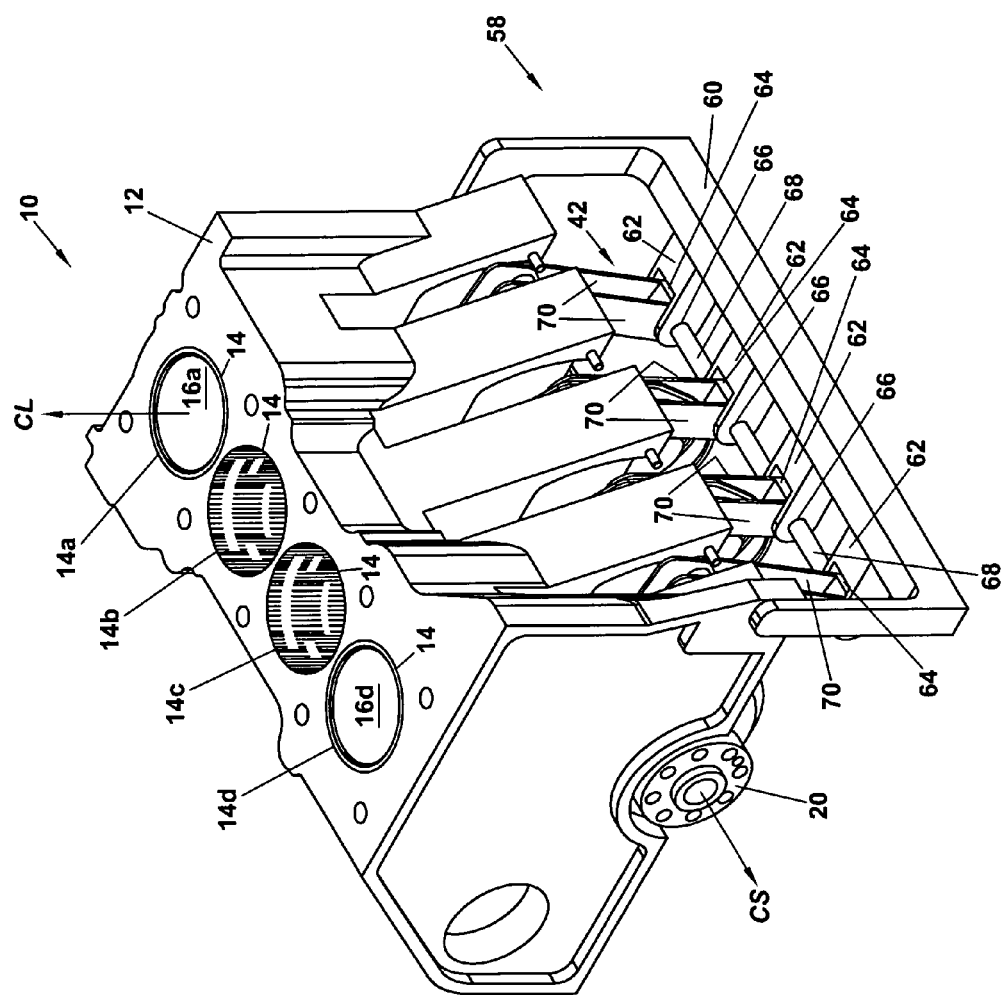
FIG. 20 is a schematic partial perspective view of another exemplary embodiment of an engine.
Figure 22:
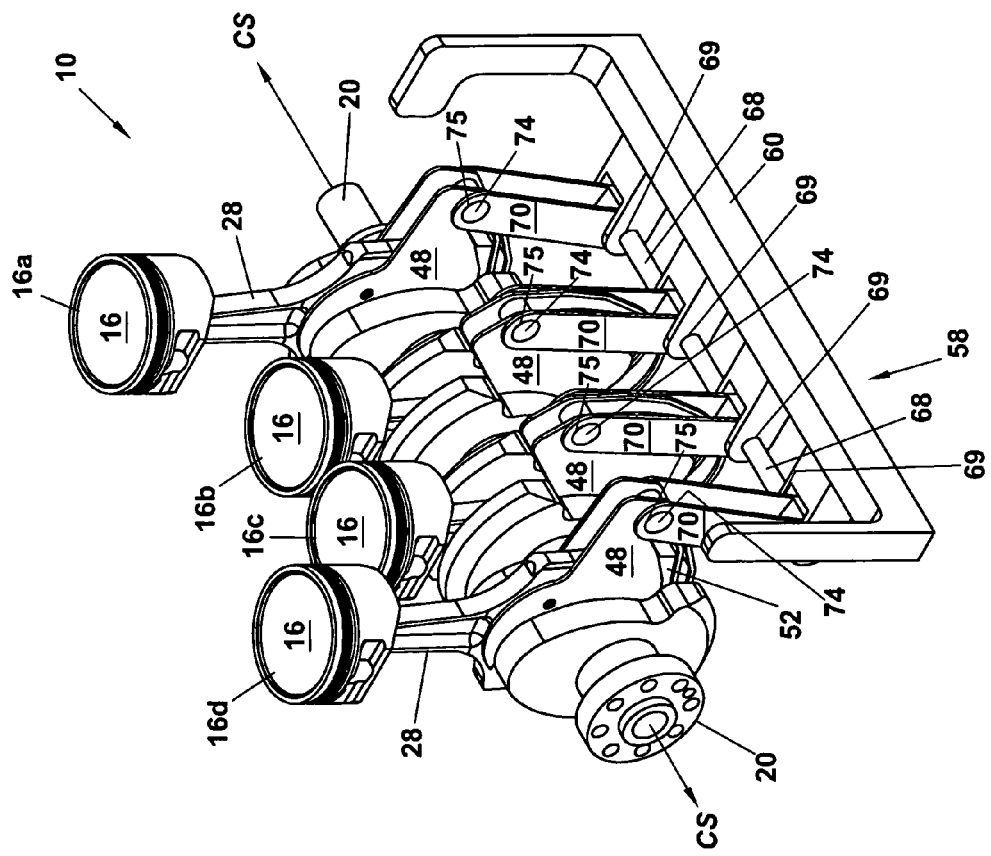
FIG. 22 is a schematic partial perspective view of a portion of the exemplary embodiment shown in FIG. 20.

Referring to FIGS. 20 and 22, a bracket 58 may be operably coupled to engine 10, for example, via cylinder block 12. Exemplary bracket 58 includes a member 60 extending longitudinally with respect to cylinder block 12 and one or more retainers 62 extending from member 60 toward cylinder block 12. Exemplary retainers 62 each define a space 64 and apertures 66 receiving a bushing control rod 68, which extends longitudinally with respect to cylinder block 12. According to the exemplary embodiment shown, a link 70 extends from bushing control rod 68 and terminate at a distal end defining an aperture 72 (see FIGS. 22 and 23). Link 70 may be implemented by one or a pair of links. A pin 74 operably couples each pair of links 70 to elongated profile 52 of bushing control plate 48, such that pins 74 are able to travel within elongated profile 52.

Figure 23:
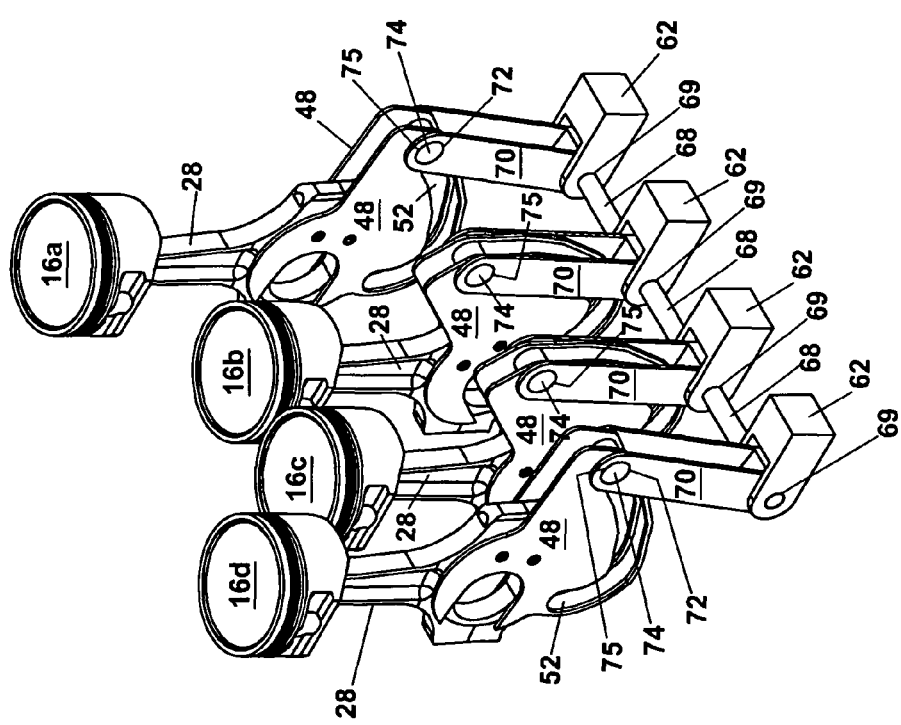
FIG. 23 is a schematic partial perspective view of a portion of the exemplary embodiment shown in FIG. 20.

In the exemplary embodiment shown in FIGS. 20-37, sleeves 69 may be provided on bushing control rods 68, and/or sleeves 75 may be provided on pins 74. For example, as shown in FIGS. 22 and 23, exemplary sleeves 69 are positioned between bushing control rods 68 and links 70, and exemplary sleeves 75 are positioned between pins 74 and elongate profiles 52 of respective bushing control plates 48. Sleeves 69 and 75 may be formed from, for example, hardened tool steel or a material having similar properties. Sleeves 69 and 75 may be, or may include, roller bearings. Sleeves 69 and/or 75 may serve to reduce friction and/or wear of elongate profiles 52, links 70, pins 74, and/or bushing control rods 68.

Figure 21:
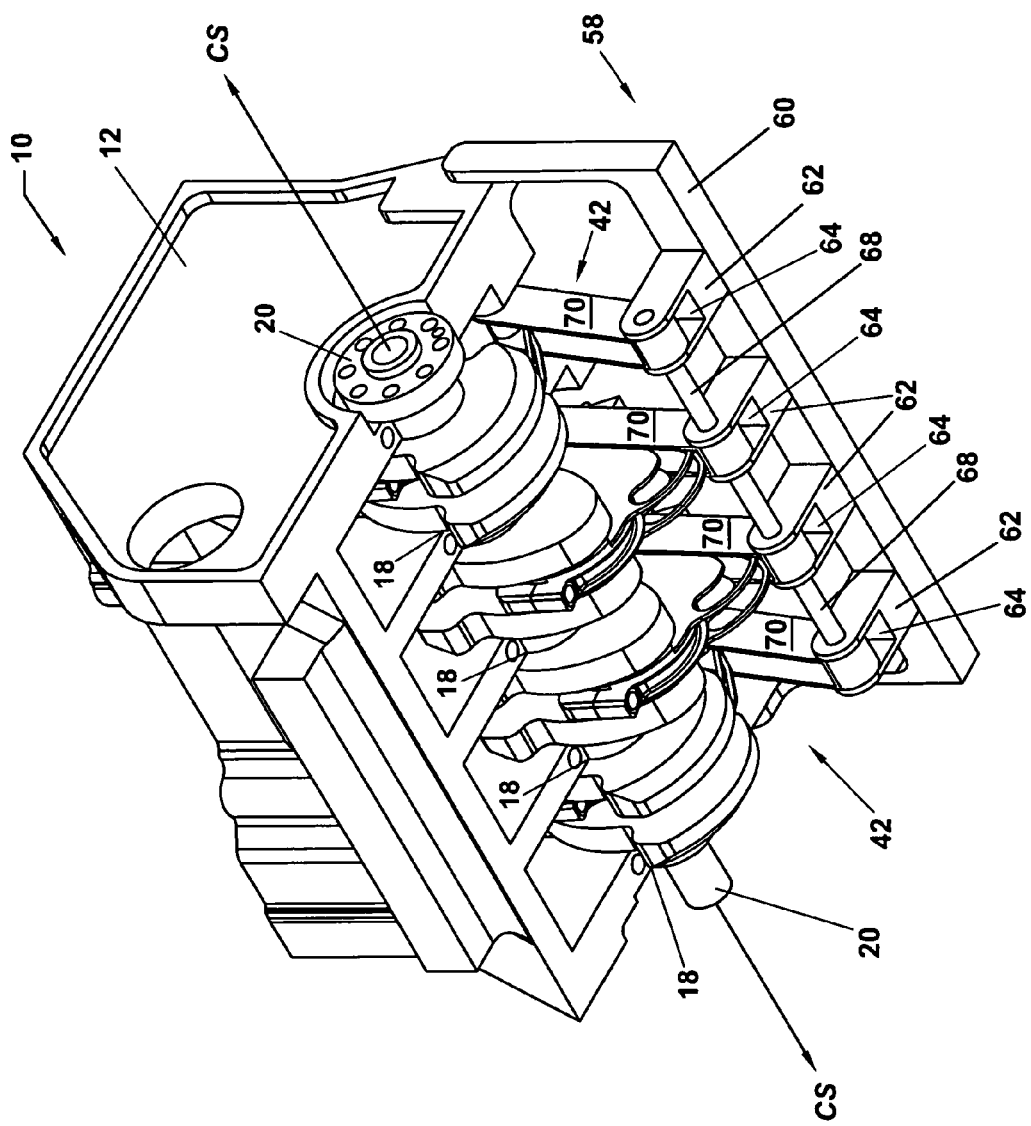
FIG. 21 is a schematic partial perspective view from below of the exemplary embodiment shown in FIG. 20.

As shown in FIGS. 20 and 21, links 70 are coupled to bushing control rod 68 and bushing control plates 48 in such a manner as to permit links 70 to pivot on bushing control rod 68 in an oscillating manner. As a result, as bushing control plates 48 move with respect to bushing control rod 68, pins 74 follow elongated profile 52. Thus, in the exemplary embodiment shown, elongated profile 52 of bushing control plates 48 functions as an internal cam, and pins 74 function as cam followers.

According to some embodiments, a biasing system (not shown) may be provided to bias the position of the ends of links 70 at pins 74 toward the right (as shown in FIGS. 27A-37). Such a biasing system may comprise, for example, one or more springs, pneumatic members, and/or hydraulic members.

As shown in FIGS. 20-23, the configuration of elongated profile 52 of bushing control plates 48 and links 70 may be tailored to control movement of bushings 40 with respect to respective connecting rods 28 and crankpins 34. Specifically, bushing control plates 48 are operably coupled to bushings 40 as outlined previously herein. Thus, as bushing control plates 48 oscillate with respect to connecting rods 28 and crankpins 24, bushing control plates 48 control orientation of bushings 40 within first end apertures 32 of connecting rods 28. Thus, as bushing control plates 48 oscillate based on the shape of elongated profile 52 and links 70, bushings 40 oscillate within first end apertures 32 of connecting rods 28. As a result, it is possible to tailor the oscillation of bushings 40 by changing the shape of elongated profile 52 of bushing control plates 48 and/or links 70, as explained in more detail herein, and alter the effective length LC of connecting rod 28.

FIGS. 25-37 schematically illustrate exemplary operation of engine 10 having exemplary bushings 40 and exemplary bushing control assembly 42, which serve to delay piston 16's travel at the beginning of the power stroke of engine 10. In particular, by placing exemplary bushing 40 between crankpin 24 and connecting rod 28, selective rotation of bushing 40 may be manipulated, such that the distance between the center CP of crankpin 24 and the center of second end aperture 36 of connecting rod 28 attached to piston 16 (e.g., the effective length LC, as shown in FIG. 4B) may be selectively varied. Such an exemplary embodiment renders it possible to effectively hold piston 16 in cylinder 14 at a substantially fixed position for a short period of time, even as crankpin 24 continues to revolve around crankshaft 20 as crankshaft 20 rotates. As a result, it is possible to hold piston 16 at the point of highest compression in the combustion chamber while crankpin 24 revolves to a position in which there is an increased moment arm formed between the connecting rod axis CR and the crankpin axis CP. In this exemplary manner, the delaying strategy outlined below may be implemented.

For example, as shown in FIGS. 27A and 27B, crankshaft 20 is oriented such that radial axis RA defined by the center of crankshaft 20 and the center of crankpin 24 is oriented at 0 degrees, which corresponds generally a first stroke termination angle $\theta_1$, that generally coincides with the end of the compression stroke. As shown in FIG. 27A, bushing 40 is oriented relative to connecting rod 28, such that the effective length LC of connecting rod 28 is generally unaltered. As shown in FIG. 27B, bushing control plate 48 and link 70 are related to one another such that pin 74 is positioned at a proximal end (with respect to link 70) of elongated profile 52. In this orientation, piston 16 is located generally at its farthest point from crankshaft axis CS, its maximum stroke.

Figure 28:
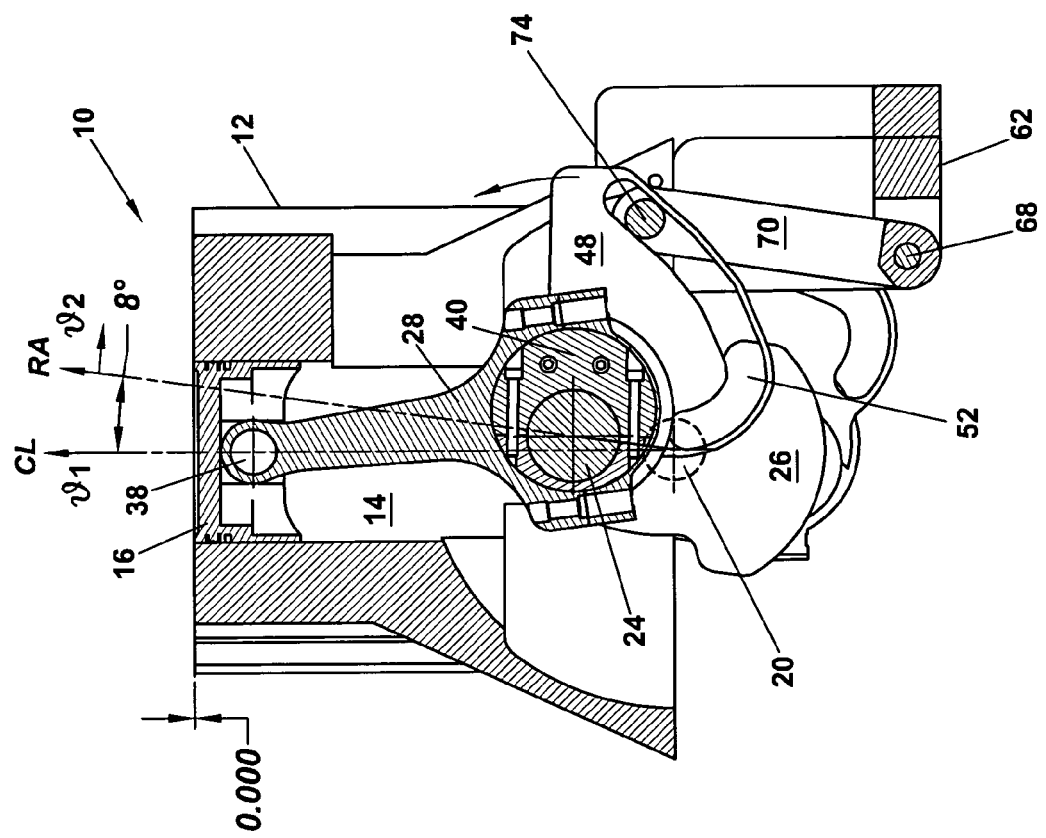
FIG. 28 is a schematic partial section end view of the exemplary embodiment shown in FIG. 20 with the crankshaft at 8 degrees.

Referring to FIG. 28, radial axis RA of crankshaft 20 and crankpin 24 has rotated 8 degrees from first stroke termination angle $\theta_1$. In a conventional engine, such rotation would result in a substantial amount of movement of piston 16 downward away from the point of maximum stroke. As can be seen in FIG. 28, however, piston 16 has not moved from the point of maximum stroke. This results from slight rotation of bushing 40 within first end aperture 36 of connecting rod 28, which compensates for the movement of crankpin 24, the effective length LC of connecting rod 28 growing to offset the downward portion of the motion of crankpin 24's center. Movement of bushing 40 is controlled by virtue of movement of bushing control plate 48, which results from interaction between elongated profile 52, link 70, and pin 74. As can be seen, pin 74 has moved away from the proximal end of elongated profile 52 by virtue of movement of crankpin 24 toward link 70 and pin 74.

Figure 29:
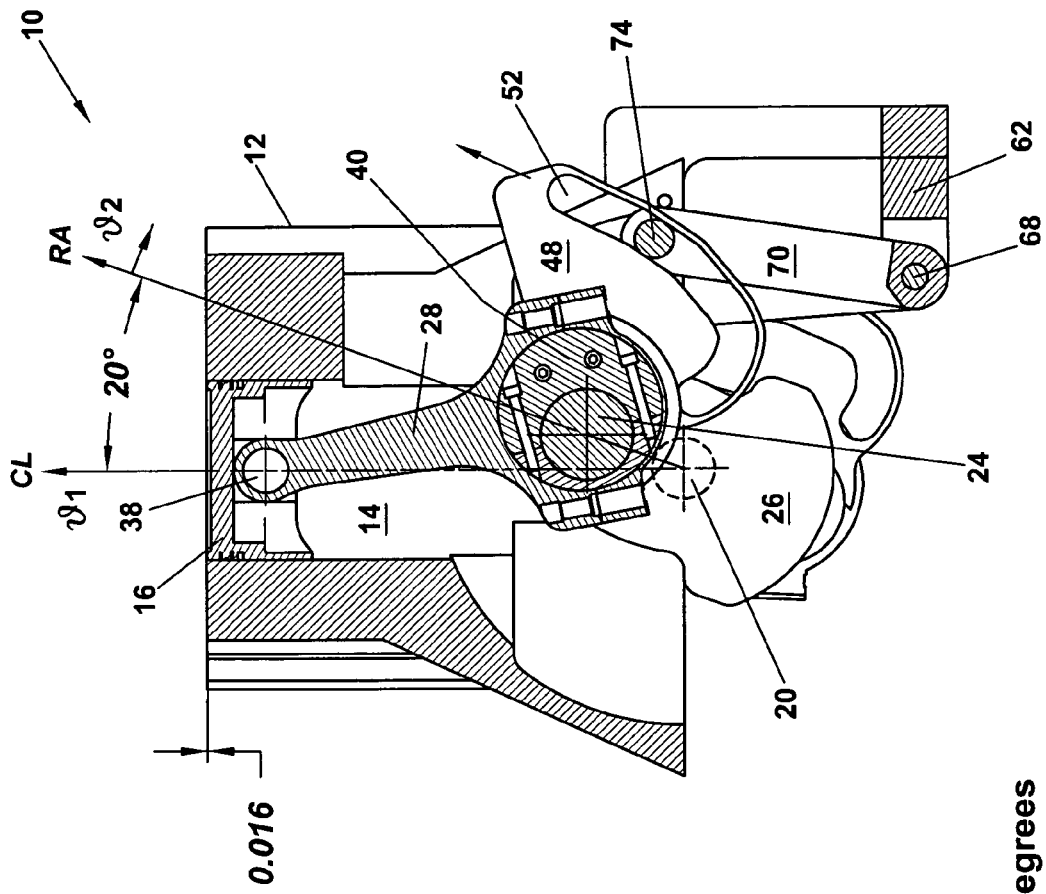
FIG. 29 is a schematic partial section end view of the exemplary embodiment shown in FIG. 20 with the crankshaft at 20 degrees.

Referring to FIG. 29, radial axis RA of crankshaft 20 and crankpin 24 has rotated 20 degrees from first stroke termination angle $\theta_1$. In a conventional engine, such rotation would result in a significant amount of movement of piston 16 downward away from the point of maximum stroke. As can be seen in FIG. 29, however, piston 16 has moved only 0.016 inch from the point of maximum stroke. This results from a more significant amount of rotation of bushing 40 (in the counterclockwise direction, as shown) within first end aperture 36 of connecting rod 28, which compensates for the movement of crankpin 24, the effective length LC of connecting rod 28 increasing to offset the downward portion of the motion of crankpin 24's center. Movement of bushing 40 is controlled by virtue of movement of bushing control plate 48, which results from interaction between elongated profile 52, link 70, and pin 74. As can be seen in FIG. 29, pin 74 has moved farther away from the proximal end of elongated profile 52 relative to FIG. 28 by virtue of movement of crankpin 24 farther toward link 70 and pin 74.

Figure 30:
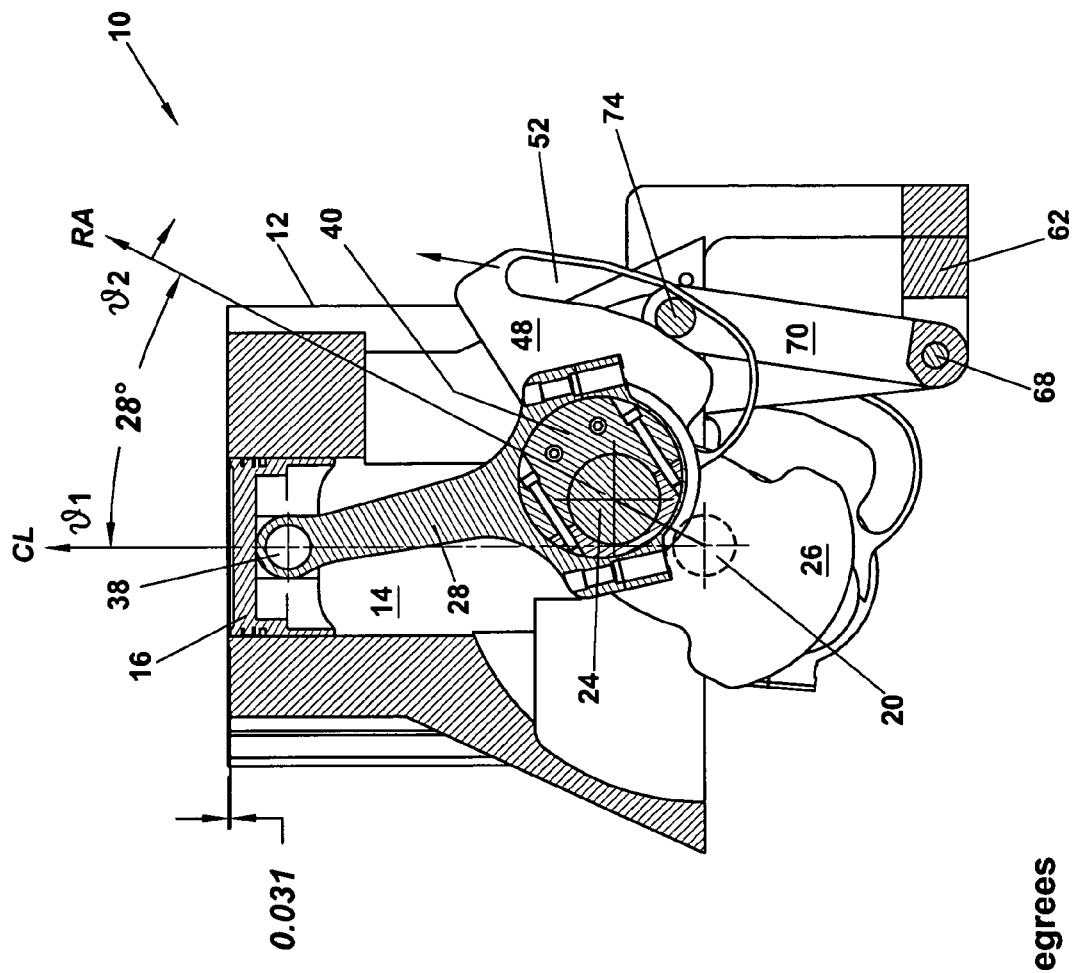
FIG. 30 is a schematic partial section end view of the exemplary embodiment shown in FIG. 20 with the crankshaft at 28 degrees.

As shown in FIG. 30, radial axis RA of crankshaft 20 and crankpin 24 has rotated 28 degrees from first stroke termination angle $\theta_1$. In a conventional engine, such rotation would result in a very significant amount of movement of piston 16 downward away from the point of maximum stroke. As can be seen in FIG. 30, piston 16 has moved only 0.031 inch from the point of maximum stroke. This results from a more significant amount of rotation of bushing 40 in the counterclockwise direction within first end aperture 36 of connecting rod 28, which compensates for the movement of crankpin 24, the effective length LC of connecting rod 28 continuing to increase to offset the downward portion of the motion of crankpin 24's center. As can be seen in FIG. 30, pin 74 has moved even farther away from the proximal end of elongated profile 52 relative to FIG. 29 by virtue of movement of crankpin 24 farther toward link 70 and pin 74.

Figure 31:
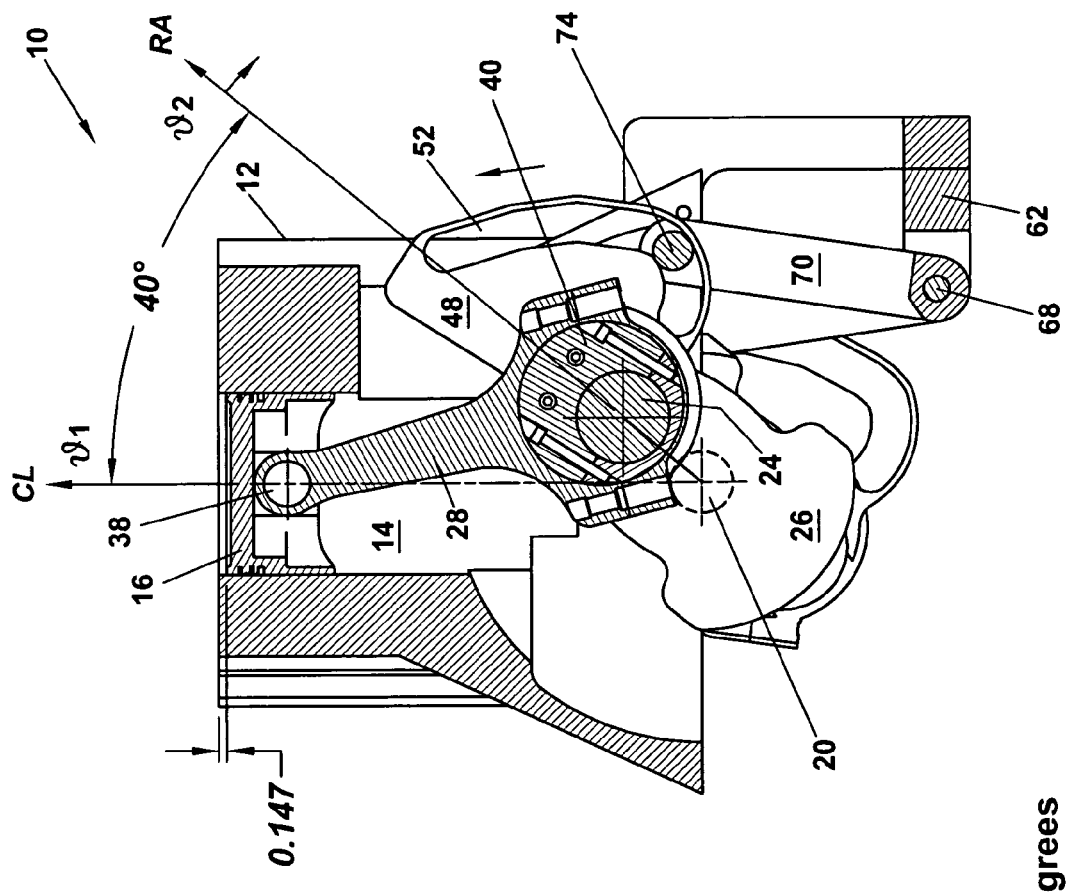
FIG. 31 is a schematic partial section end view of the exemplary embodiment shown in FIG. 20 with the crankshaft at 40 degrees.

As shown in FIG. 31, radial axis RA of crankshaft 20 and crankpin 24 has rotated 40 degrees from first stroke termination angle $\theta_1$, and still piston 16 has moved only 0.147 inch from the point of maximum stroke. Bushing 40 has continued to rotate even farther in the counterclockwise direction within first end aperture 36 of connecting rod 28, thereby continuing to compensate for movement of crankpin 24, the effective length LC of connecting rod 28 continuing to increase to offset the downward portion of the motion of crankpin 24's center. As a result of interaction between elongated profile 52, link 70, and pin 74, pin 74 has moved even farther away from the proximal end of elongated profile 52 relative to FIG. 30 by virtue of movement of crankpin 24 farther toward link 70 and pin 74.

Figure 32:
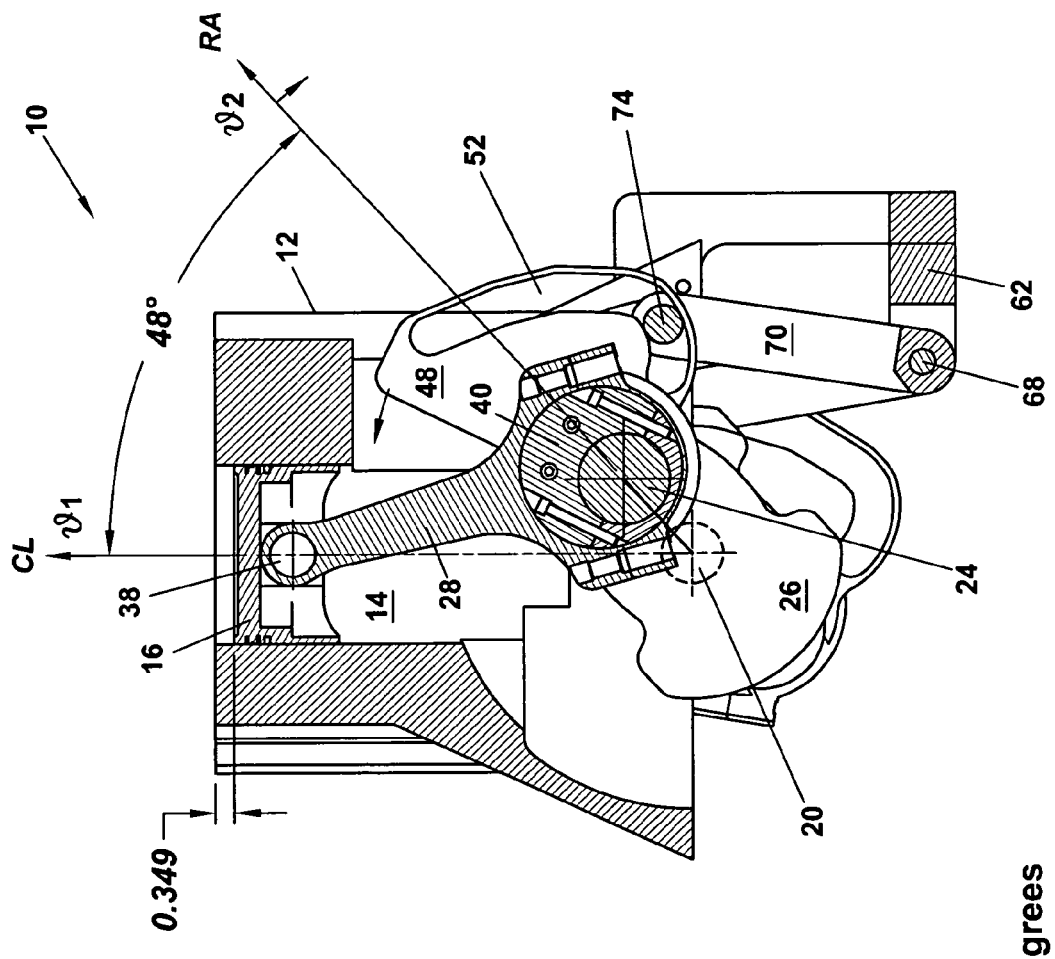
FIG. 32 is a schematic partial section end view of the exemplary embodiment shown in FIG. 20 with the crankshaft at 48 degrees.

Referring to FIG. 32, radial axis RA of crankshaft 20 and crankpin 24 has rotated 48 degrees from first stroke termination angle $\theta_1$, and piston 16 has started to exhibit a substantial amount of movement of 0.349 inch from the point of maximum stroke. Thus, while it took 40 degrees of crankshaft rotation for piston 16 to move 0.147 inch, in the 8 degrees between 40 degrees and 48 degrees, piston 16 moved an additional 0.202 inch from the point of maximum stroke. Although bushing 40 has continued to rotate even farther in the counterclockwise direction within first end aperture 36 of connecting rod 28, the effect of the rotation no longer significantly compensates for movement of crankpin 24, as the effective length LC of connecting rod 28 approaches its maximum. As a result of interaction between elongated profile 52, link 70, and pin 74, pin 74 has moved only slightly in elongated profile 52 relative to FIG. 31.

Figure 33:
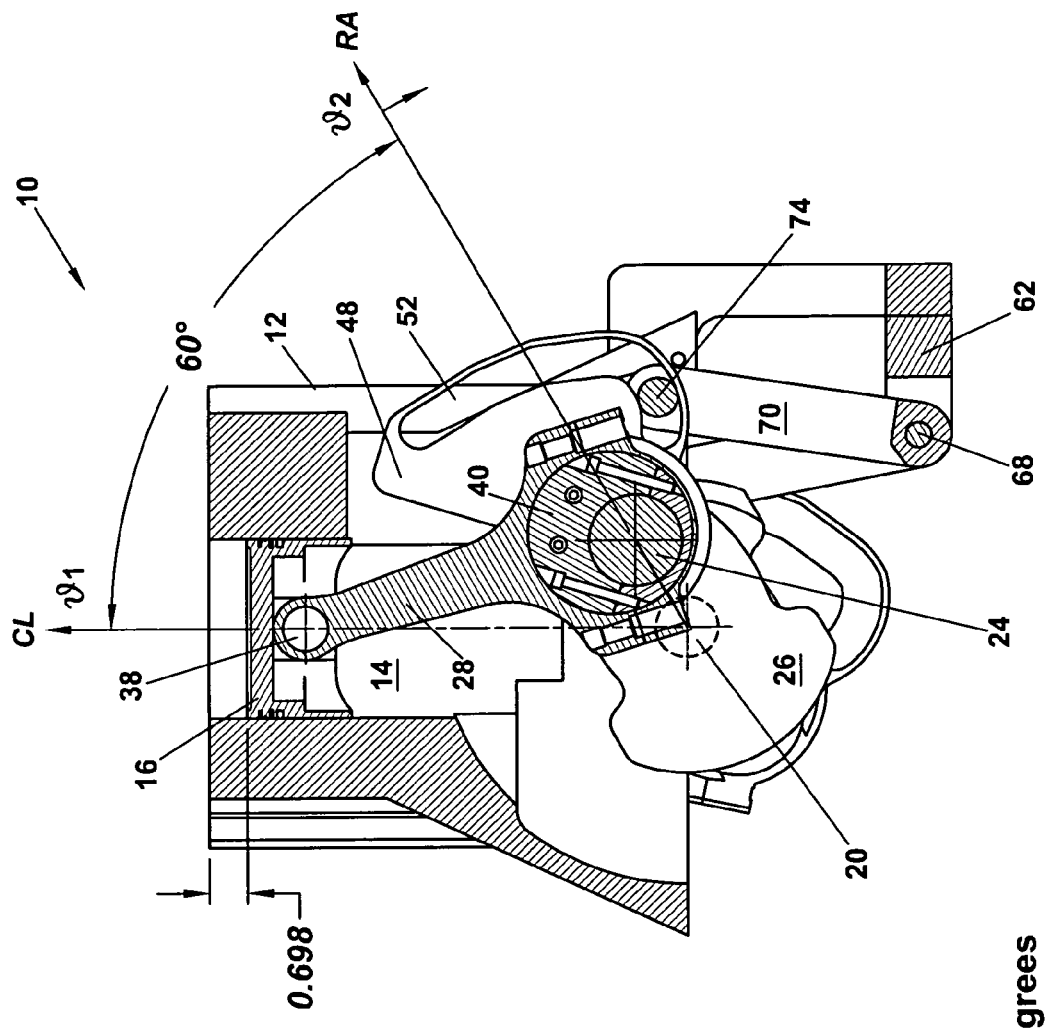
FIG. 33 is a schematic partial section end view of the exemplary embodiment shown in FIG. 20 with the crankshaft at 60 degrees.

FIG. 33 shows radial axis RA of crankshaft 20 and crankpin 24 as having rotated 60 degrees from first stroke termination angle $\theta_1$, and piston 16 exhibits a significant movement of 0.698 inch from the point of maximum stroke. Although bushing 40 has continued to rotate even farther in the counterclockwise direction within first end aperture 36 of connecting rod 28, the effect of the rotation no longer significantly compensates for movement of crankpin 24, as the effective length LC of connecting rod 28 has generally approached its maximum. As a result of interaction between elongated profile 52, link 70, and pin 74, pin 74 has moved only slightly in elongated profile 52 relative to FIG. 32.

Figure 34:
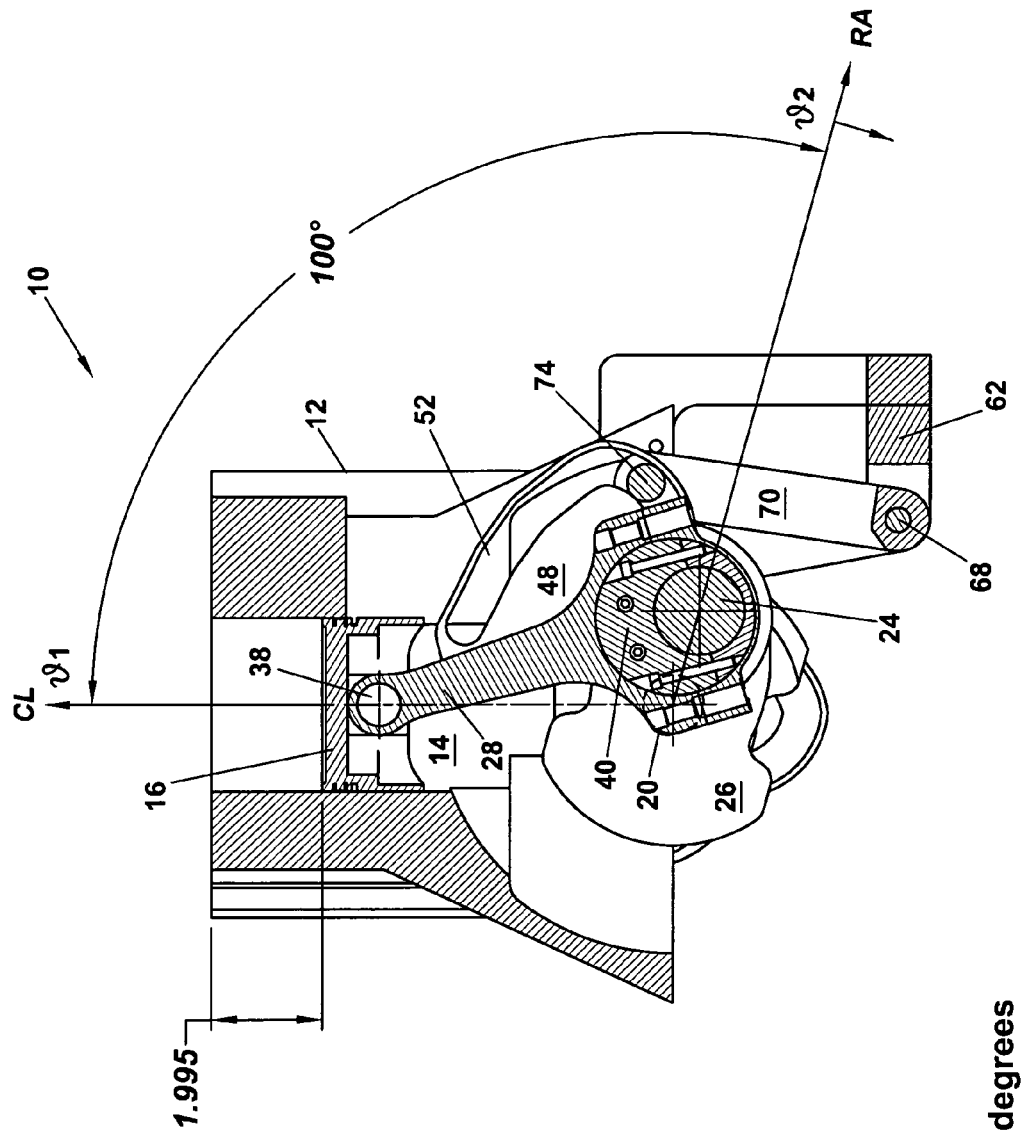
FIG. 34 is a schematic partial section end view of the exemplary embodiment shown in FIG. 20 with the crankshaft at 100 degrees.
Figure 35B:
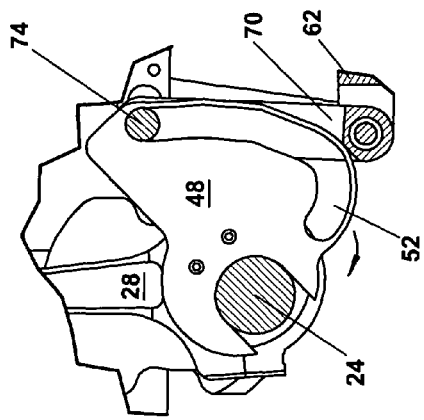
FIG. 35B is a detail view of a portion of FIG. 35A.
Figure 35A:
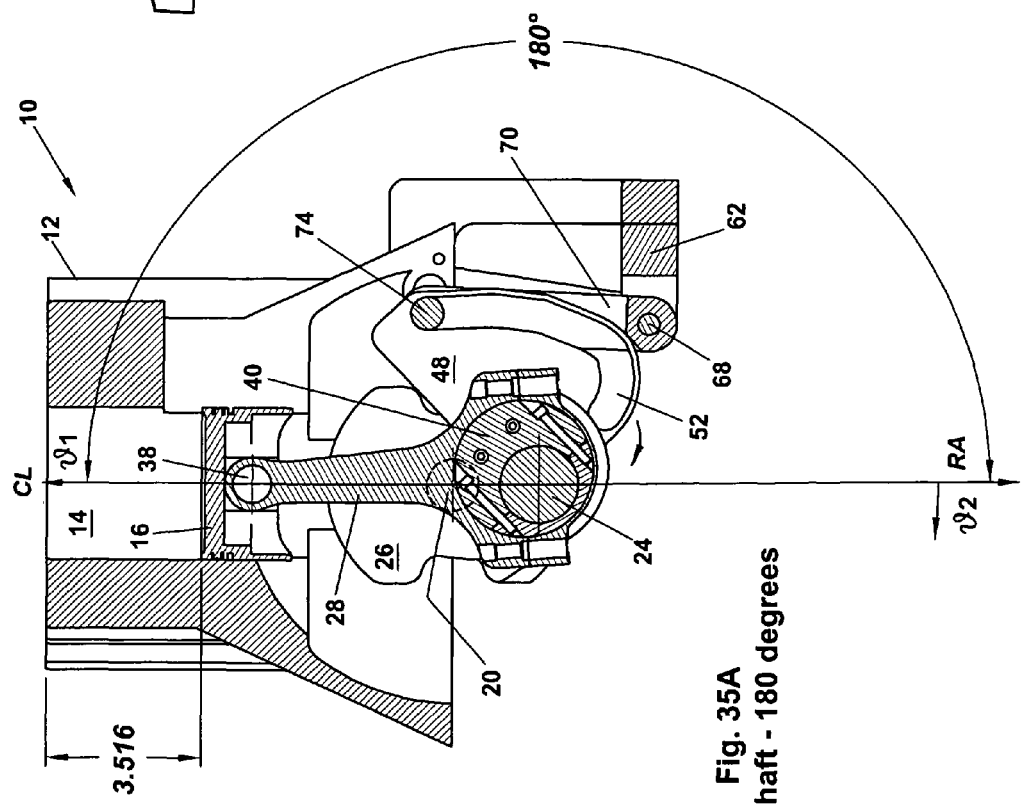
FIG. 35A is a schematic partial section end view of the exemplary embodiment shown in FIG. 20 with the crankshaft at 180 degrees.

In FIG. 34, radial axis RA of crankshaft 20 and crankpin 24 has rotated 100 degrees from first stroke termination angle $\theta_1$, and piston 16 has moved 1.995 inches from the point of maximum stroke. FIGS. 35A and 35B show radial axis RA of crankshaft 20 and crankpin 24 rotated 180 degrees from first stroke termination angle $\theta_1$, such that radial axis RA has reached a second stroke termination angle $\theta_2$ (i.e, the point of minimum stroke), and piston 16 has moved 3.516 inches from the point of maximum stroke. As can be seen in FIGS. 35A and 35B, bushing 40 and bushing control plate 48 have started to reverse direction of rotation, now rotating clockwise, as shown. As a result of interaction between elongated profile 52, link 70, and pin 74, pin 74 has moved back to the proximal end of elongated profile 52 by virtue of movement of crankpin 24 farther downward and away from link 70 and pin 74.

Figure 36:
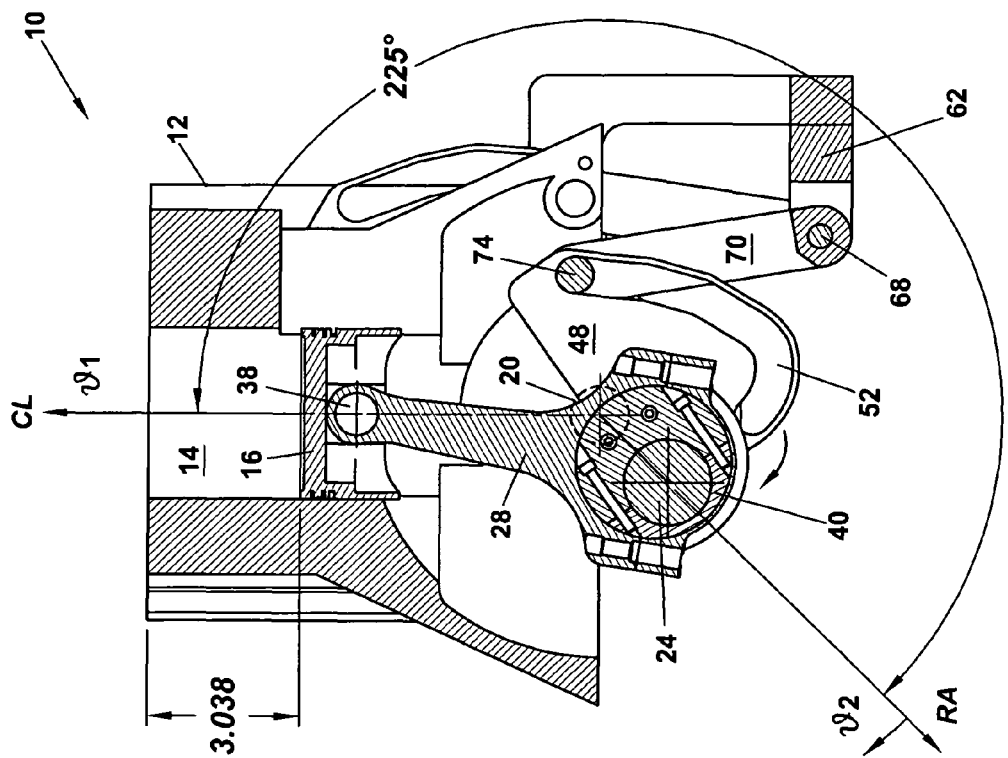
FIG. 36 is a schematic partial section end view of the exemplary embodiment shown in FIG. 20 with the crankshaft at 225 degrees.

Referring to FIG. 36, radial axis RA of crankshaft 20 and crankpin 24 has rotated 225 degrees from first stroke termination angle $\theta_1$, such that piston 16 has reversed direction and has started to travel back toward the point of maximum stroke and is 3.038 inches from the point of maximum stroke. As can be seen in FIG. 36, bushing 40 and bushing control plate 48 continue rotate clockwise. As a result of interaction between elongated profile 52, link 70, and pin 74, pin 74 is still located at the proximal end of elongated profile 52 due to movement of crankpin 24 even farther away from link 70 and pin 74 relative to FIGS. 35A and 35B.

Figure 37:
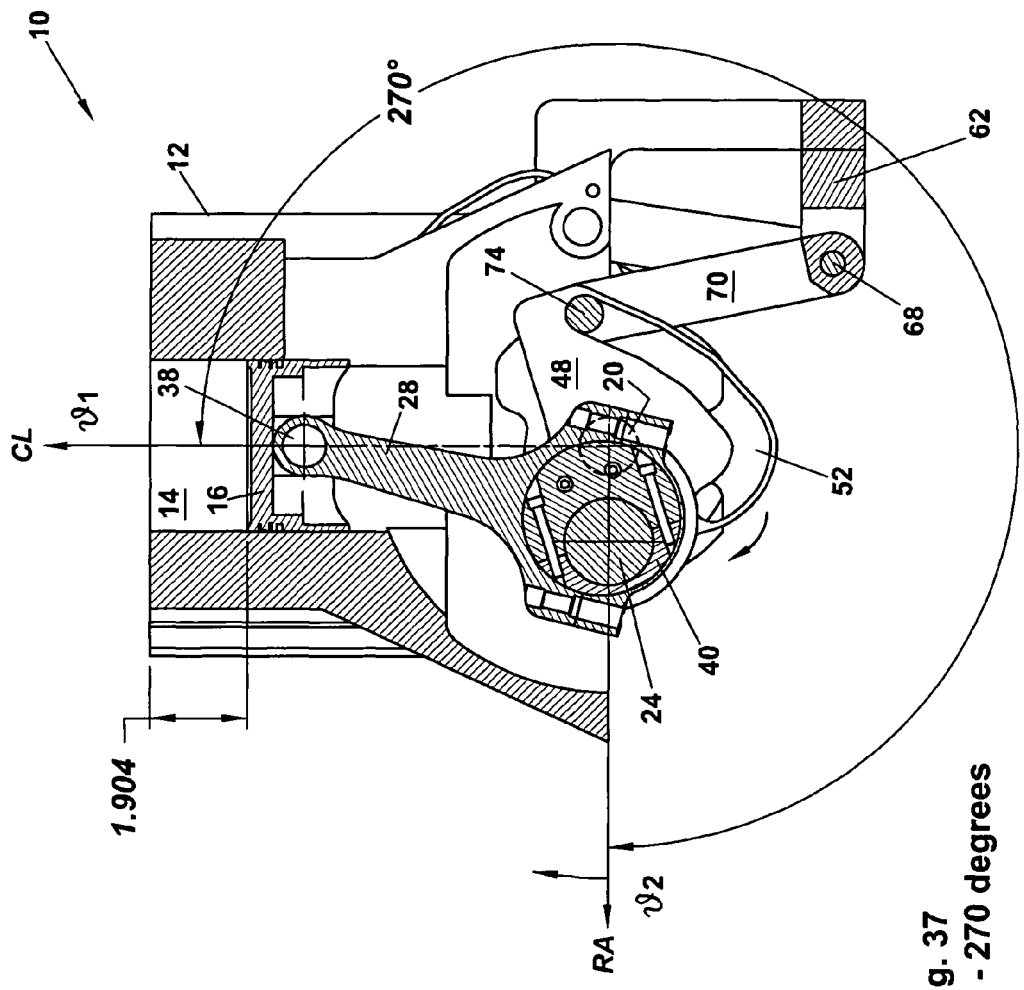
FIG. 37 is a schematic partial section end view of the exemplary embodiment shown in FIG. 20 with the crankshaft at 270 degrees.
Figure 38:
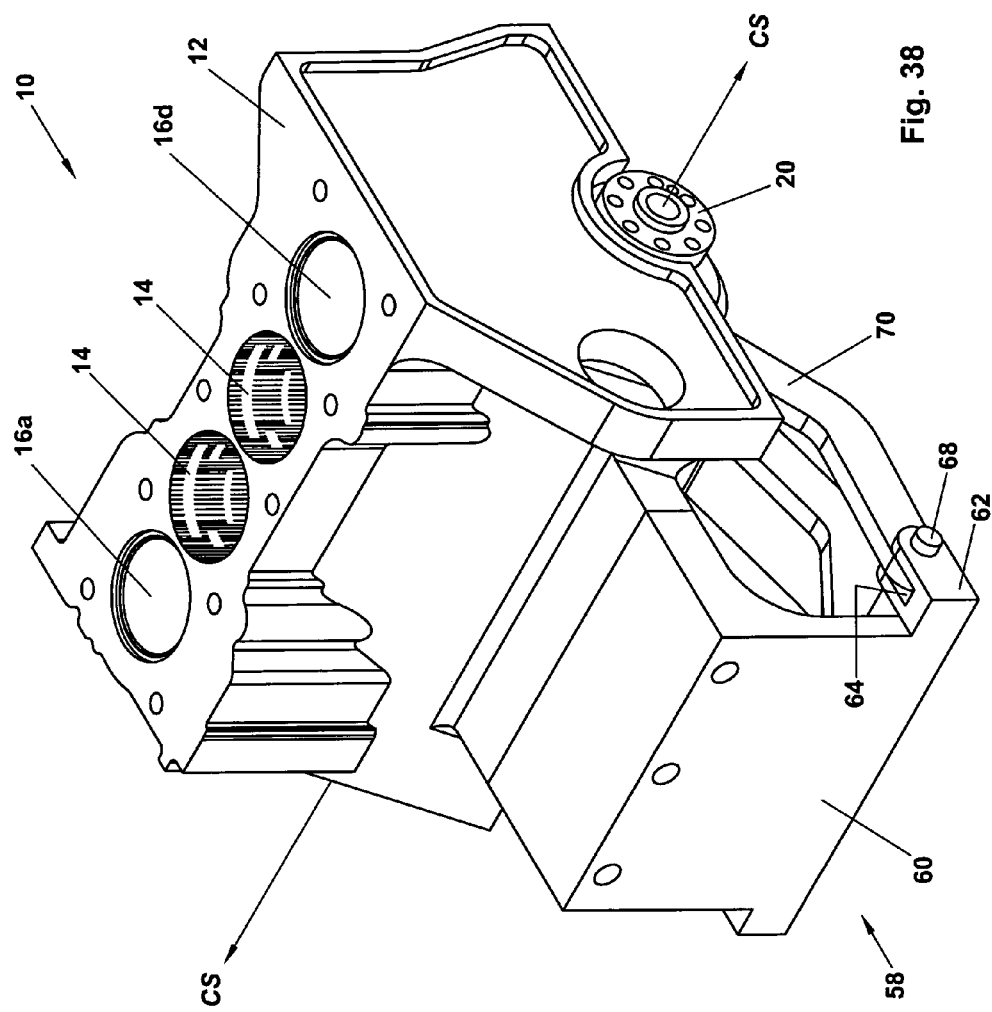
FIG. 38 is a schematic partial perspective view of still another exemplary embodiment of an engine.

In FIG. 37, radial axis RA of crankshaft 20 and crankpin 24 has rotated 270 degrees from first stroke termination angle $\theta_1$, and piston 16 continues to travel back toward the point of maximum stroke and is 1.904 inches from the point of maximum stroke. As can be seen in FIG. 37, bushing 40 and bushing control plate 48 continue rotate clockwise. As a result of interaction between elongated profile 52, links 70, and pin 74, pin 74 remains located at the proximal end of elongated profile 52 due to movement of crankpin 24 even farther away from links 70 and pin 74 relative to FIG. 36. As bushing 40 and bushing control plate 48 continue rotate clockwise, they return to the relative orientations shown in FIGS. 27A and 27B, which coincide with radial axis RA being at the first stroke termination angle $\theta_1$ of 0 degrees.

Thus, as demonstrated by the exemplary embodiment shown in FIGS. 27A-37, the effective length of connecting rod 28 is controlled to delay and slow the downward travel of piston 16 based on the configuration of and/or interaction between bushing 40, bushing control plate 48, elongated profile 52, link 70, and pin 74. According to some embodiments, this configuration and/or interaction can be tailored to achieve desired performance characteristics of exemplary engine 10, such as, for example, improved efficiency, improved power output, improved responsiveness, and/or improved torque. For example, the shape of elongated profile 52 may be tailored to improve efficiency and/or power of exemplary engine 10.

According to some embodiments, bushing control rod 68 may be fixed relative to cylinder block 12. According to other embodiments, bushing control rod 68 may be movably coupled with respect to cylinder block 12, such that, for example, movement of bushing control rod 68 changes at least one of the timing and magnitude of the delay of initiation of the power stroke.

According to some embodiments, initiation of the power stroke of exemplary engine 10 may be delayed until crankshaft 20 has rotated at least about 15 degrees beyond the first stroke termination angle $\theta_1$ of the compression stroke. In other embodiments, initiation of the power stroke may be delayed until crankshaft 20 has rotated at least about 20 degrees beyond the first stroke termination angle $\theta_1$ of the compression stroke (e.g., at least about 25 degrees beyond the first stroke termination angle $\theta_1$). In other embodiments, rotation may be set to about 30, 35, or 40 degrees (see, e.g., FIG. 31) beyond the first stroke termination angle $\theta_1$ of the compression stroke.

FIGS. 38-55 schematically illustrate another exemplary embodiment of engine 10. Exemplary engine 10 shown in FIGS. 38-55 is similar to exemplary engines 10 shown in FIGS. 1-37. For example, exemplary engine 10 shown in FIGS. 38-55 includes a bracket 58 operably coupled to engine 10, for example, via cylinder block 12. Exemplary bracket 58 includes a member 60 extending longitudinally with respect to cylinder block 12 and one or more retainers 62 extending from member 60 toward cylinder block 12. Exemplary retainers 62 each define a space 64 and apertures 66 receiving a bushing control rod 68, which extends longitudinally with respect to cylinder block 12. According to the exemplary embodiment shown, a link 70 extends from bushing control rod 68 and terminates at a distal end defining an aperture 72. In one embodiment, a pin 74 operably couples a pair of links 70 to a bushing control plate 48.

Figure 39:
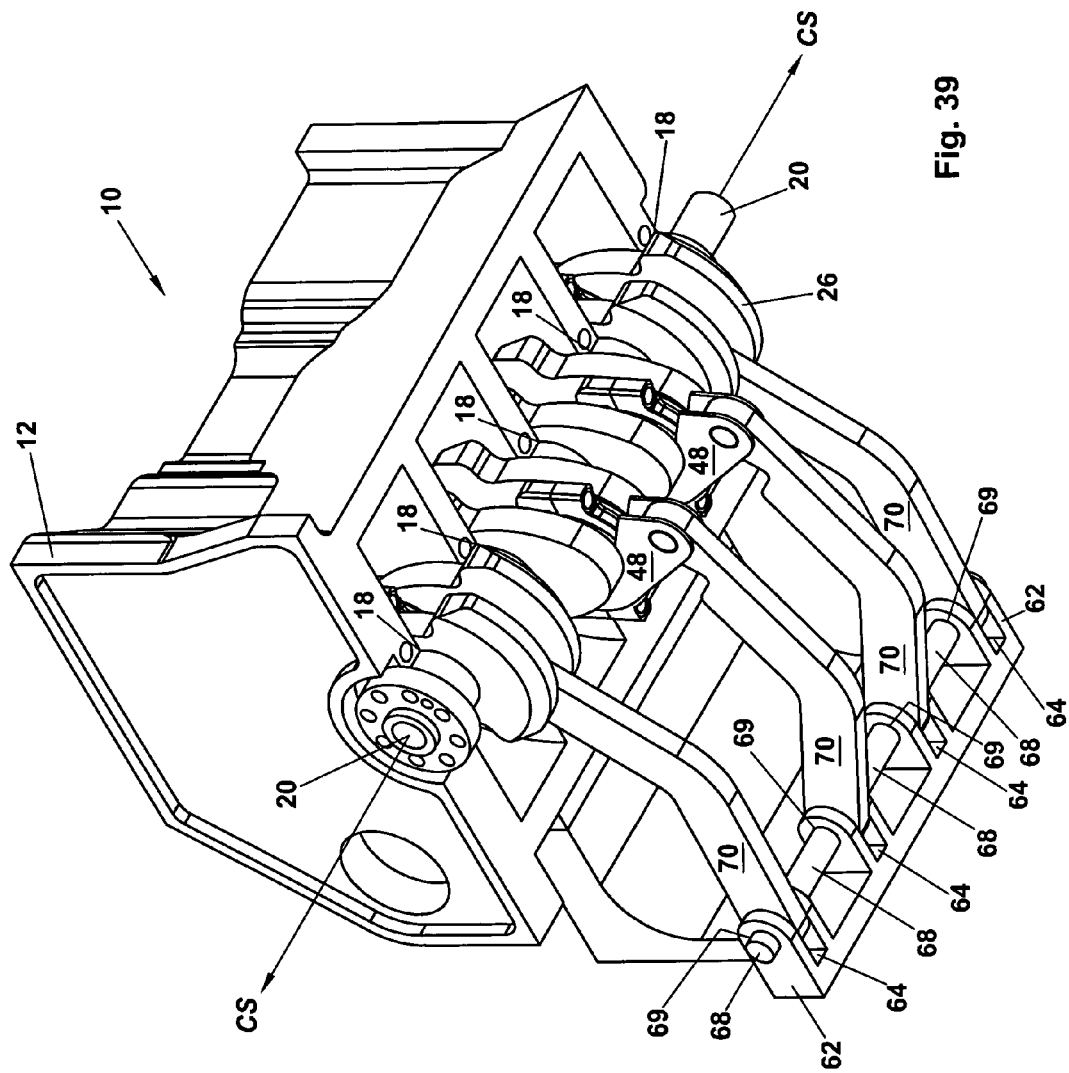
FIG. 39 is a schematic partial perspective view from below of the exemplary embodiment shown in FIG. 38.
Figure 40:
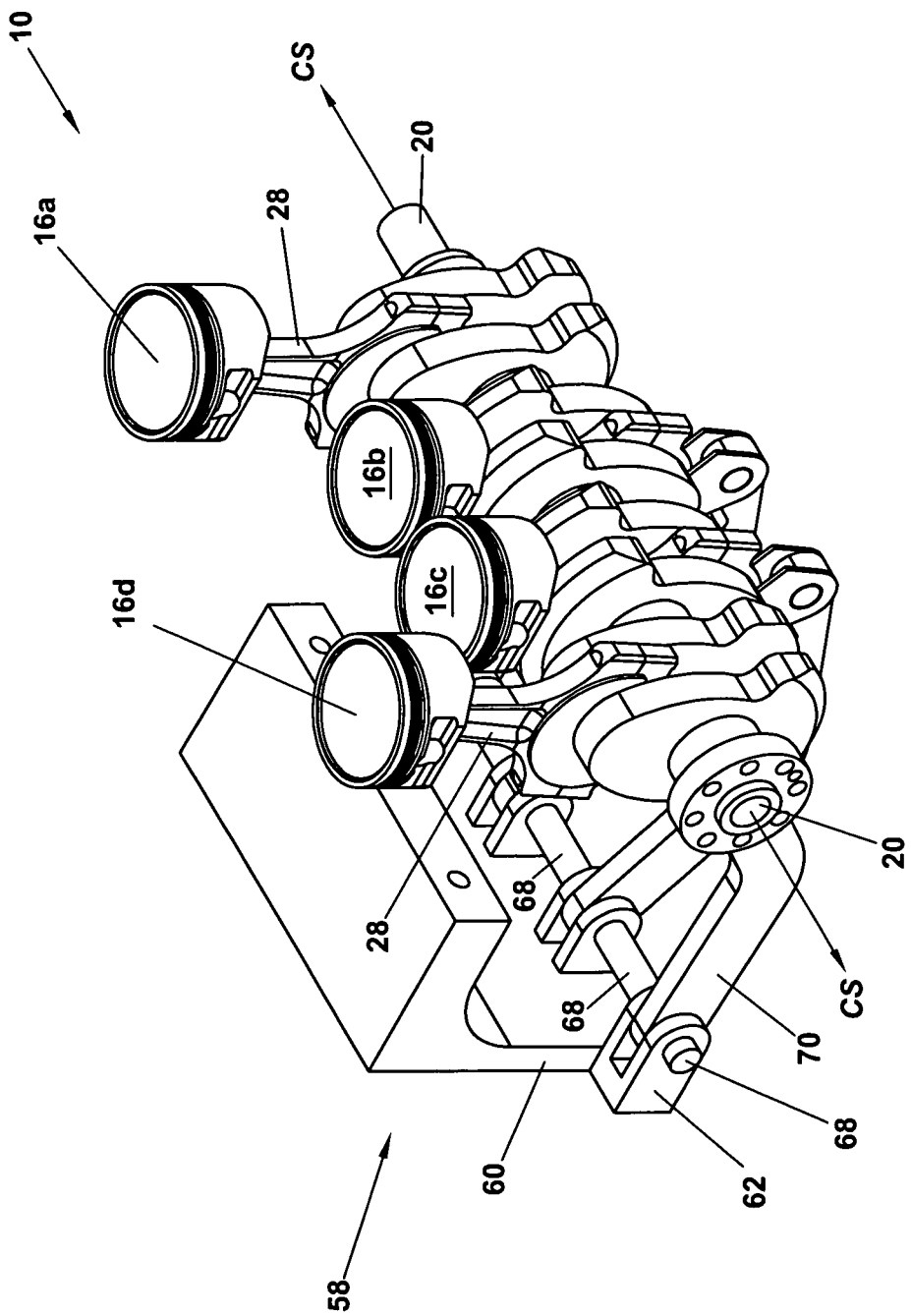
FIG. 40 is a schematic partial perspective view of a portion of the exemplary embodiment shown in FIG. 38.
Figure 41:
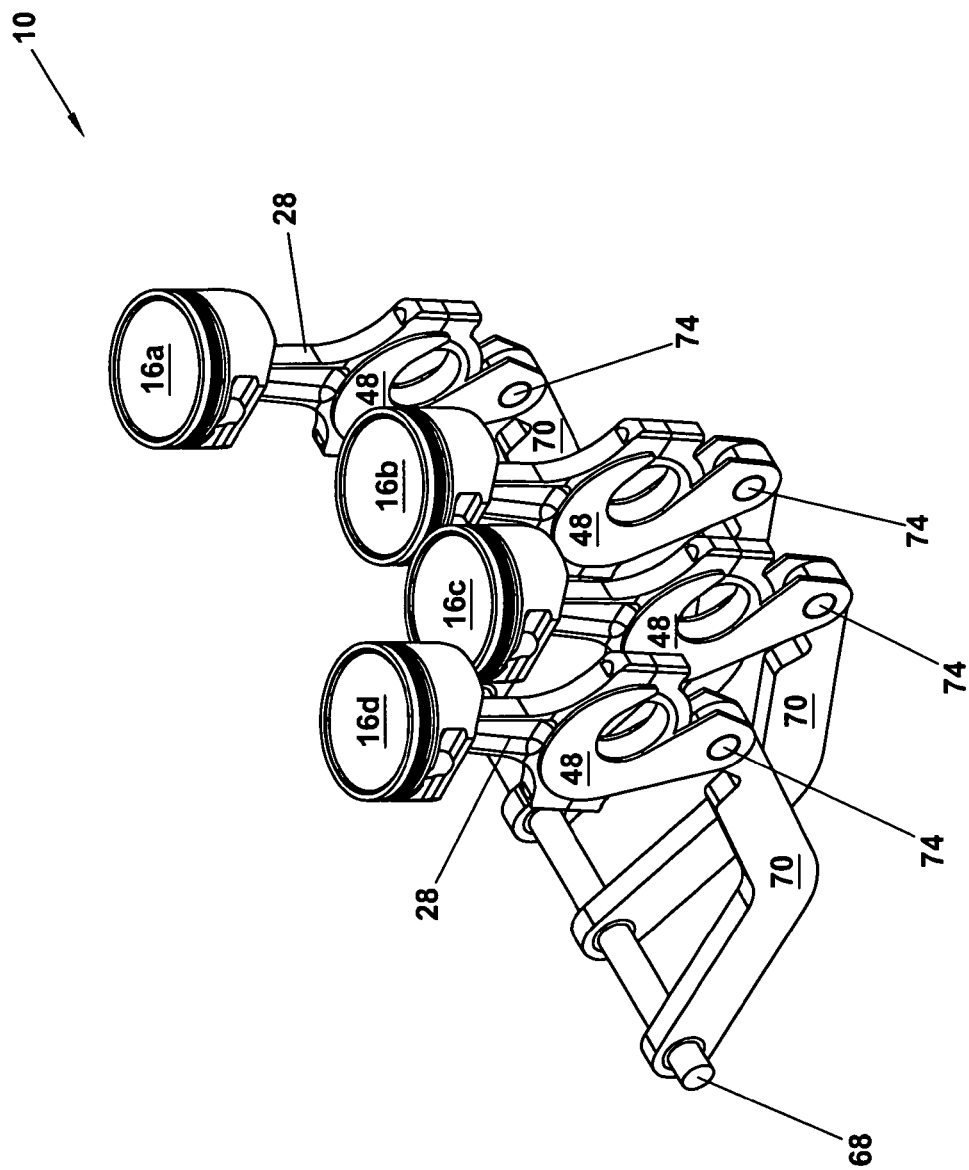
FIG. 41 is a schematic partial perspective view of a portion of the exemplary embodiment shown in FIG. 38.
Figure 44:
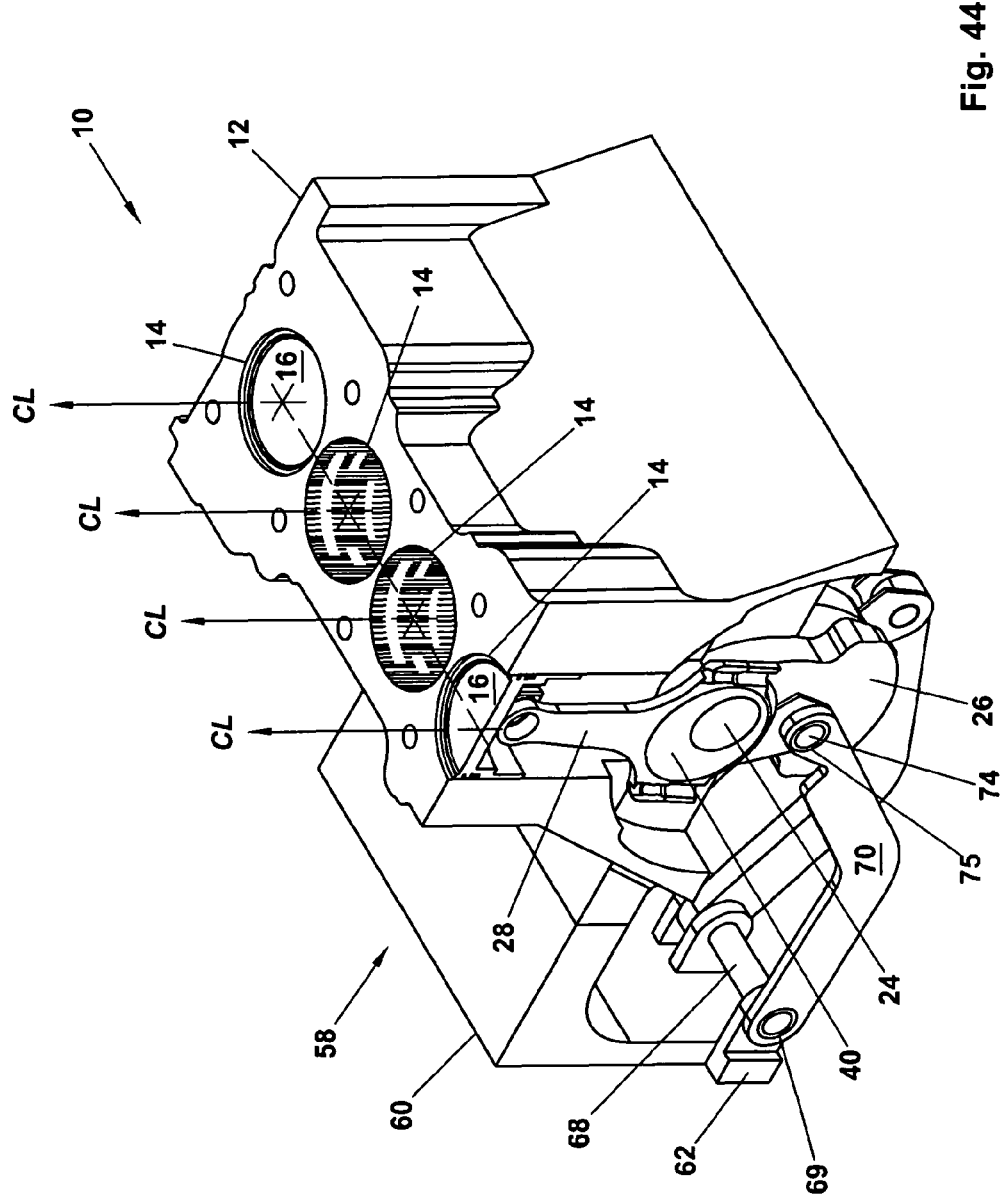
FIG. 44 is a schematic perspective partial section view of the exemplary embodiment shown in FIG. 38.
Figure 45:
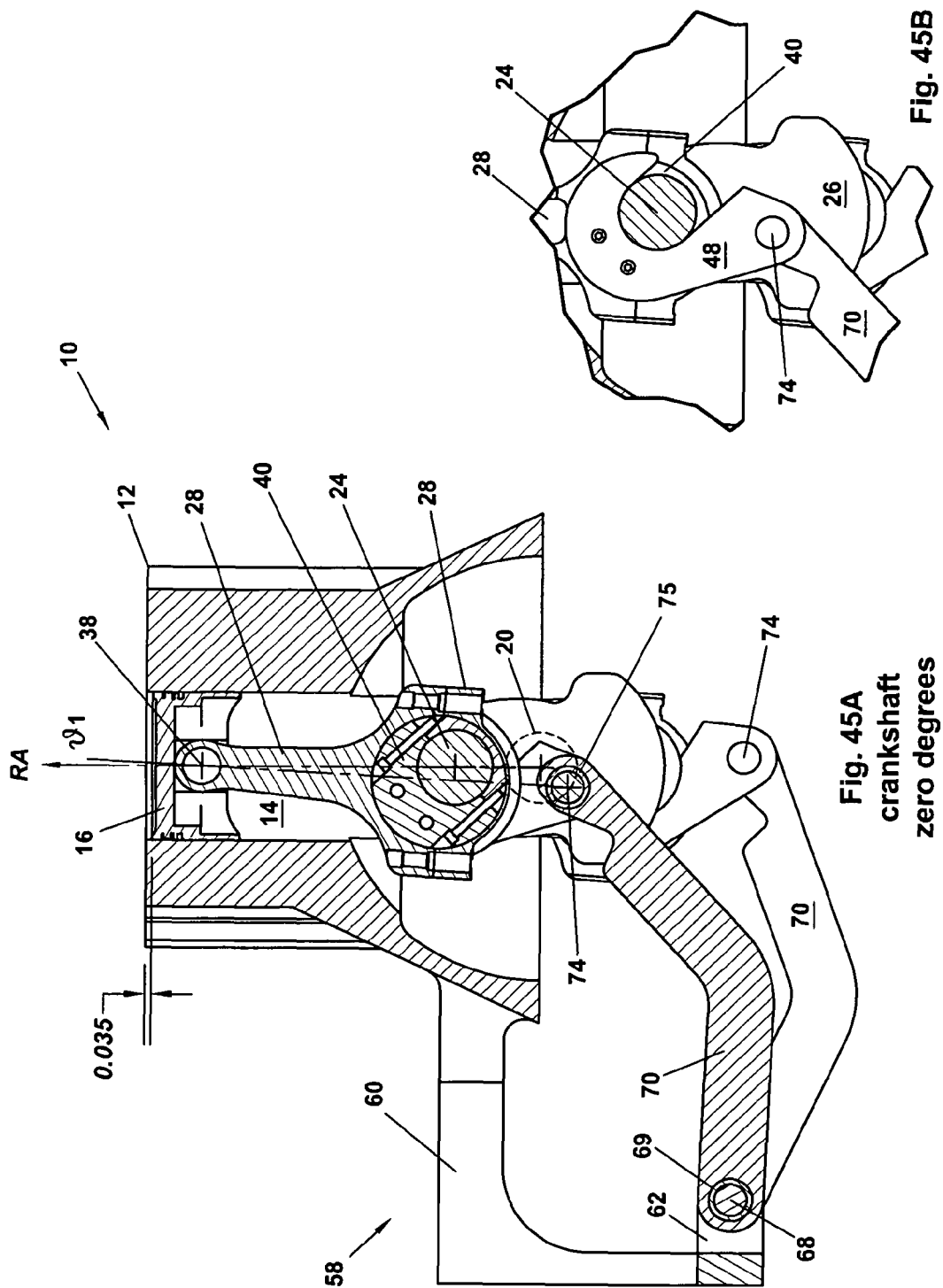
FIG. 45A is a schematic partial section end view of the exemplary embodiment shown in FIG. 38 with the crankshaft at 0 degrees.
FIG. 45B is a detail view of a portion of FIG. 45A.
Figure 46:
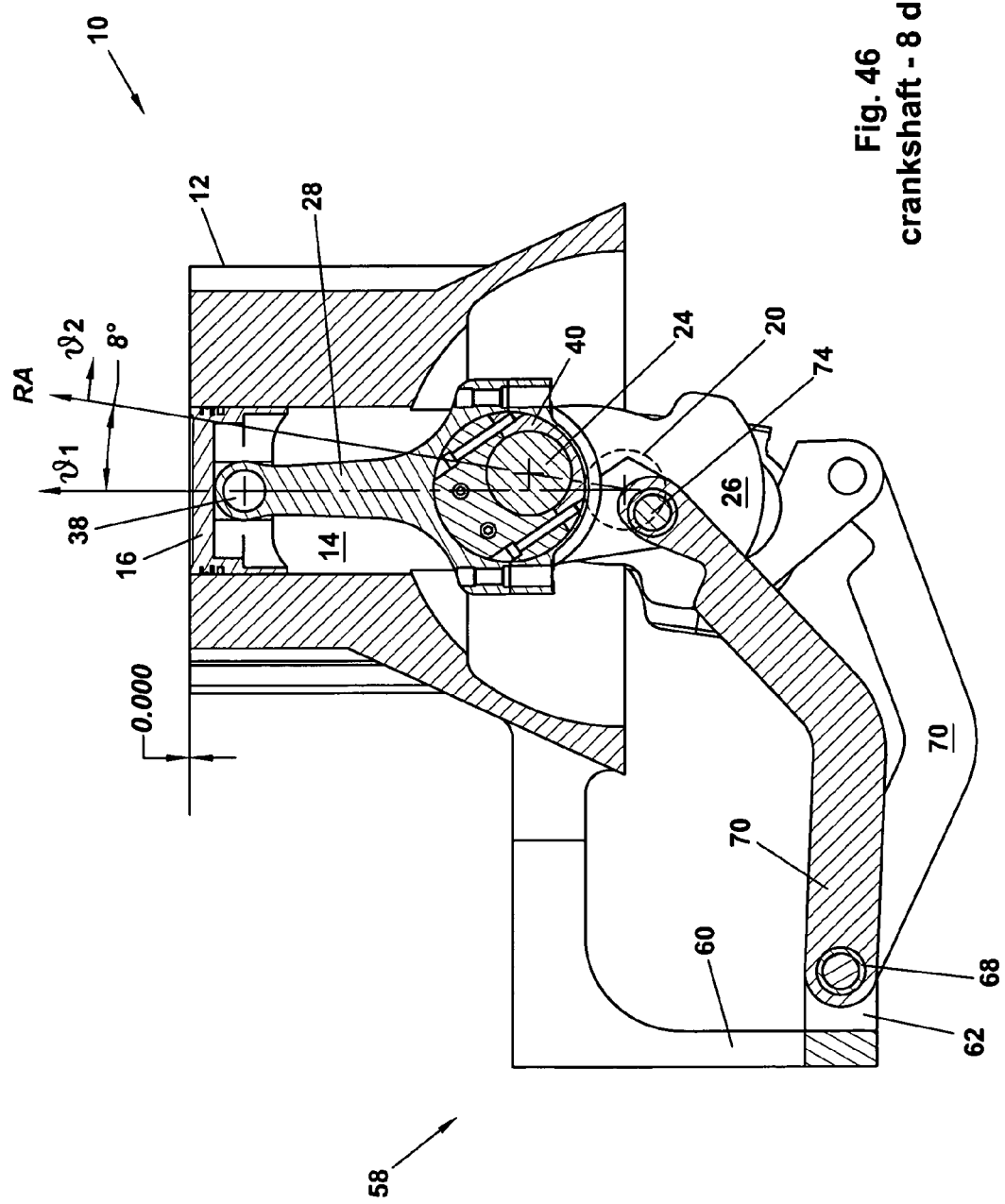
FIG. 46 is a schematic partial section end view of the exemplary embodiment shown in FIG. 38 with the crankshaft at 8 degrees.
Figure 47:
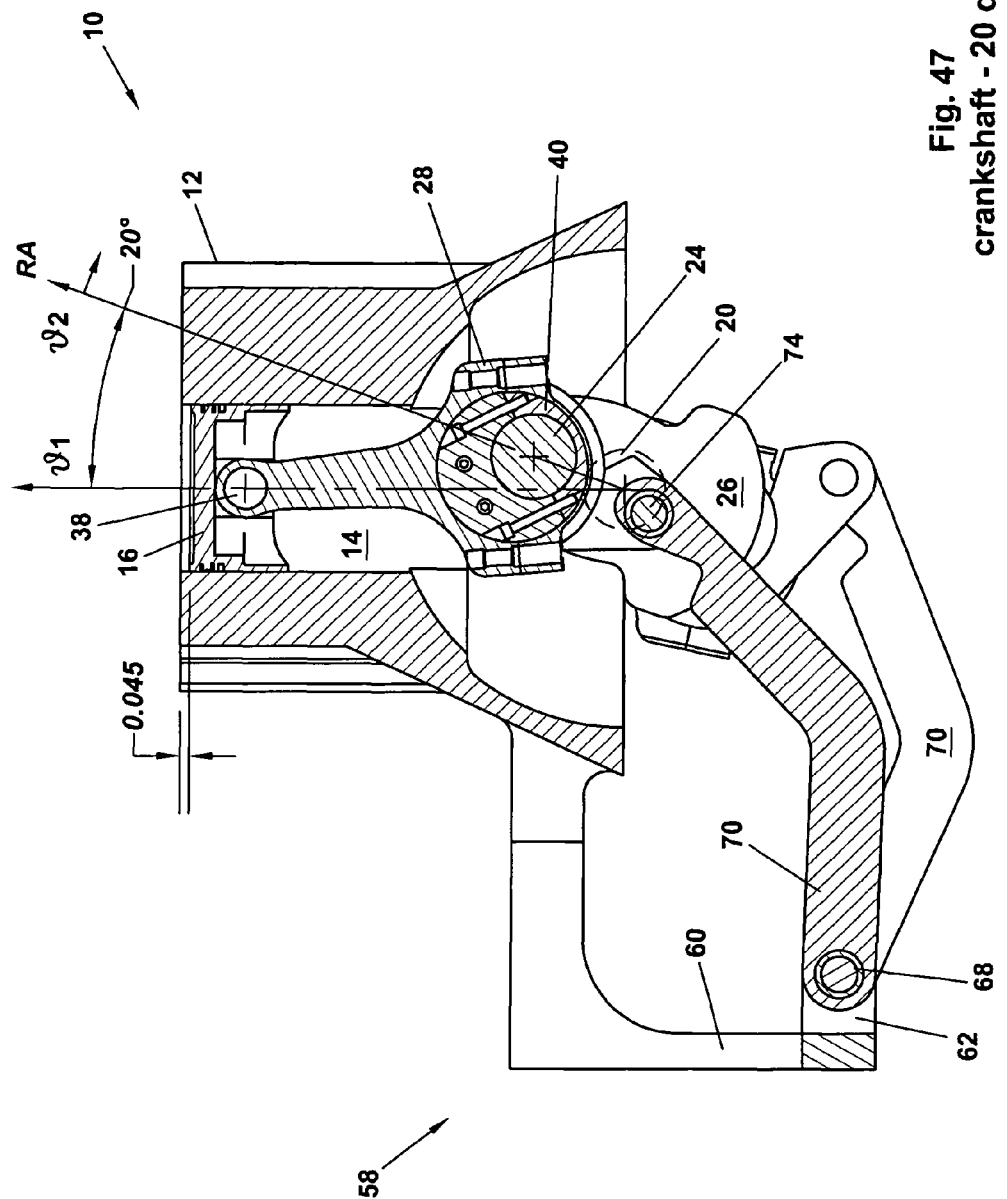
FIG. 47 is a schematic partial section end view of the exemplary embodiment shown in FIG. 38 with the crankshaft at 20 degrees.
Figure 48:
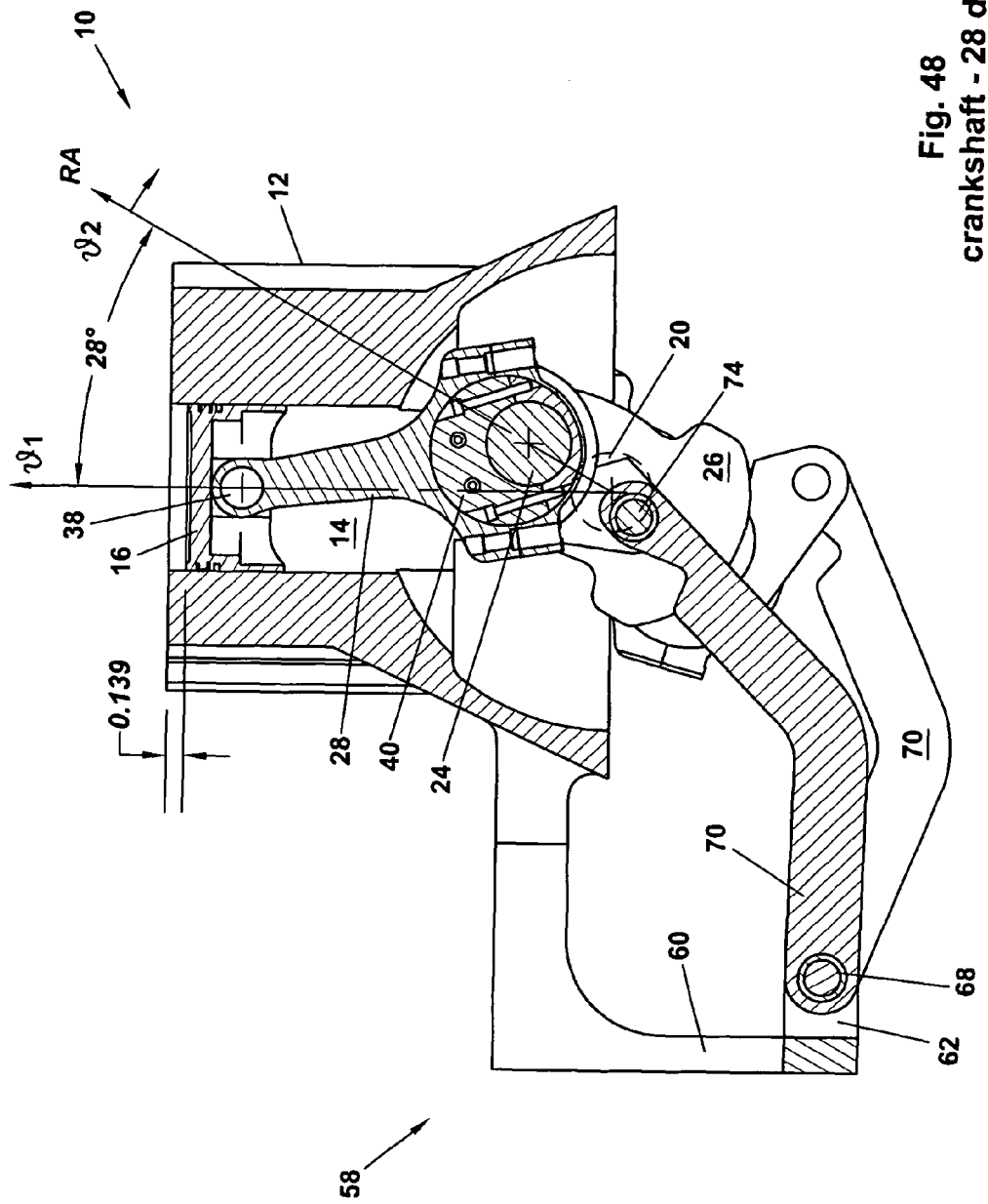
FIG. 48 is a schematic partial section end view of the exemplary embodiment shown in FIG. 38 with the crankshaft at 28 degrees.
Figure 49:
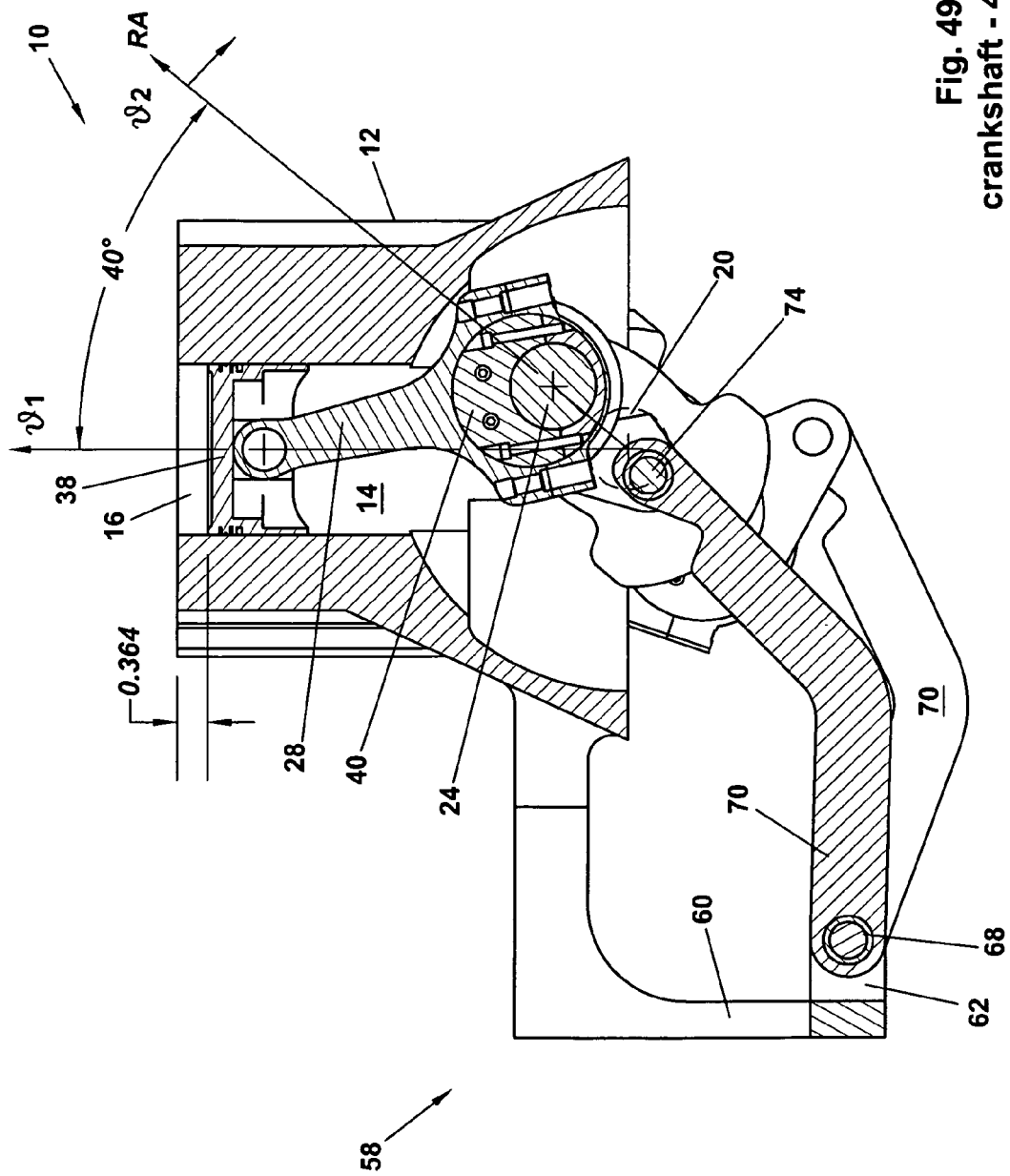
FIG. 49 is a schematic partial section end view of the exemplary embodiment shown in FIG. 38 with the crankshaft at 40 degrees.
Figure 50:
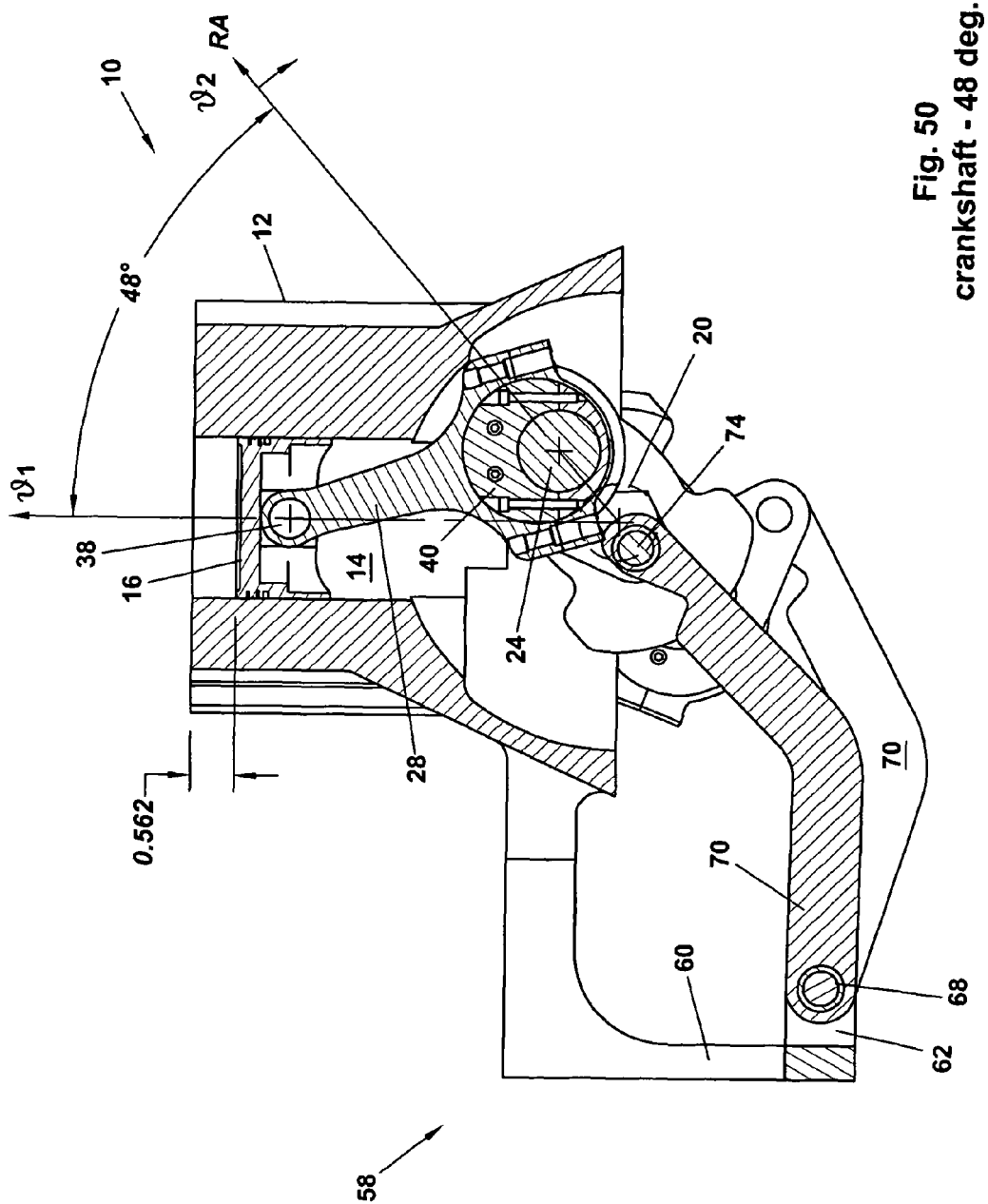
FIG. 50 is a schematic partial section end view of the exemplary embodiment shown in FIG. 38 with the crankshaft at 48 degrees.
Figure 51:
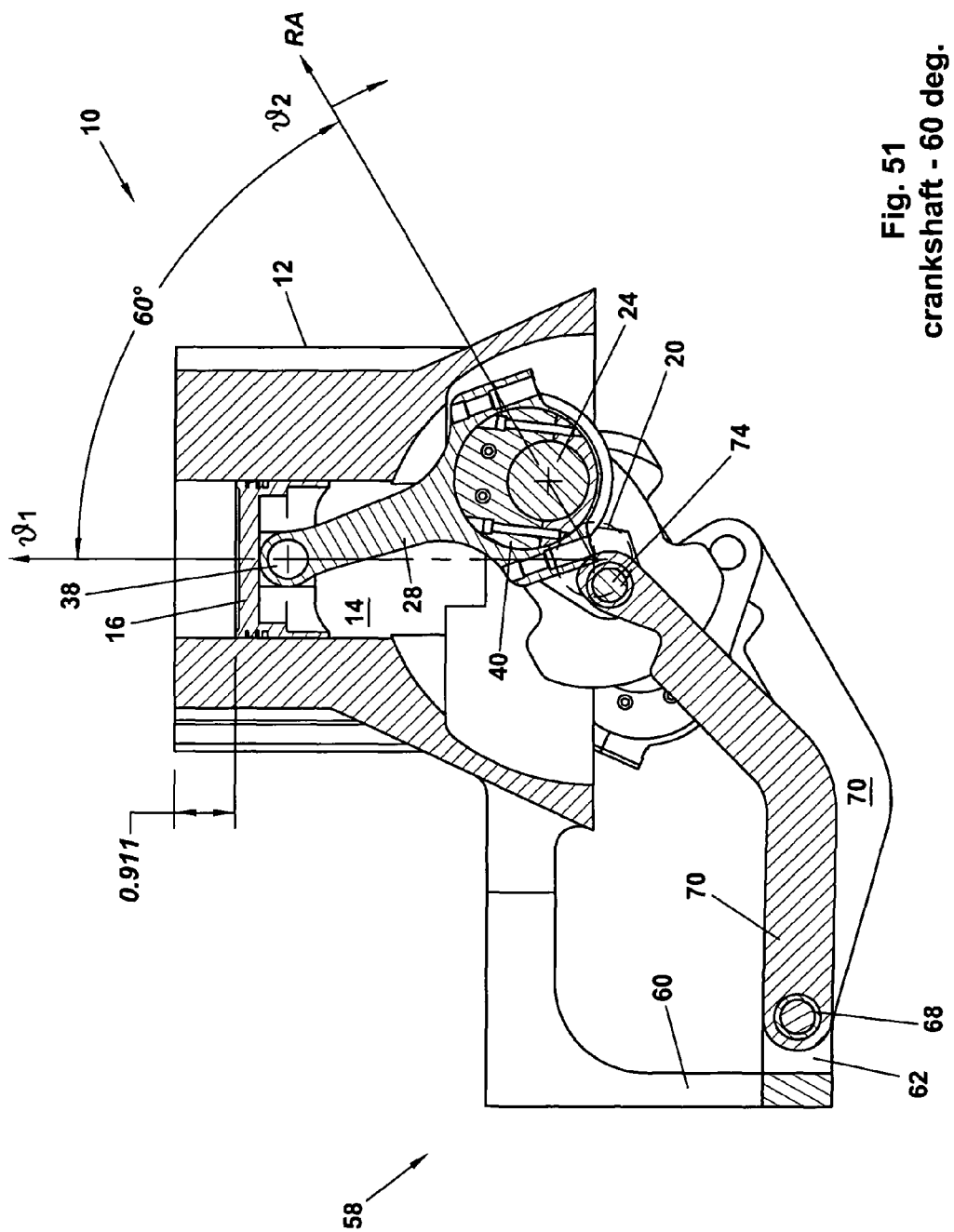
FIG. 51 is a schematic partial section end view of the exemplary embodiment shown in FIG. 38 with the crankshaft at 60 degrees.
Figure 52:
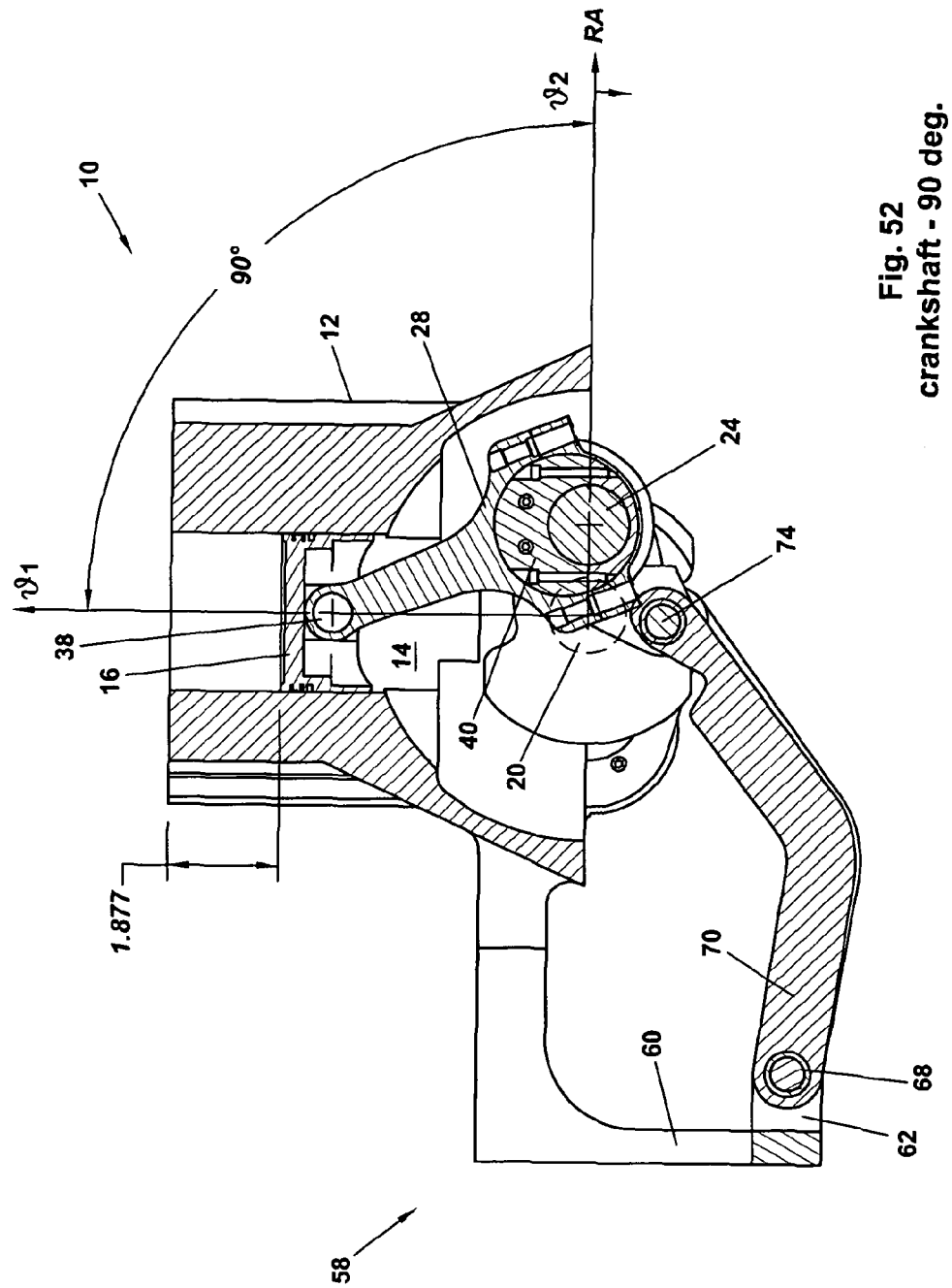
FIG. 52 is a schematic partial section end view of the exemplary embodiment shown in FIG. 38 with the crankshaft at 90 degrees.
Figure 53:
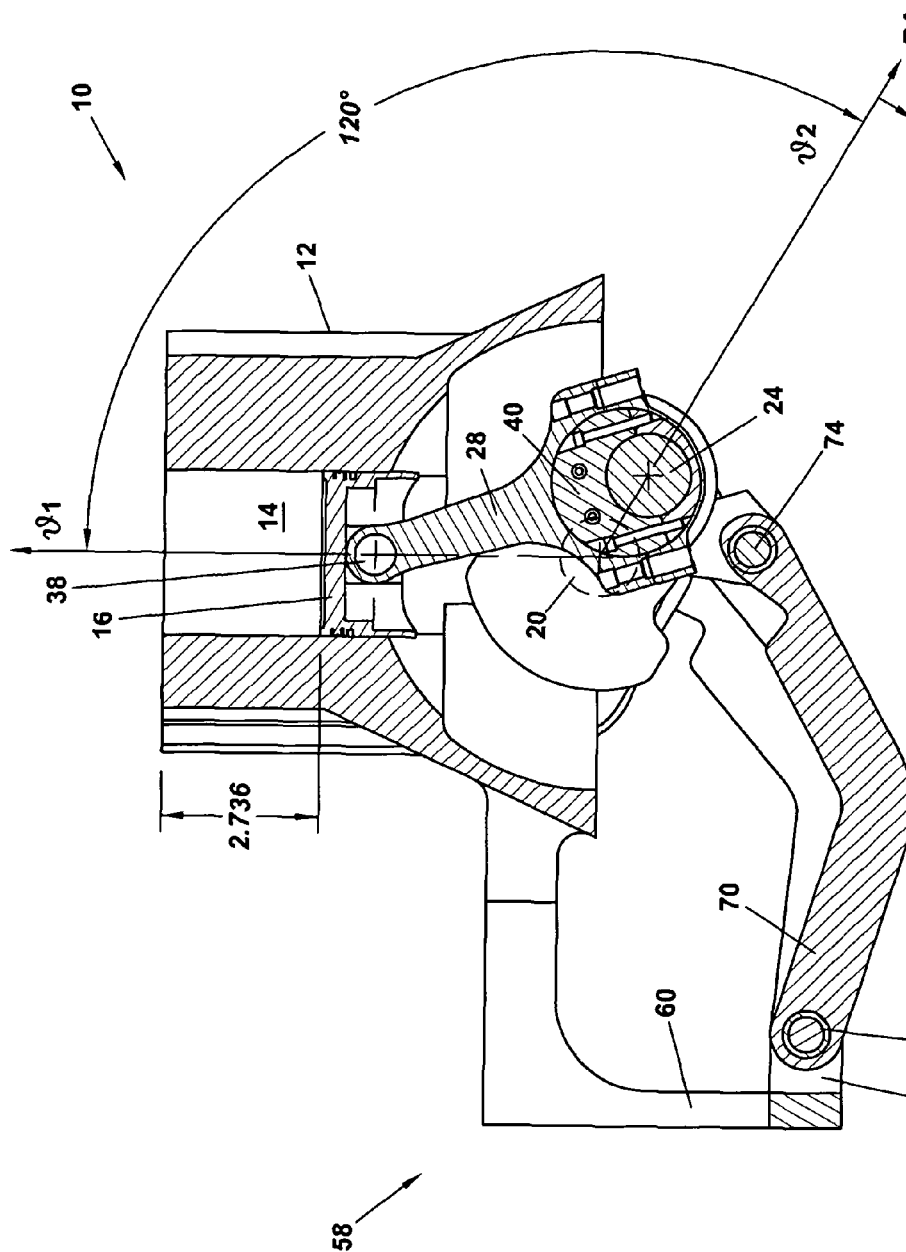
FIG. 53 is a schematic partial section end view of the exemplary embodiment shown in FIG. 38 with the crankshaft at 120 degrees.
Figure 54B:
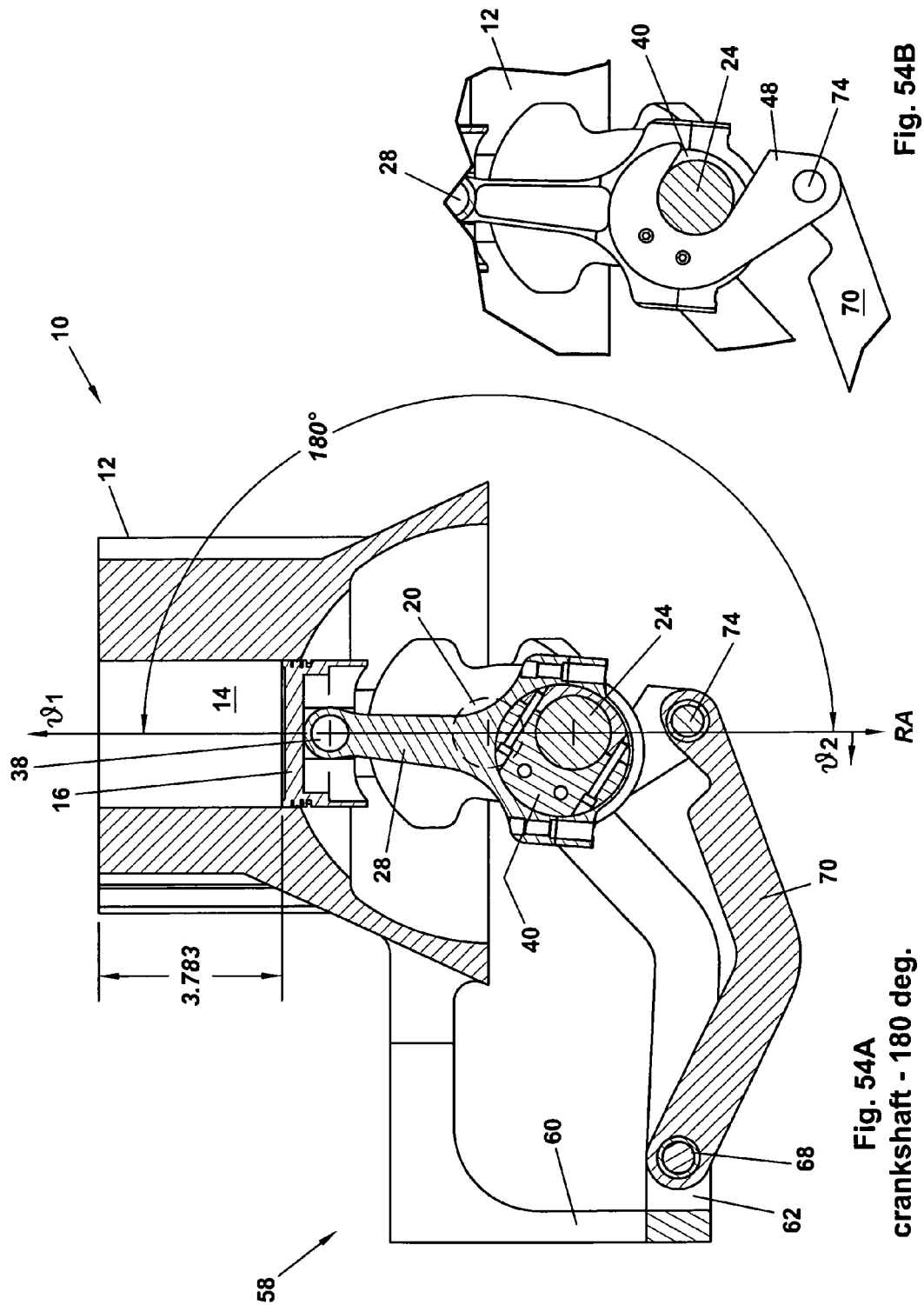
FIG. 54B is a detail view of a portion of FIG. 54A.

In the exemplary embodiment shown in FIGS. 38-55, one or more sleeves 69 may be provided on bushing control rod 68, and/or one or more sleeves 75 may be provided on respective pins 74. For example, as shown in FIGS. 39, 44, and 45A, as well as others, exemplary sleeves 69 are positioned between bushing control rod 68 and links 70, and exemplary sleeves 75 are positioned between respective pins 74 and elongate profiles 52 of respective bushing control plates 48. Sleeves 69 and 75 may be formed from, for example, hardened tool steel or a material having similar properties. Sleeves 69 and 75 may be, or may include, roller bearings. Sleeves 69 and/or 75 may serve to reduce friction and/or wear of elongate profiles 52, links 70, pins 74, and/or bushing control rods 68.

Figure 42:
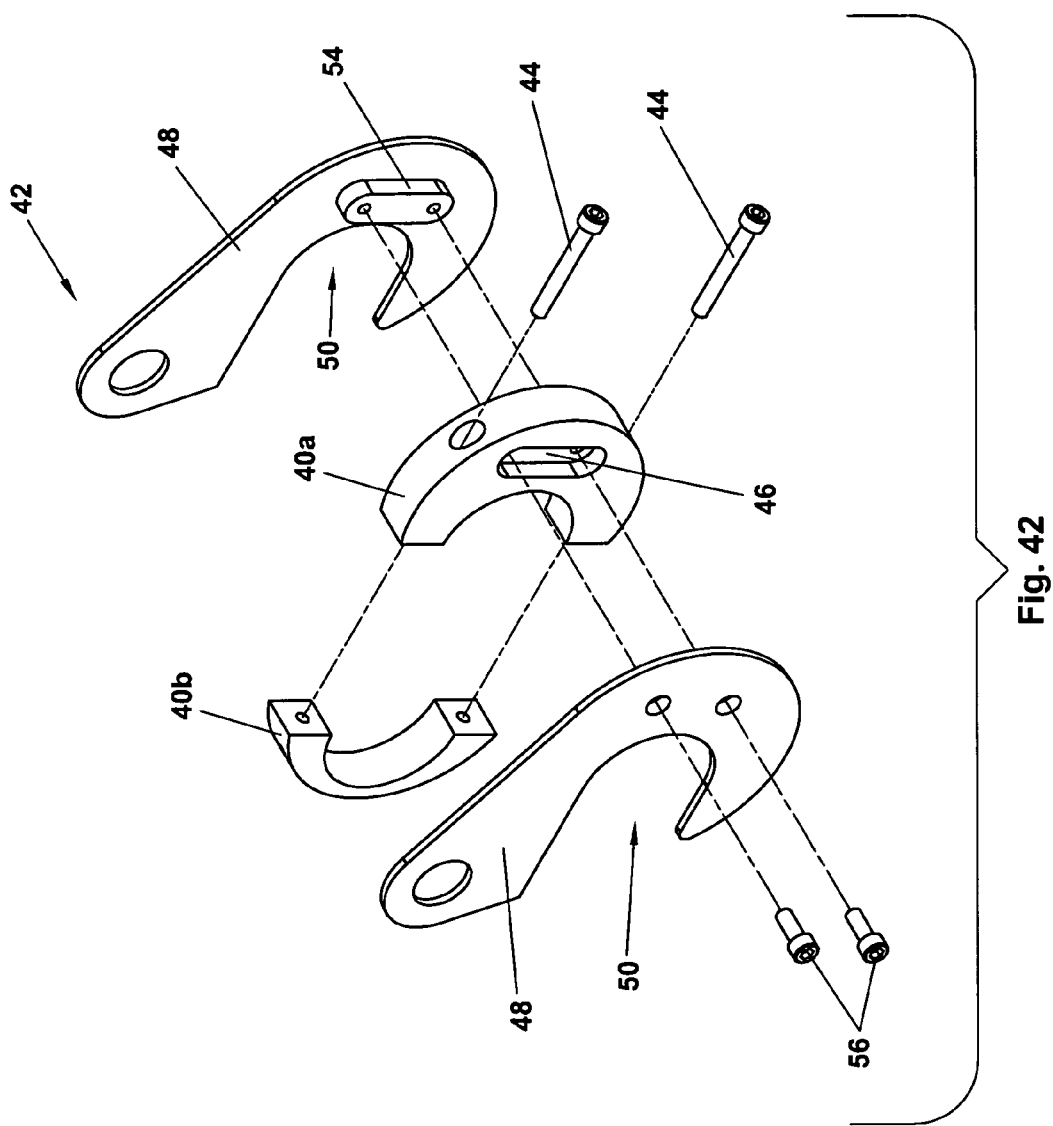
FIG. 42 is a schematic perspective exploded view of exemplary embodiments of a bushing and bushing control plates.
Figure 43:
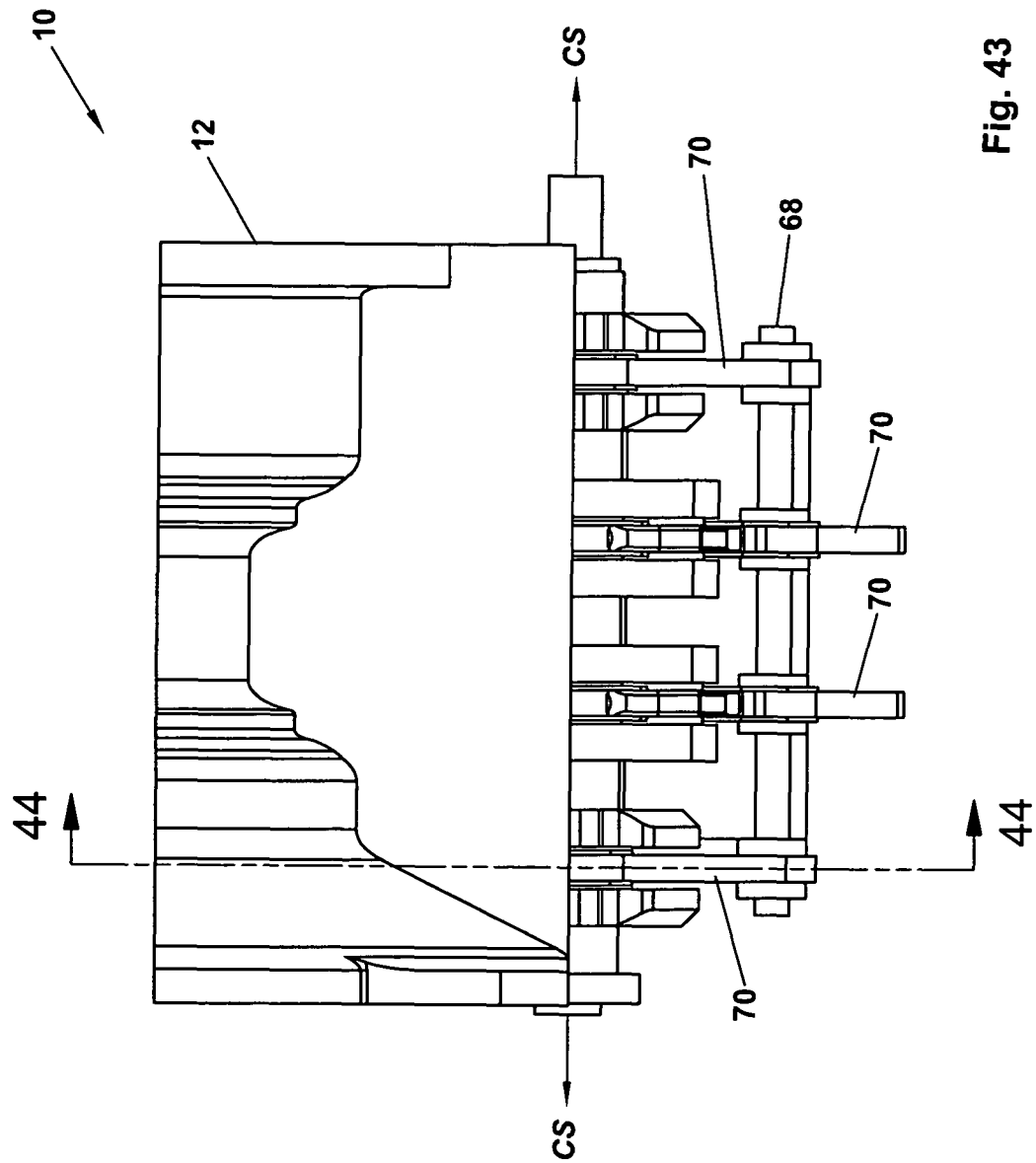
FIG. 43 is a schematic top view of the exemplary embodiment shown in FIG. 38.

Unlike the exemplary embodiments shown in FIGS. 1-37, in the exemplary embodiment shown in FIGS. 38-55, bushing control plate 48 does not include an elongate profile 52 (see FIG. 42). Rather, as shown in FIGS. 45A-55, link 70 pivots in an oscillating manner with respect to bushing control rod 68 as crankshaft 20 rotates. This pivoting of link 70 results in oscillating rotation of bushing 40 within first end aperture 32 of connecting rod 28. As a result, the effective length LC of connecting rod 28 is altered based on the relative relationship between bushing 40 and connecting rod 28 as crankpin 24 revolves about crankshaft axis CS, as shown in FIGS. 45A-55. Similar to the exemplary embodiments shown in FIGS. 1-37, selective alteration of the effective connecting rod length LC results in a substantial delay in downward travel of piston 16 at the beginning of the power stroke. For the reasons outlined above, this improves the efficiency and/or power of engine 10. Further, the relative configurations and relationships between bracket 58, bushing control rod 68, link 70 and bushing control plate 48 may be tailored to achieve desired performance and efficiency characteristics of engine 10.

Figure 55:
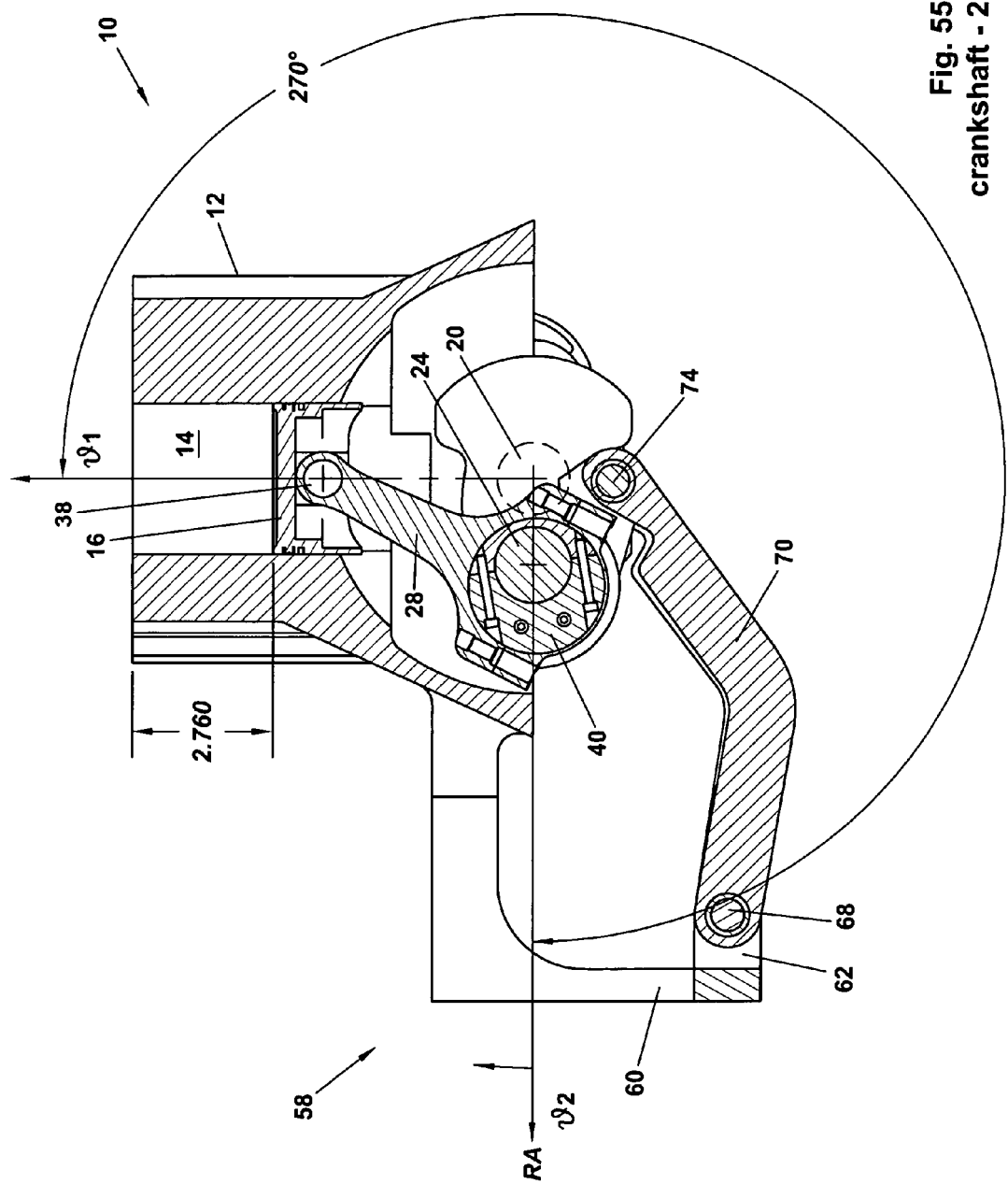
FIG. 55 is a schematic partial section end view of the exemplary embodiment shown in FIG. 38 with the crankshaft at 270 degrees.
Figure 58:
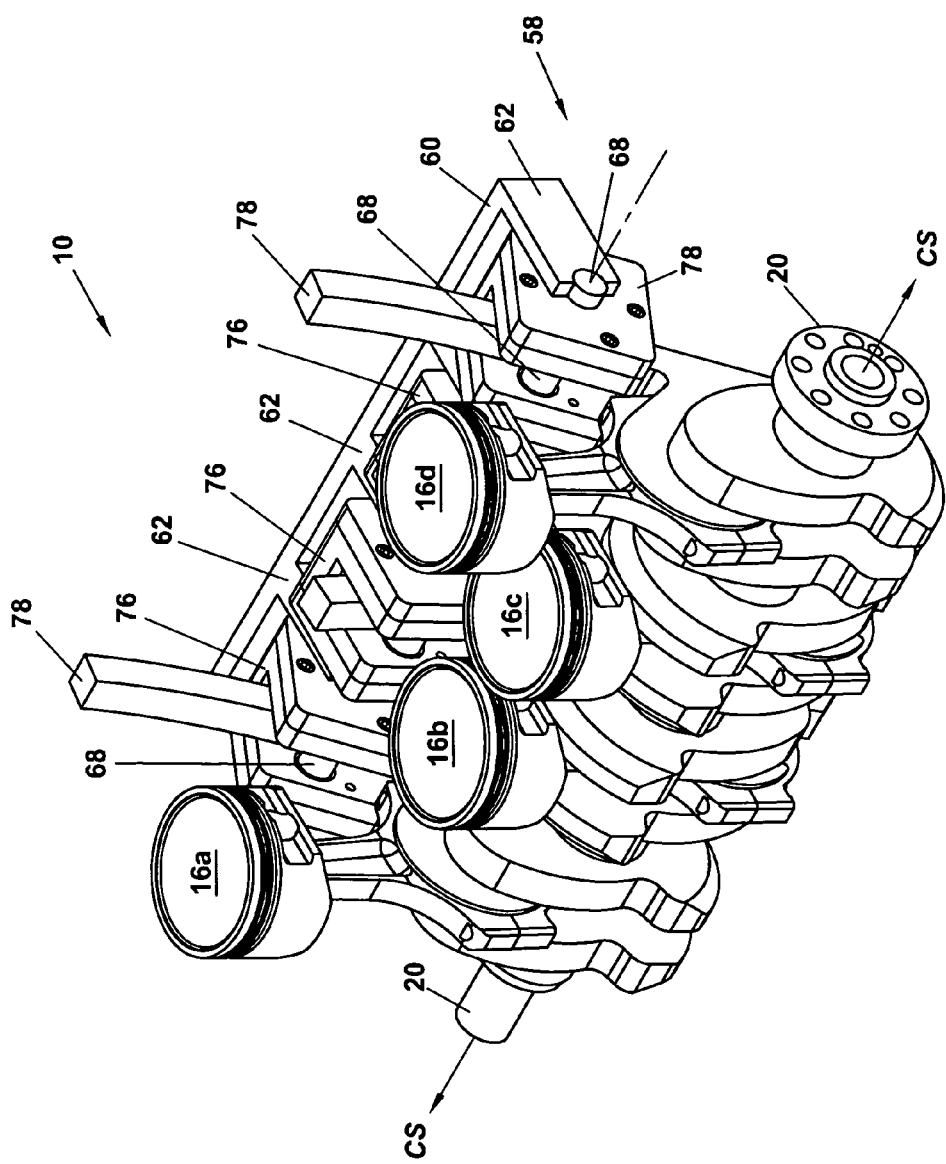
FIG. 58 is a schematic partial perspective view of a portion of the exemplary embodiment shown in FIG. 56.

FIGS. 56-69 schematically illustrate a further exemplary embodiment of engine 10 that results in operation similar to the exemplary embodiments shown in FIGS. 1-55. Exemplary engine 10 shown in FIGS. 526-69 includes a bracket 58 operably coupled to engine 10, for example, via cylinder block 12. As shown in FIG. 58, exemplary bracket 58 includes a member 60 extending longitudinally with respect to cylinder block 12 and one or more retainers 62 extending from member 60 toward cylinder block 12. Exemplary retainers 62 each define a space 64 and apertures 66 (see FIGS. 58 and 59) receiving a bushing control rod 68, which extends longitudinally with respect to cylinder block 12.

Figure 56:
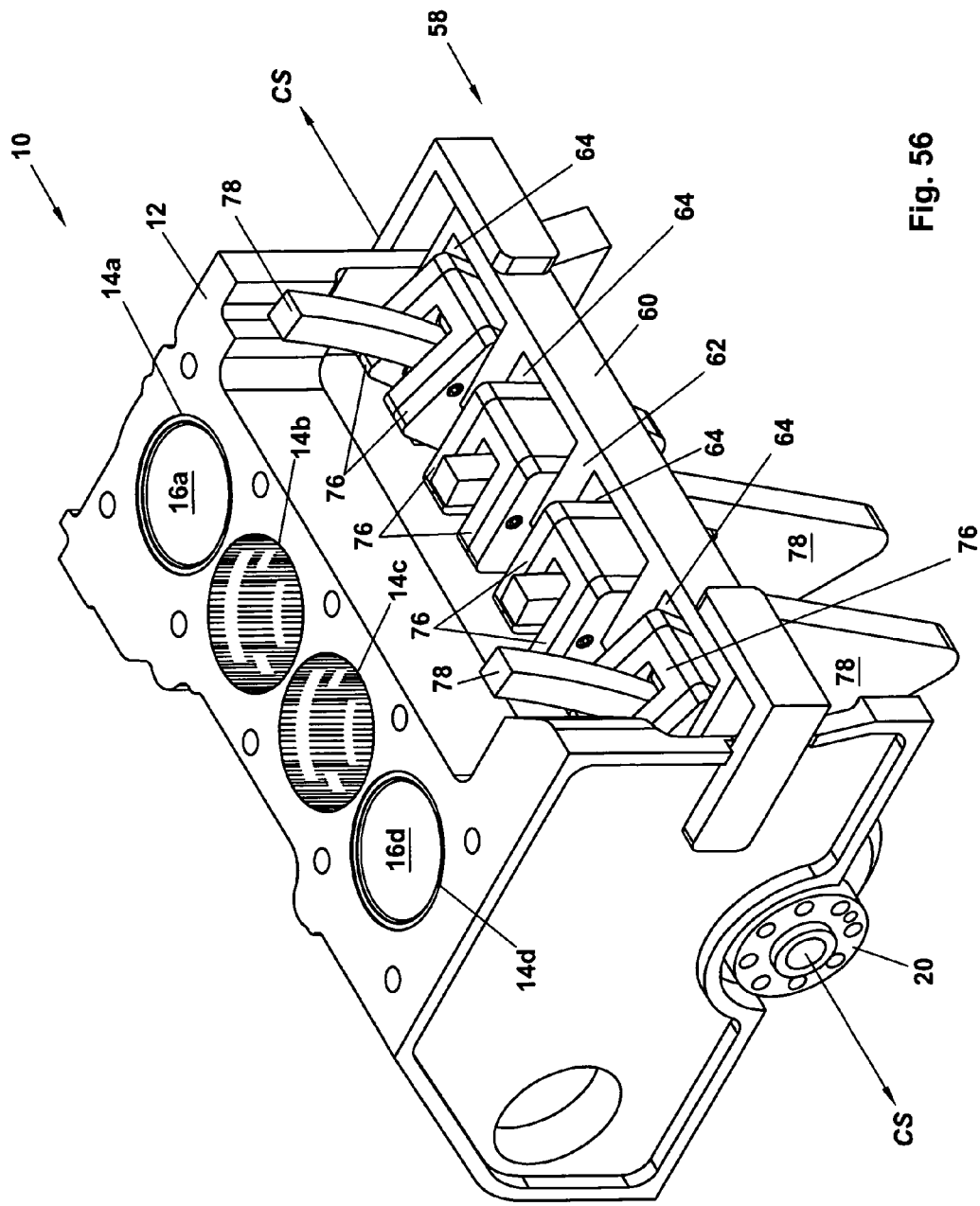
FIG. 56 is a schematic partial perspective view of a further exemplary embodiment of an engine.
Figure 57:
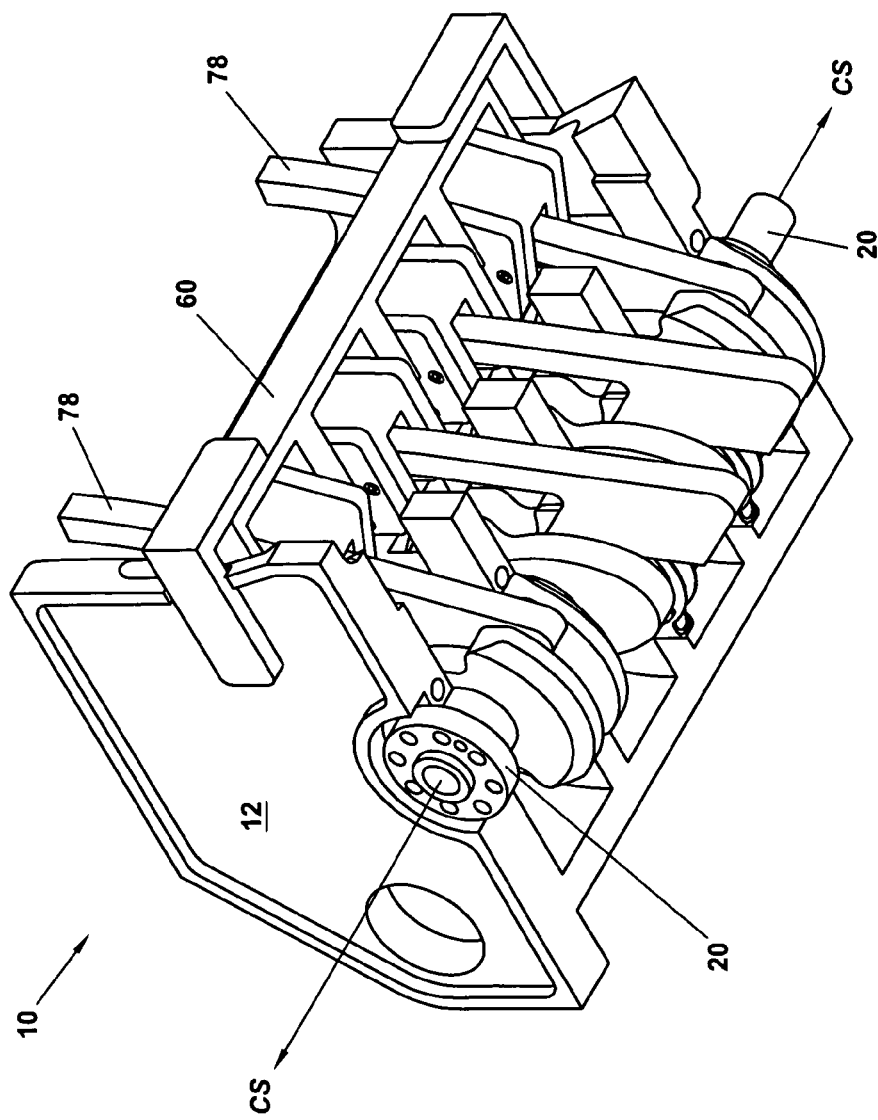
FIG. 57 is a schematic partial perspective view from below of the exemplary embodiment shown in FIG. 56.
Figure 59:
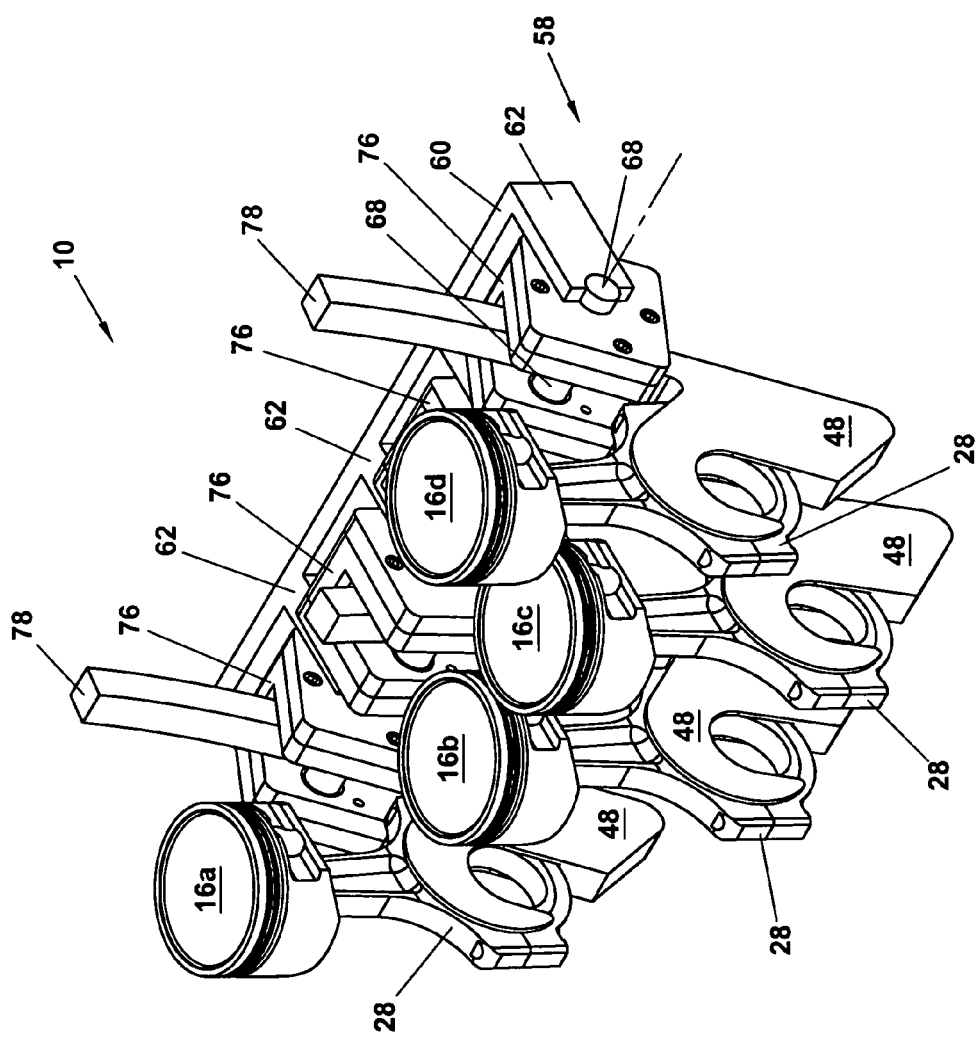
FIG. 59 is a schematic partial perspective view of a portion of the exemplary embodiment shown in FIG. 56.
Figure 60:
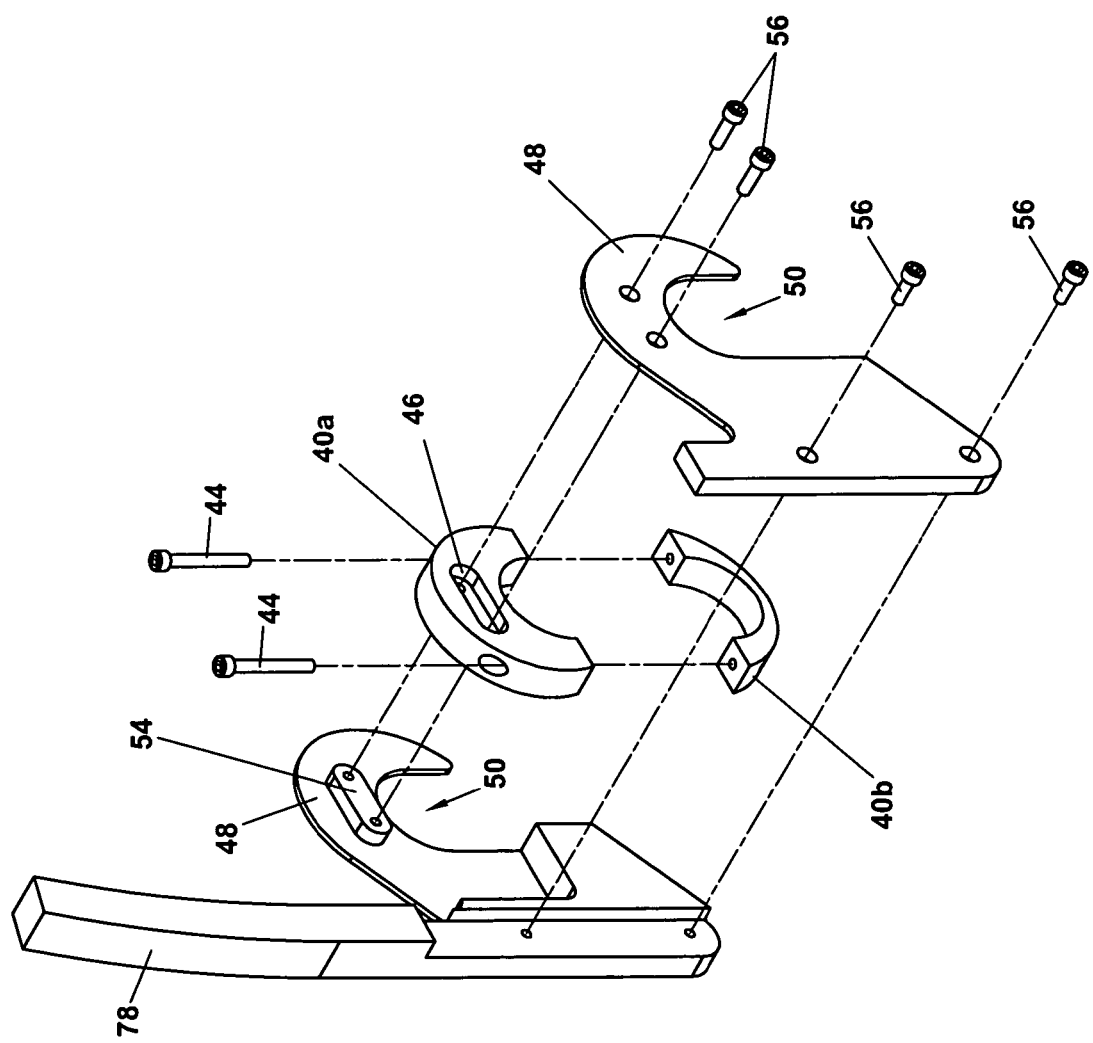
FIG. 60 is a schematic perspective exploded view of exemplary embodiments of a bushing and bushing control plates.
Figure 61:
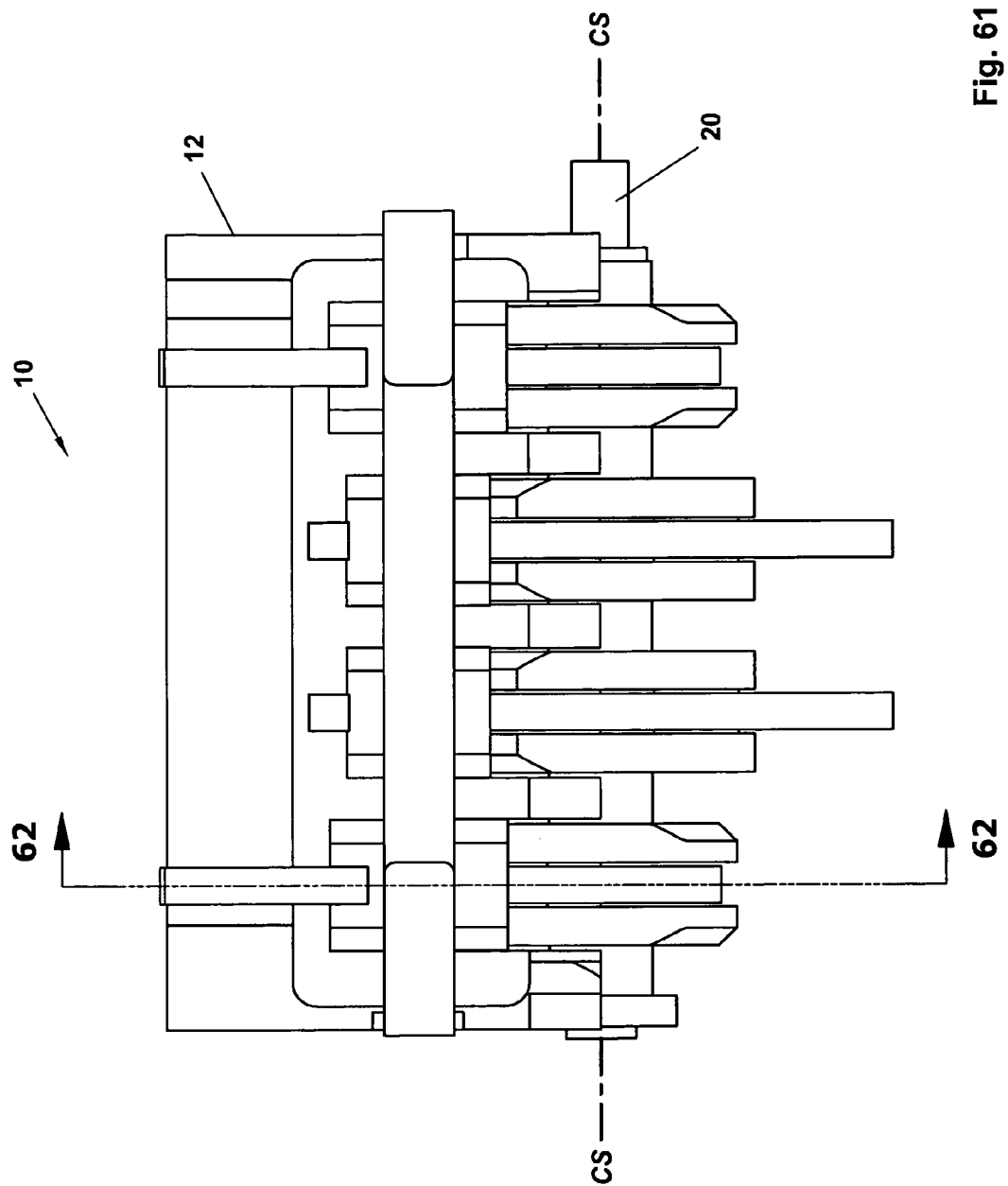
FIG. 61 is a schematic top view of the exemplary embodiment shown in FIG. 56.
Figure 62:
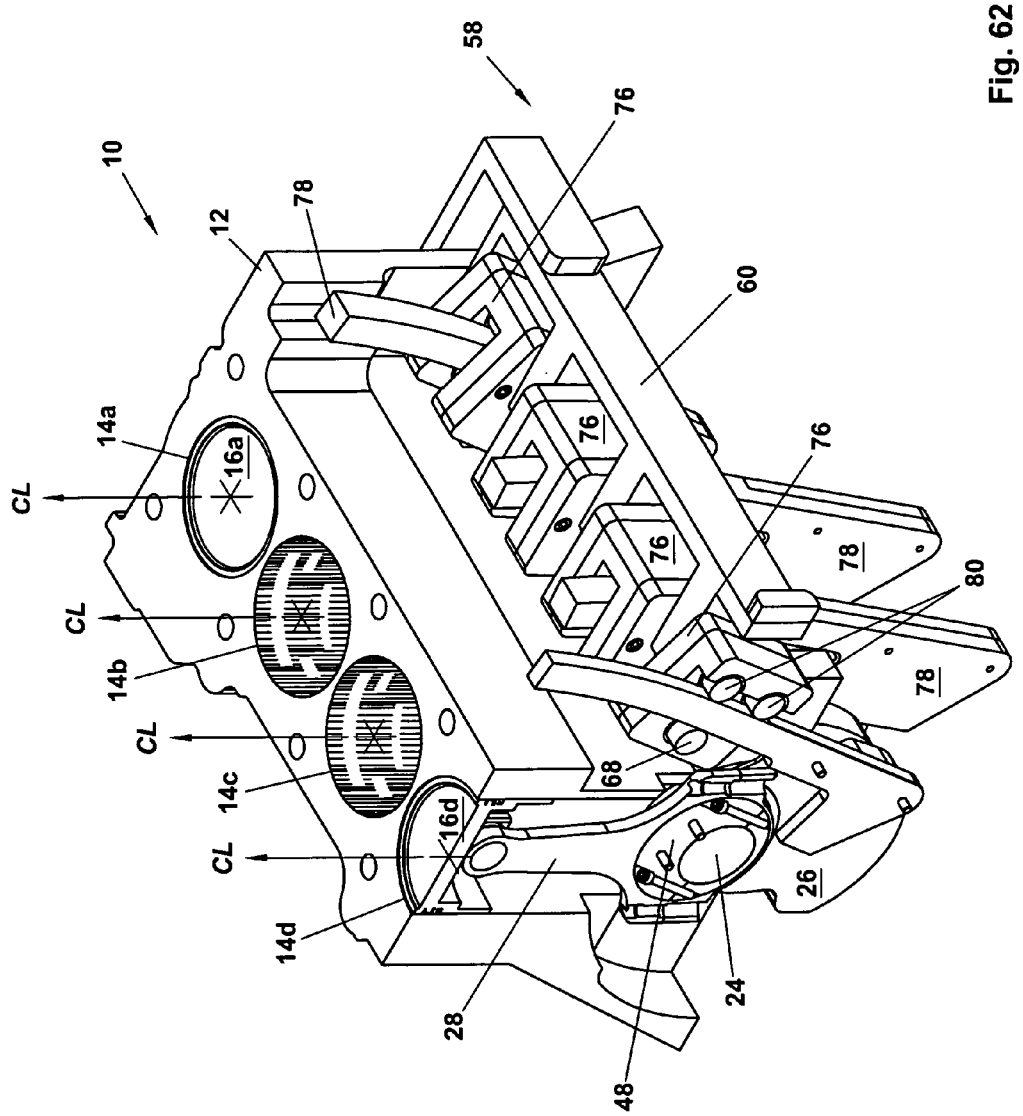
FIG. 62 is a schematic perspective partial section view of the exemplary embodiment shown in FIG. 56.

In a departure from the exemplary embodiments shown in FIGS. 1-55, and as shown in FIGS. 56, 58, and 59, exemplary engine 10 includes rocker followers 76 configured to follow cam portions 78, which are operably coupled to bushing control plates 48 (see FIG. 60). Exemplary rocker followers 76 include one or more bearings 80 (see FIG. 62) and are configured to pivot on bushing control rod 68 as respective cam portions 78 pass between bushing control rod 68 and bearings 80. In the exemplary embodiment shown, cam portions 78 define a slight curve.

Figure 64:
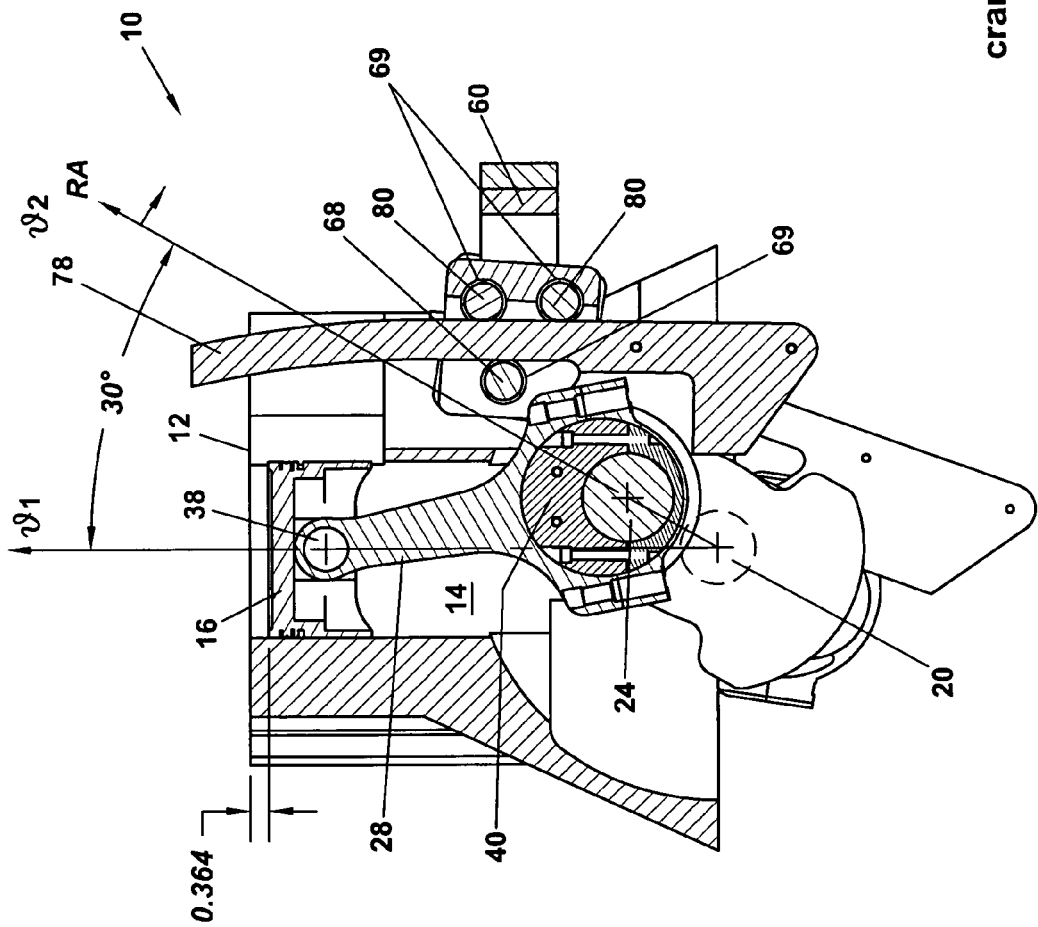
FIG. 64 is a schematic partial section end view of the exemplary embodiment shown in FIG. 56 with the crankshaft at 30 degrees.
Figure 65:
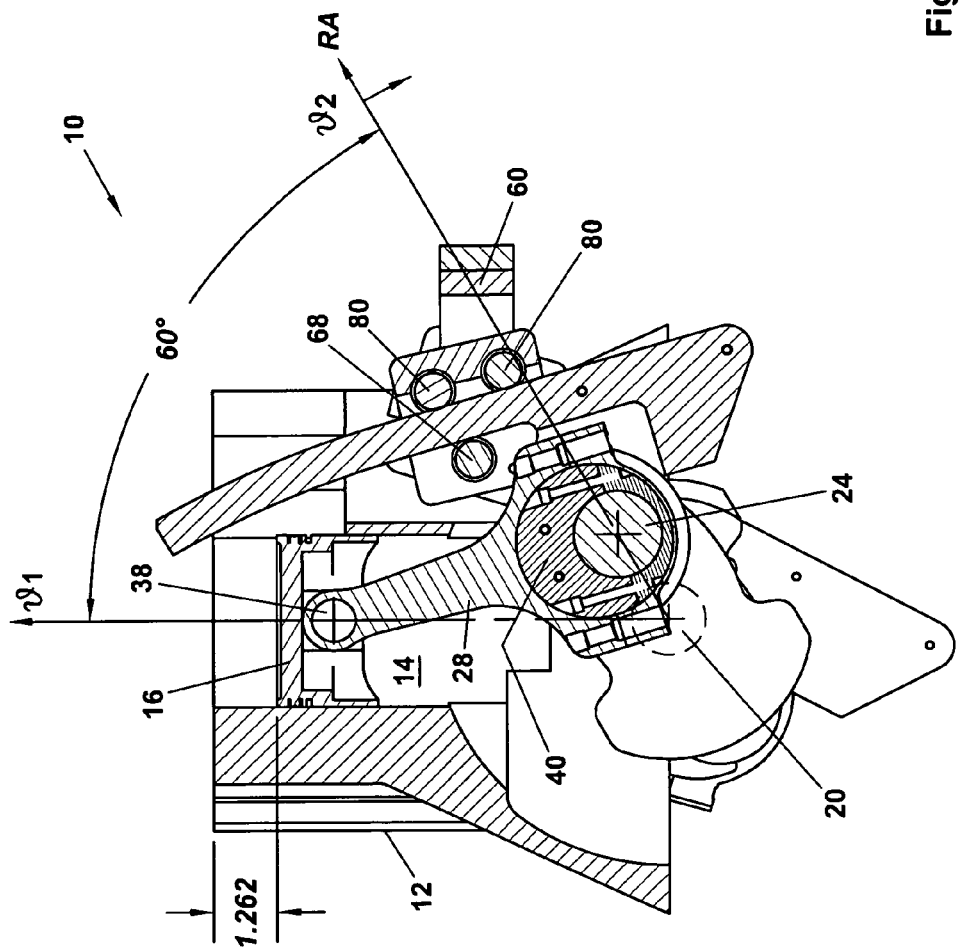
FIG. 65 is a schematic partial section end view of the exemplary embodiment shown in FIG. 56 with the crankshaft at 60 degrees.
Figure 66:
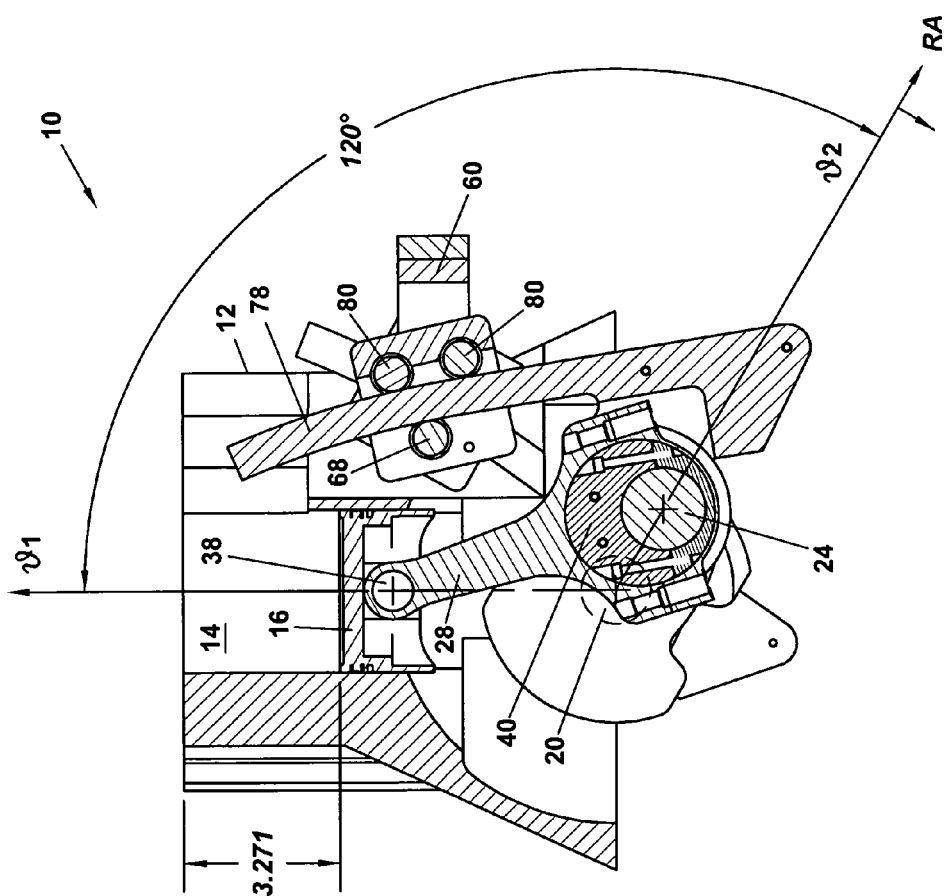
FIG. 66 is a schematic partial section end view of the exemplary embodiment shown in FIG. 56 with the crankshaft at 120 degrees.
Figure 67B:
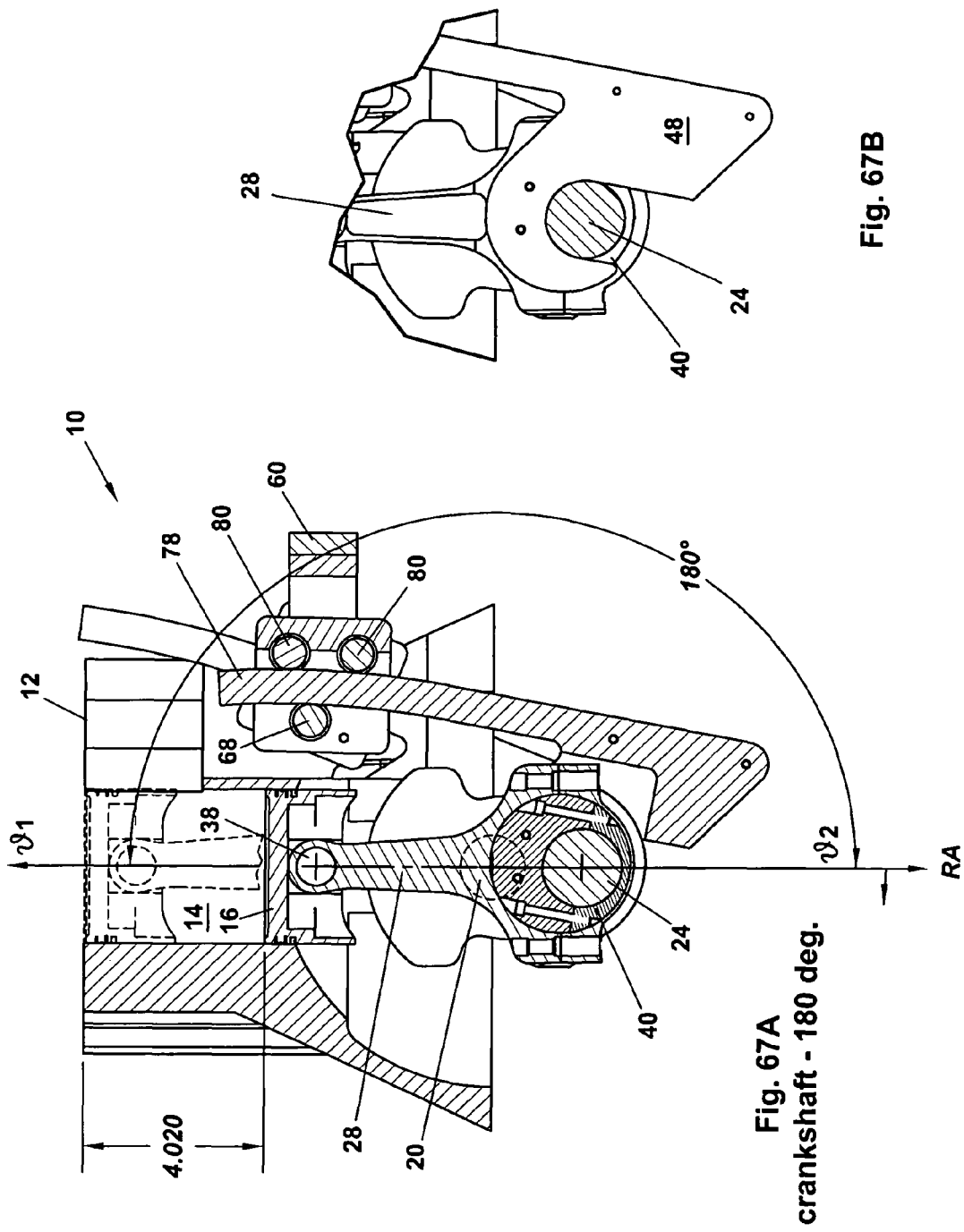
FIG. 67B is a detail view of a portion of FIG. 67A.
Figure 68:
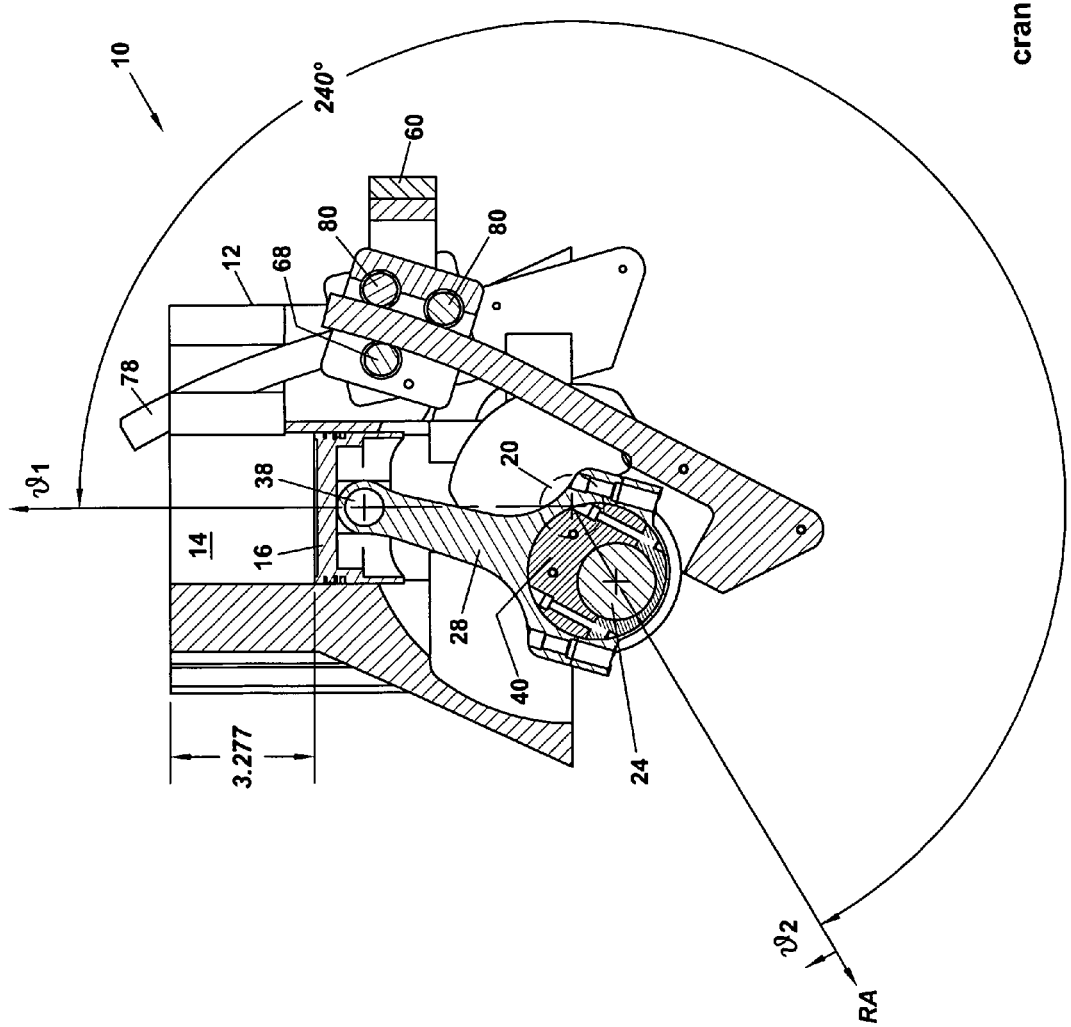
FIG. 68 is a schematic partial section end view of the exemplary embodiment shown in FIG. 56 with the crankshaft at 240 degrees.
Figure 69:
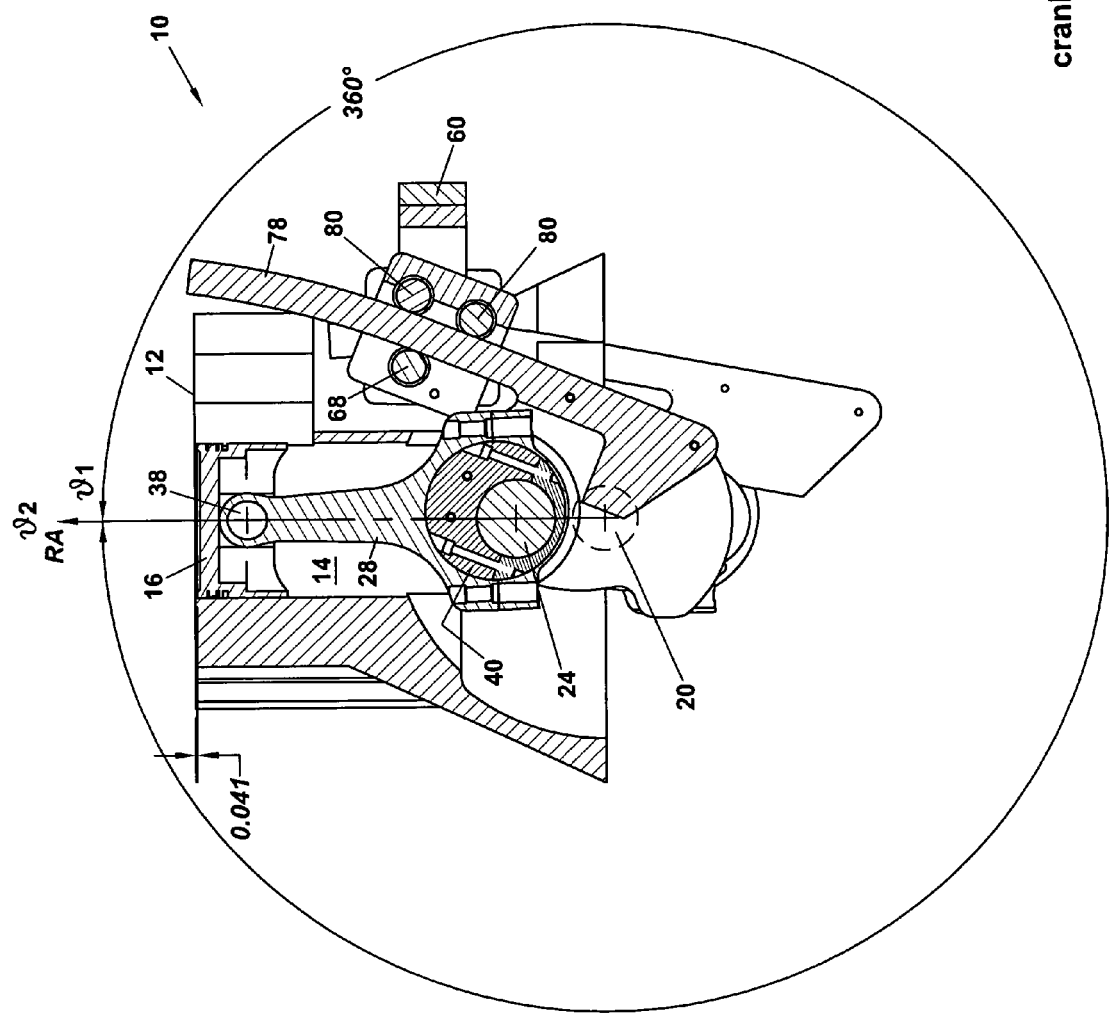
FIG. 69 is a schematic partial section end view of the exemplary embodiment shown in FIG. 56 with the crankshaft at 360 degrees.
Figure 70:
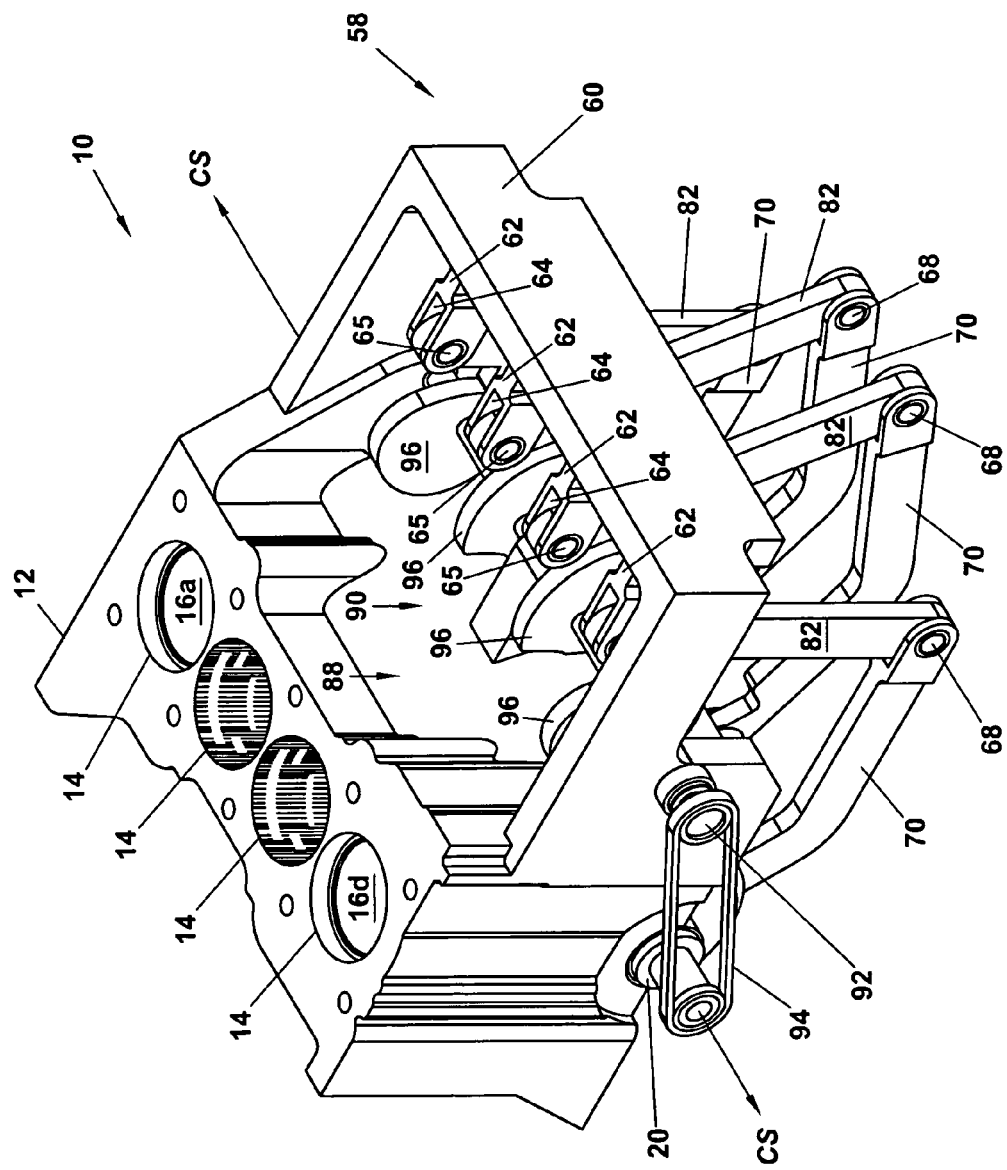
FIG. 70 is a schematic partial perspective view of still another exemplary embodiment of an engine.
Figure 71:
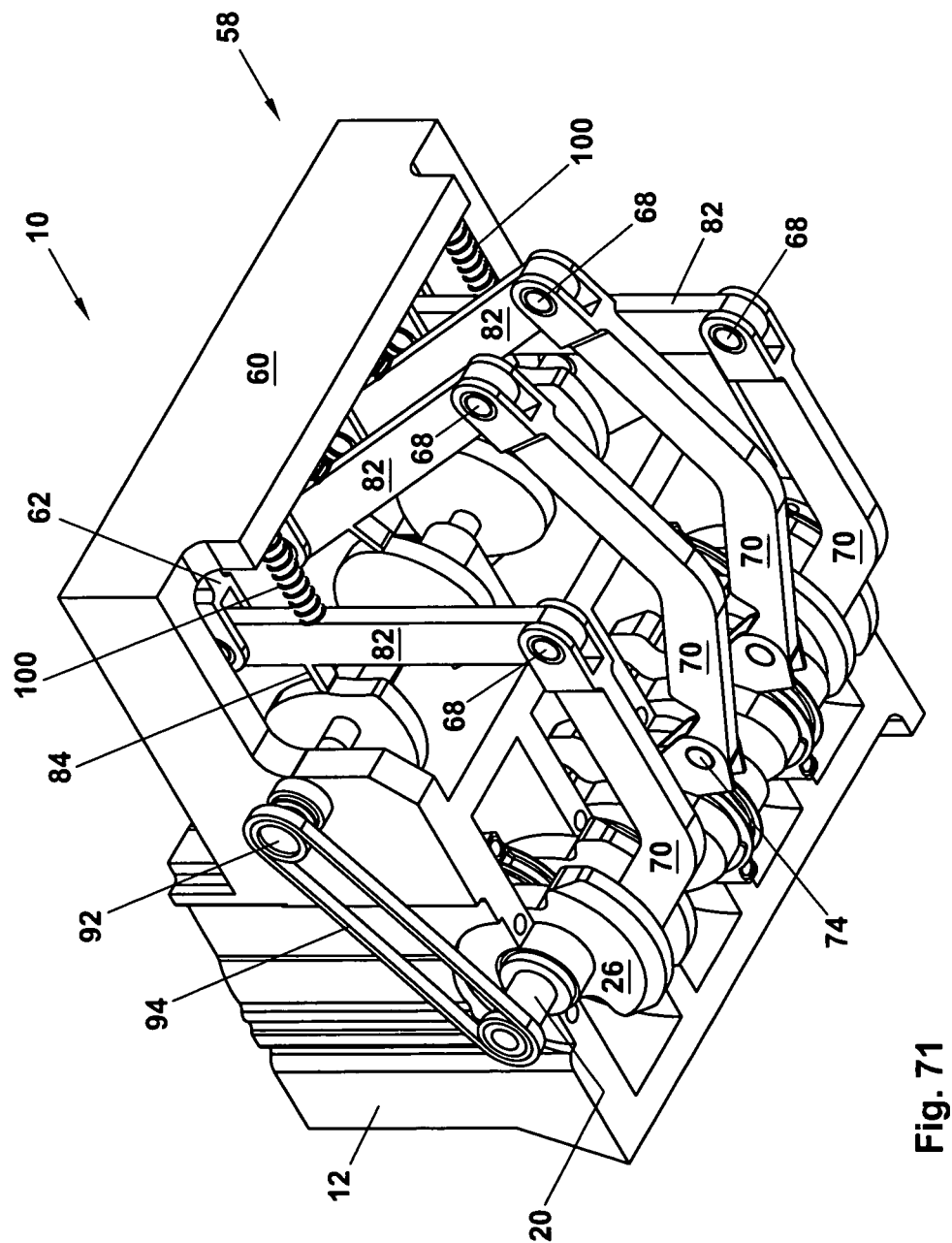
FIG. 71 is a schematic partial perspective view from below of the exemplary embodiment shown in FIG. 70.
Figure 72:
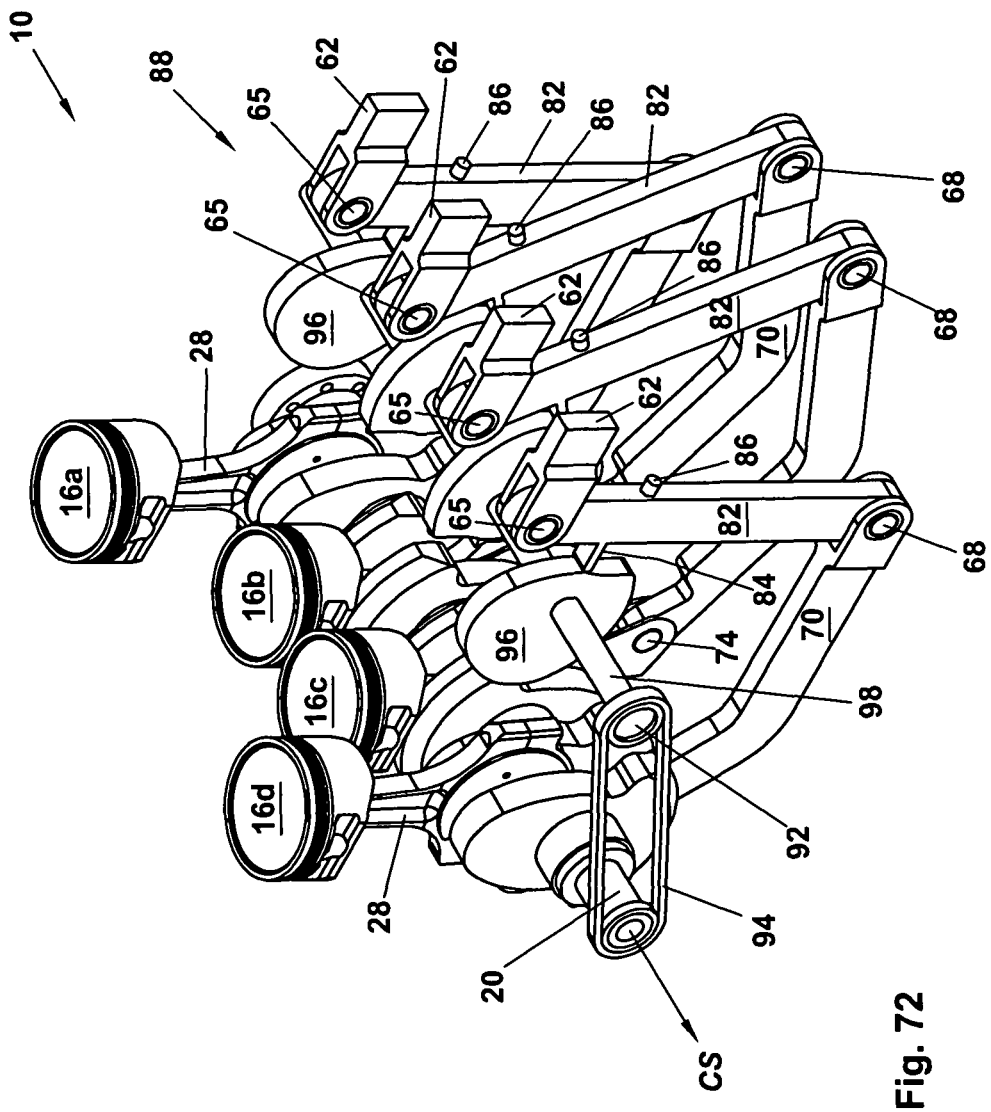
FIG. 72 is a schematic partial perspective view of a portion of the exemplary embodiment shown in FIG. 70.
Figure 73:
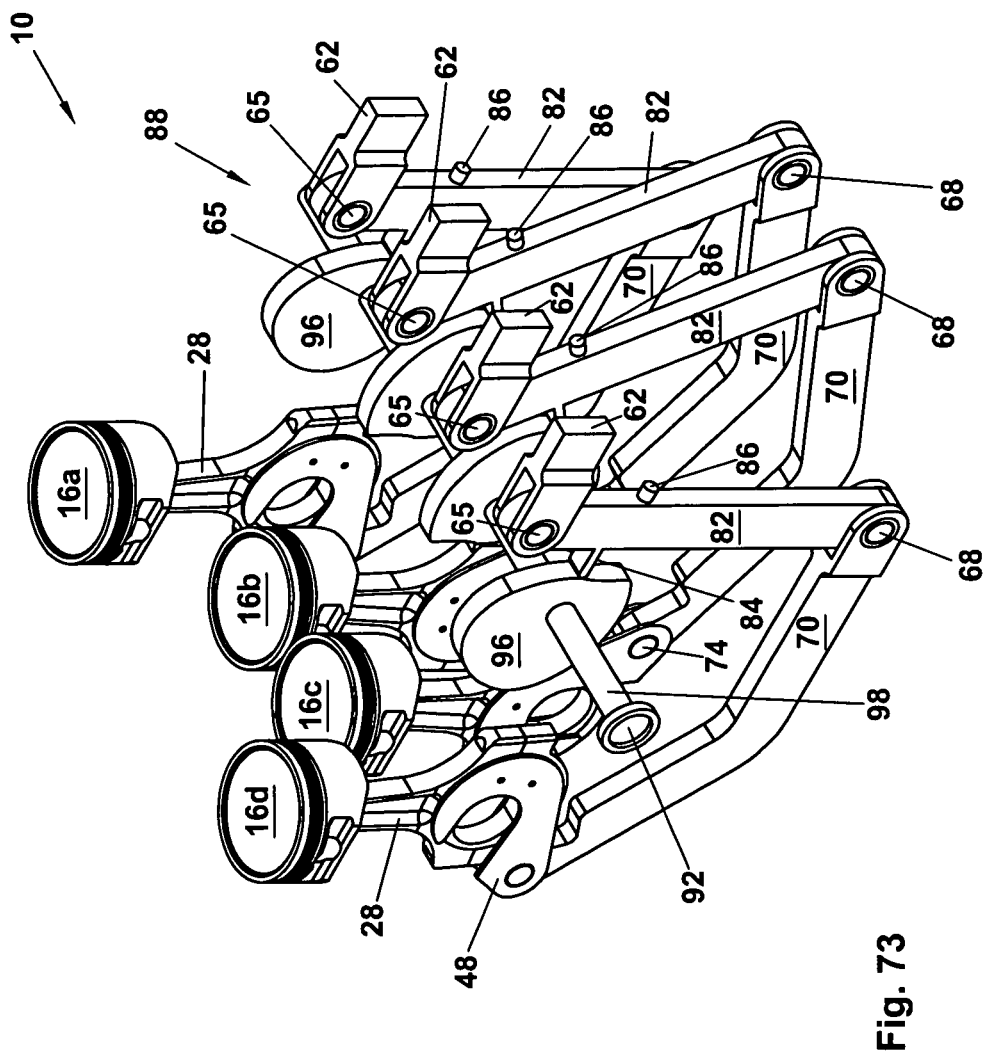
FIG. 73 is a schematic partial perspective view of a portion of the exemplary embodiment shown in FIG. 70.

In the exemplary embodiment shown in FIGS. 56-69, one or more sleeves 69 may be provided on respective bushing control rods 68 and/or bearings 80. For example, as shown in FIGS. 63A and 64, as well as others, exemplary sleeves 69 are positioned between respective bushing control rods 68 and bearings 80 and cam portions 78. Sleeves 69 may be formed from, for example, hardened tool steel or a material having similar properties. Sleeves 69 may be, or may include, rollers bearings. Sleeves 69 may serve to reduce friction and/or wear of bushing control rods 68, bearings 80, and/or cam portions 78.

As shown in FIGS. 62-69, by virtue of being coupled to bushing control plates 48, as crankshaft 20 rotates, bushing control plates 48 are driven in a revolving manner about crankshaft 20 via crankpins 24. As a result, cam portions 78 are driven in a reciprocating manner through rocker followers 76. By virtue of the interaction between the rocker followers 76 and respective cam portions 78, oscillating rotation of bushing 40 within first end aperture 32 of connecting rod 28 is controlled. As a result, the effective length LC of connecting rod 28 is altered based on the relative relationship between bushing 40 and connecting rod 28 as crankpin 24 revolves about crankshaft axis CS, as shown in FIGS. 63A-69. Similar to the exemplary embodiments shown in FIGS. 1-55, selective alteration of the effective connecting rod length LC results in a substantial delay in downward travel of piston 16 at the beginning of the power stroke. For the reasons outlined above, this improves the efficiency and/or power of engine 10. Further, the relative configurations and relationships between bracket 58, bushing control rod 68, bushing control plates 48, rocker followers 76, and cam portions 78 may be tailored to achieve desired performance and efficiency characteristics of engine 10.

FIGS. 70-81B schematically illustrate yet a further exemplary embodiment of engine 10. The exemplary embodiment shown in FIGS. 70-81B is similar to the exemplary embodiments shown in FIGS. 1-37. In contrast with engines 10 shown in FIGS. 1-37, however, for the exemplary embodiment shown in FIGS. 70-81B, oscillation of bushing control plates 48 is controlled via a camshaft assembly 88 rather than via elongated profile 52 of the embodiments shown in FIGS. 1-37.

Referring to FIGS. 70-73, exemplary engine 10 includes a bracket 58 operably coupled to engine 10, for example, via cylinder block 12. Exemplary bracket 58 includes a member 60 extending longitudinally with respect to cylinder block 12 and one or more retainers 62 extending from member 60 toward cylinder block 12. Exemplary retainers 62 each define a space 64 for receiving a respective follower 82. Followers 82 are pivotally coupled to a respective retainer 62 at one end via a pin 65 (FIGS. 70, 72, and 73) and to a respective link 70 at an opposite end via a bushing control rod 68 (see FIGS. 71-73). Followers 82 include a finger 84 (see FIG. 71) on one side and a spring retainer 86 on the opposite side.

Figure 76:
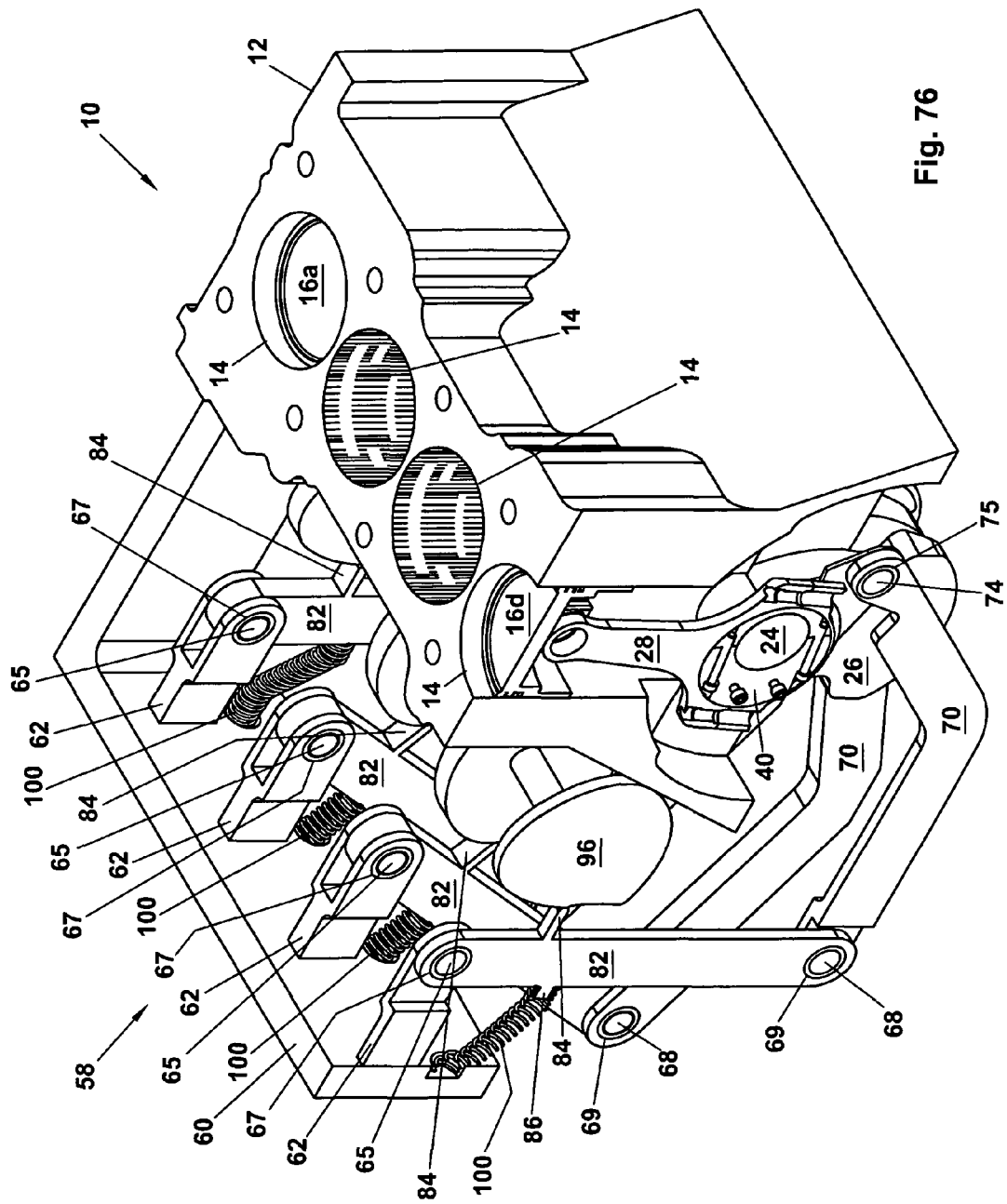
FIG. 76 is a schematic perspective partial section view of the exemplary embodiment shown in FIG. 70.
Figure 77B:
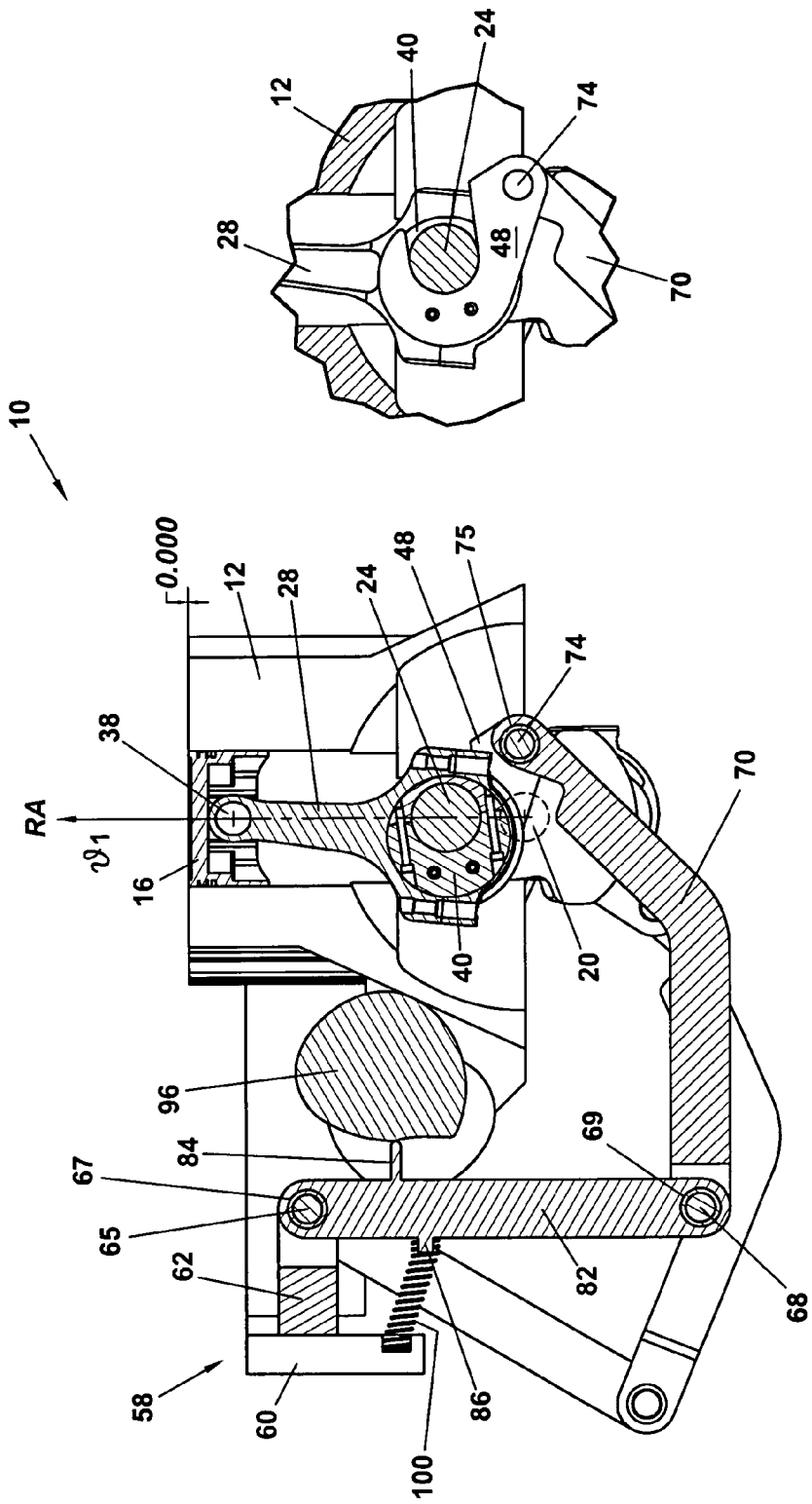
FIG. 77B is a detail view of a portion of FIG. 77A.
Figure 78B:
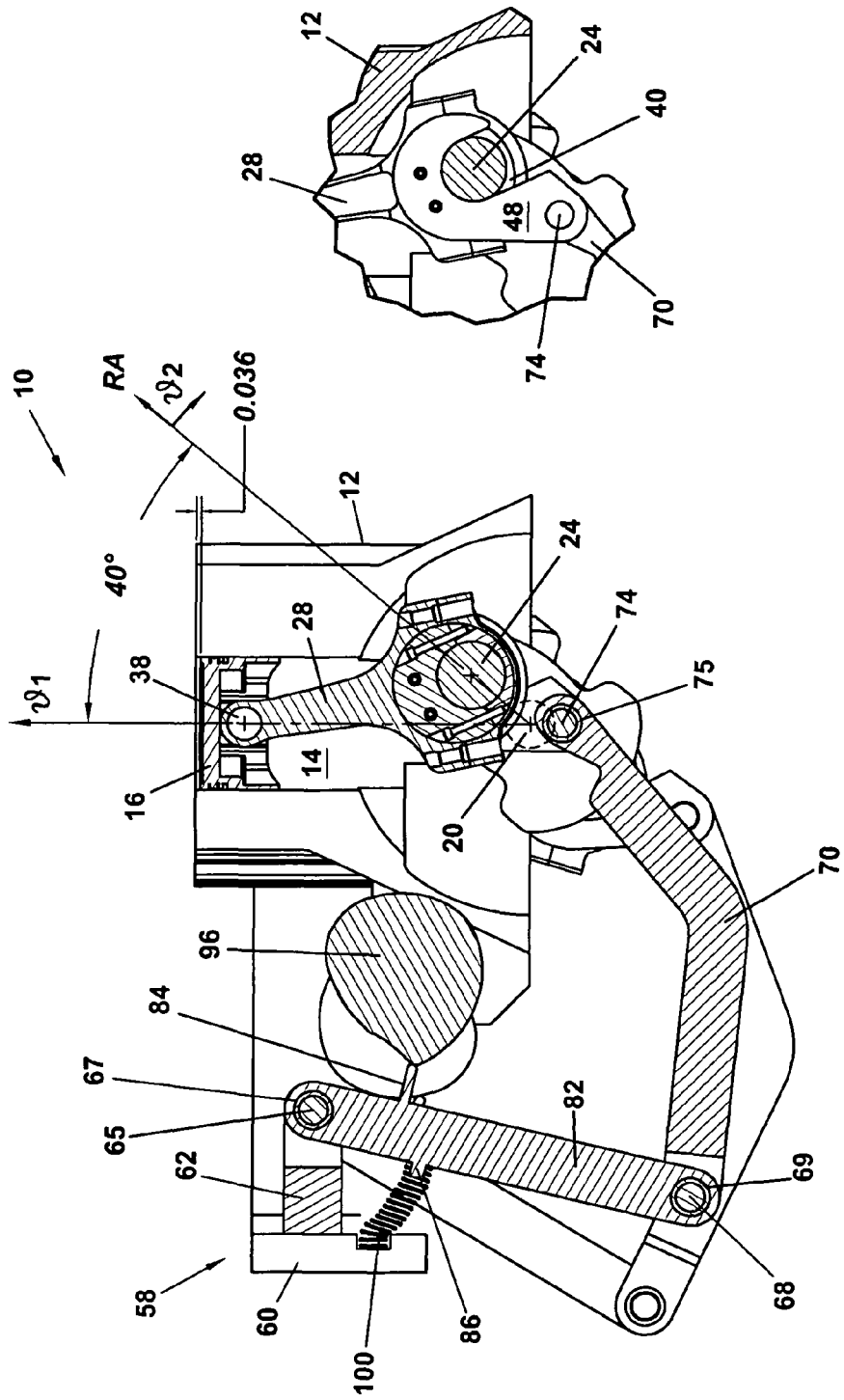
FIG. 78B is a detail view of a portion of FIG. 78A.
Figure 79B:
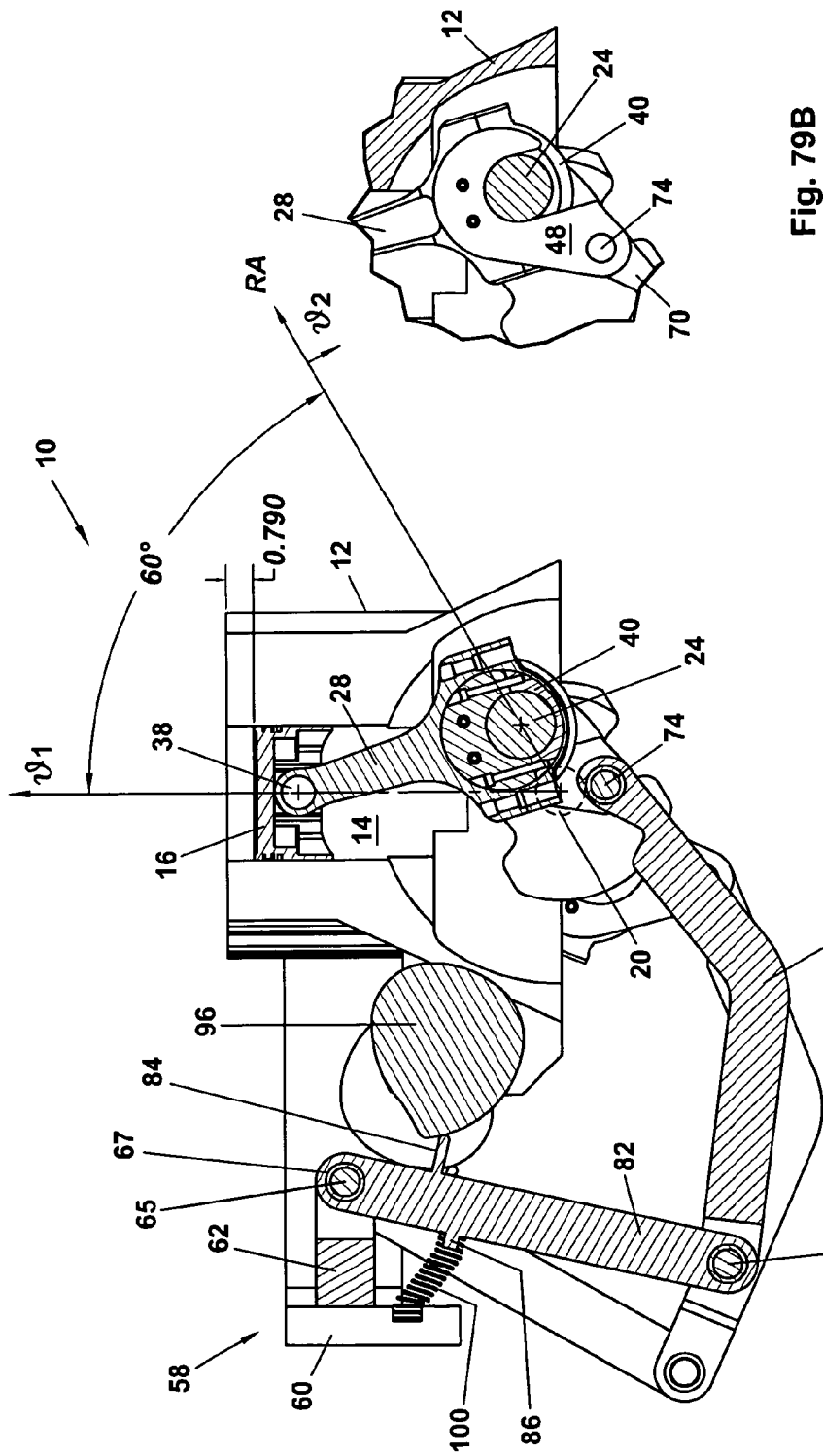
FIG. 79B is a detail view of a portion of FIG. 79A.
Figure 80B:
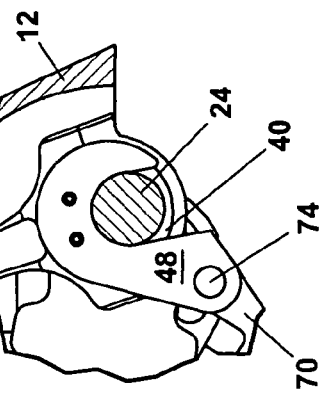
FIG. 80B is a detail view of a portion of FIG. 80A.
Figure 80A:
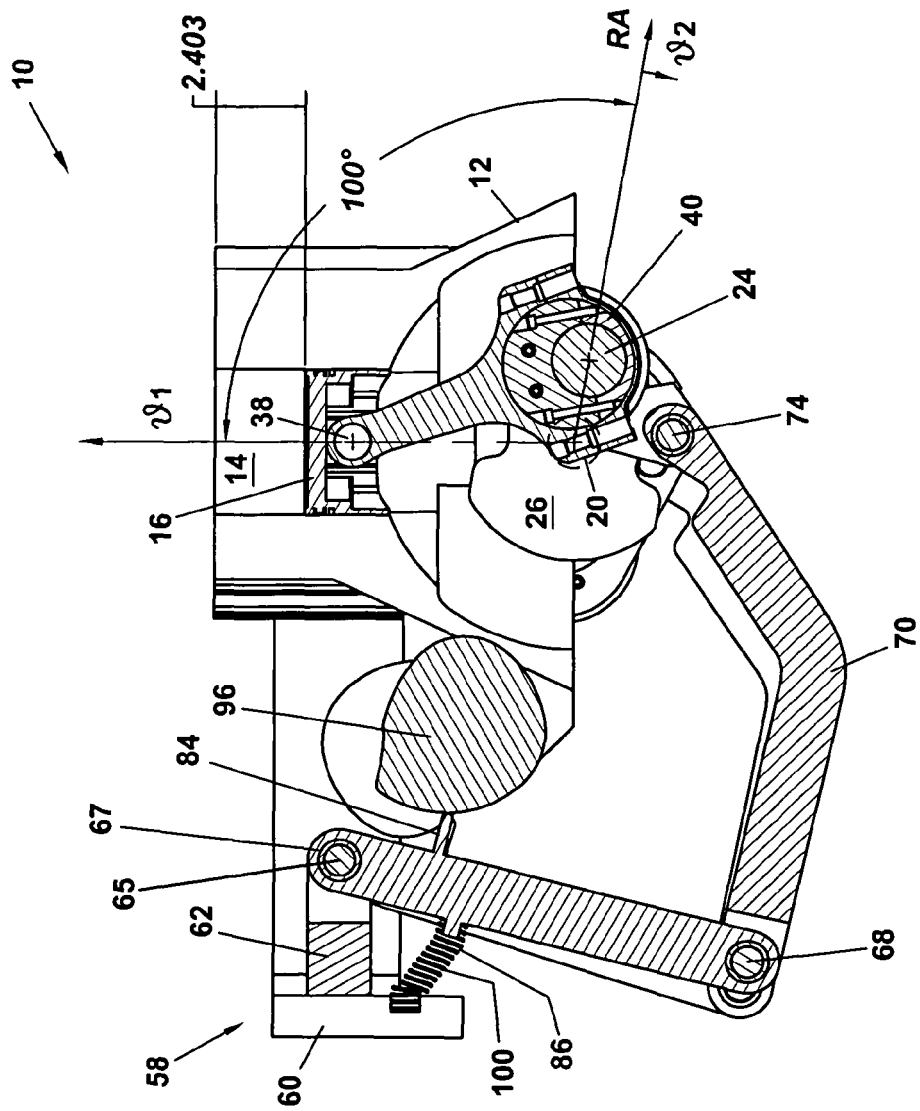
FIG. 80A is a schematic partial section end view of the exemplary embodiment shown in FIG. 70 with the crankshaft at 100 degrees.
Figure 81B:
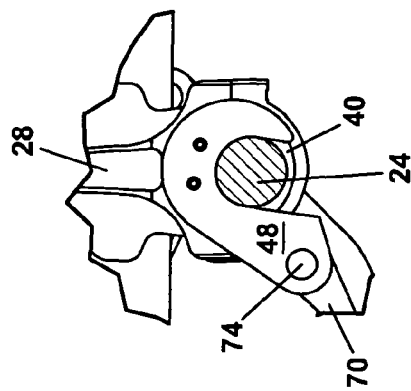
FIG. 81B is a detail view of a portion of FIG. 81A.
Figure 81A:
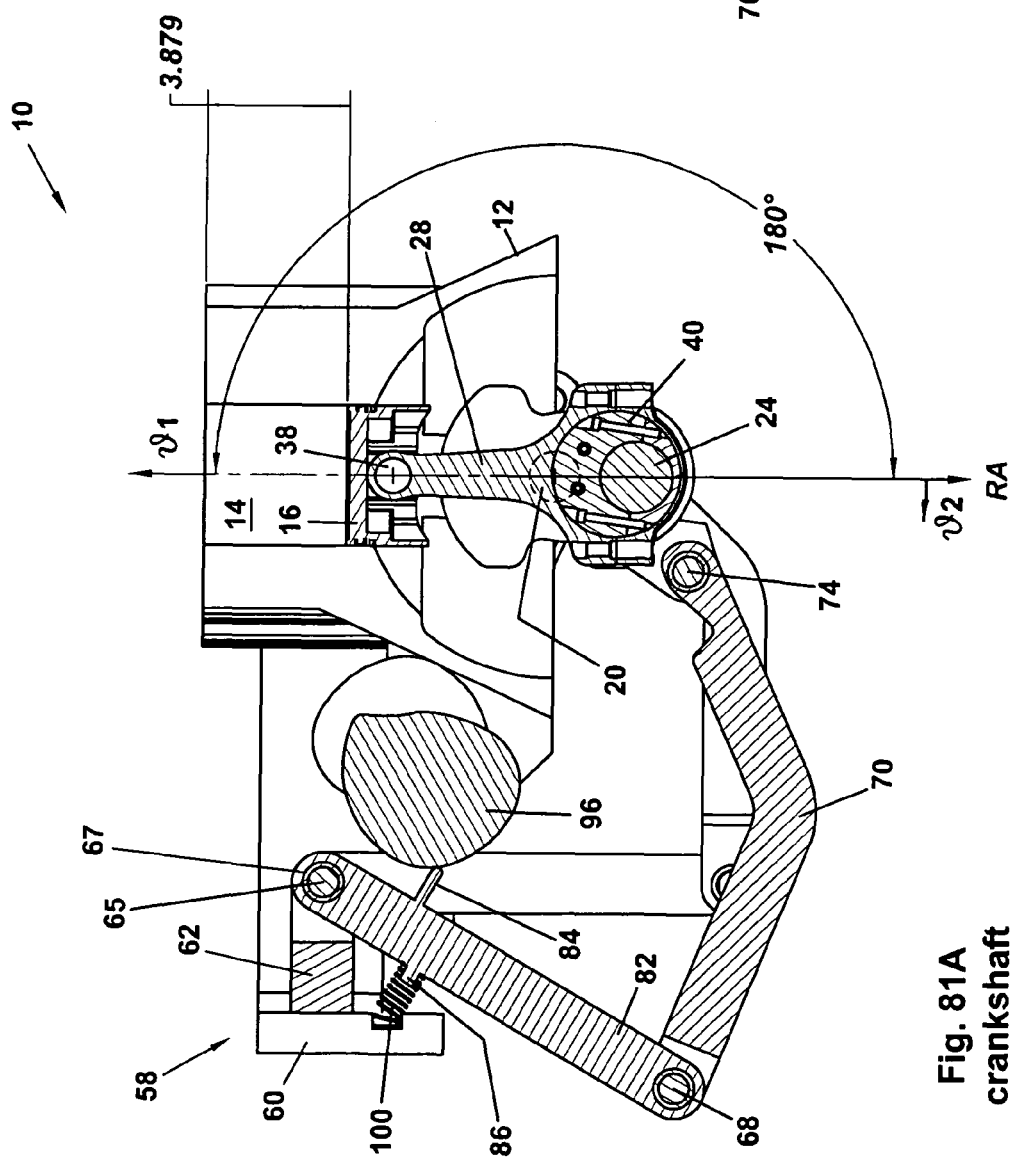
FIG. 81A is a schematic partial section end view of the exemplary embodiment shown in FIG. 70 with the crankshaft at 180 degrees.

In the exemplary embodiment shown in FIGS. 70-81B, sleeves 67 may be provided on respective pins 65, sleeves 69 may be provided on respective bushing control rods 68, and/or sleeves 75 may be provided on respective pins 74 (see FIGS. 76, 77A, and 78A). For example, exemplary sleeves 67, 69, and 75 are positioned respectively between respective pins 65 and links 82, between respective bushing control rods 68 and links 70, and between respective pins 74 and bushing control plates 48. Sleeves 67, 69, and 75 may be formed from, for example, hardened tool steel or a material having similar properties. Sleeves 67, 69, and 75 may be, or may include, roller bearings. Sleeve(s) 67, 69, and/or 75 may serve to reduce friction and/or wear of pins 65, links 82, elongate profiles 52, links 70, pins 74, and/or bushing control rods 68.

Figure 74:
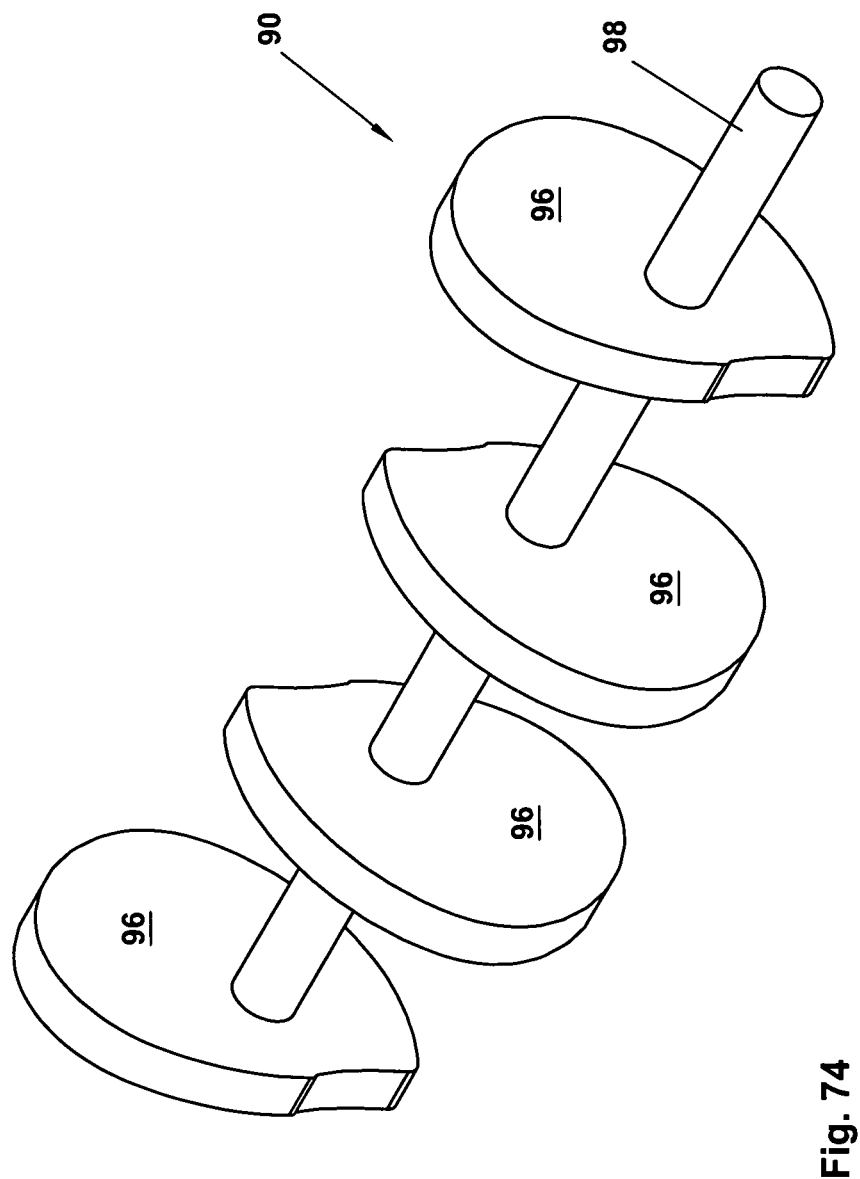
FIG. 74 is a schematic perspective view of an exemplary camshaft.
Figure 75:
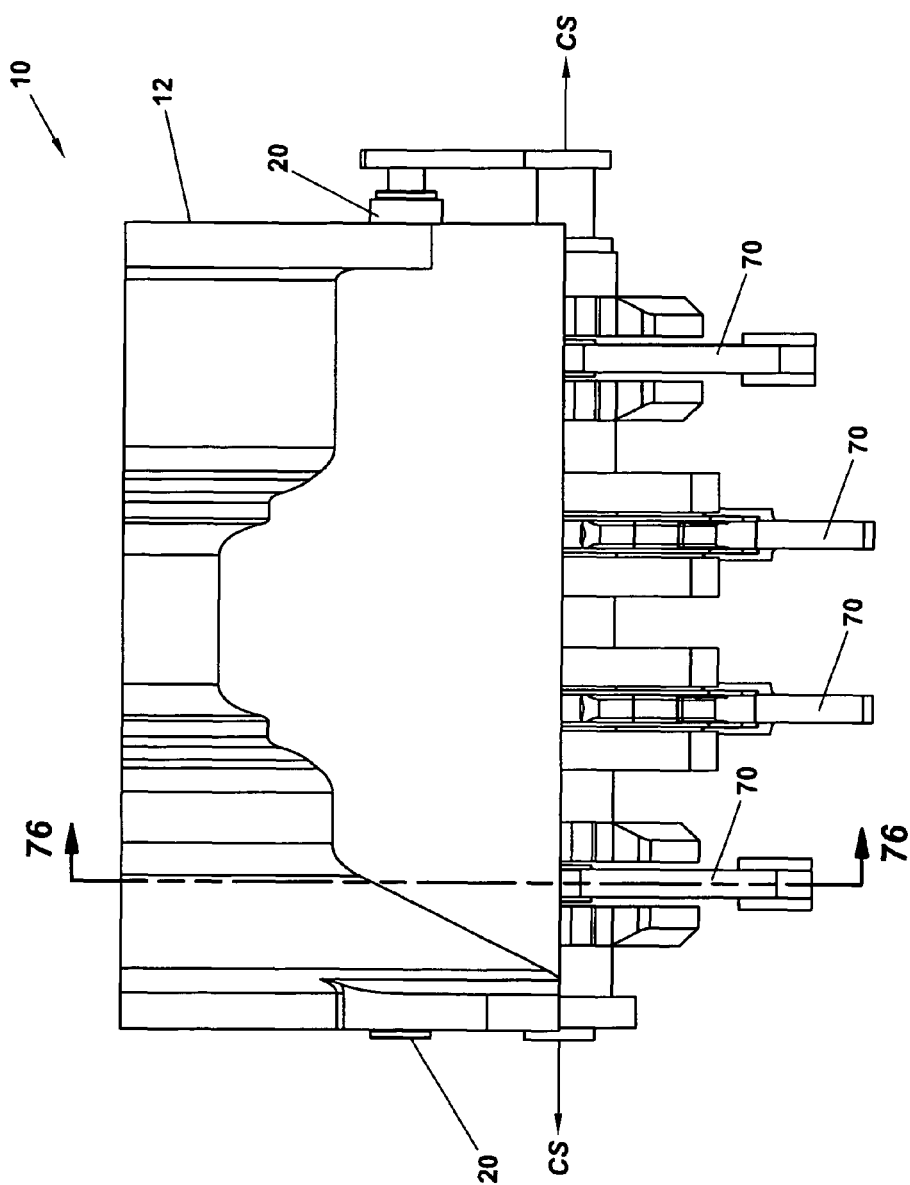
FIG. 75 is a schematic top view of the exemplary embodiment shown in FIG. 70.

Exemplary engine 10 shown in FIGS. 70-81B includes a camshaft assembly 88. Exemplary camshaft assembly 88 includes a camshaft 90 and a cam drive member 92 driven via a drive linkage 94, such as, for example, a belt, chain, or gears, which, in turn, is driven via crankshaft 20. Referring to FIG. 74, camshaft 90 includes a number of profiled cams 96 mounted on a drive shaft 98.

During operation, as crankshaft 20 rotates, drive linkage 94 drives cam drive member 92, which is operably coupled to drive shaft 98, thereby rotating camshaft 90. Fingers 84 of followers 82 ride on respective profiled cams 96 as camshaft 90 rotates, thereby causing followers 82 to pivot with respect to retainers 62. Springs 100 are mounted on respective spring retainers 86 and bias fingers 84 of followers 82 such that they stay in contact with and ride against profiled cams 96 as they rotate. Thus, followers 82 oscillate with respect to retainers 62, such that respective links 70 are driven according to the profile of profiled cams 96. Links 70 are, in turn, coupled to respective bushing control plates 48, thus resulting in control of the movement of bushings 40 within first end apertures 32 of connecting rods 28.

As a result, the effective length LC of connecting rod 28 is altered based on the relative relationship between bushing control plate 48 and connecting rod 28 as crankpin 24 revolves about crankshaft axis CS, as shown in FIGS. 77A-81B. Similar to the exemplary embodiments shown in FIGS. 1-69, selective alteration of the effective connecting rod length LC results in a substantial delay in downward travel of piston 16 at the beginning of the power stroke. For the reasons outlined above, this improves the efficiency and/or power of engine 10. Further, the shape of cam profiles 96 (as well as the structural relationships among followers 82, links 70, and bushing control plates 48) may be tailored to achieve desired performance and efficiency characteristics of engine 10.

At least some portions of exemplary embodiments of the systems outlined above may used in association with portions of other exemplary embodiments. Moreover, at least some of the exemplary embodiments disclosed herein may be used independently from one another and/or in combination with one another and may have applications to internal combustion engines not disclosed herein.

It will be apparent to those skilled in the art that various modifications and variations can be made to the structures and methodologies described herein. Thus, it should be understood that the invention is not limited to the subject matter discussed in the description. Rather, the present invention is intended to cover modifications and variations.

What is claimed is:

1. An internal combustion engine comprising:
    a cylinder block defining a cylinder, the cylinder defining a longitudinal axis;
    a crankshaft defining a crankpin, wherein the crankshaft is rotatably received by the cylinder block and rotates along a longitudinal axis, wherein the crankpin defines a longitudinal axis parallel to and offset by a distance with respect to the longitudinal axis along which the crankshaft rotates, and wherein a line extending between the longitudinal axis along which the crankshaft rotates and the longitudinal axis of the crankpin defines a radial axis of the crankshaft;
    a connecting rod defining a first end, a second end, and a longitudinal axis extending between the first and second ends, wherein the first end of the connecting rod defines an aperture operably coupled to the crankpin;
    a piston operably coupled to the second end of the connecting rod;
    a bushing defining an external circumferential diameter and an aperture defining an internal circumferential diameter, wherein a center defined by the external circumferential diameter and a center defined by the internal circumferential diameter are offset with respect to one another, and wherein the internal circumferential diameter is operably coupled to the crankpin and the external circumferential diameter is operably coupled to the aperture defined by the connecting rod, thereby operably coupling the connecting rod to the crankpin; and
    a bushing control assembly operably coupled to the bushing and configured to control oscillation of the bushing with respect to the aperture of the connecting rod,
    wherein rotation of the crankshaft results in reciprocating movement of the piston via the connecting rod within the cylinder, the reciprocating movement defining:
        a compression stroke terminating when the radial axis of the crankshaft is substantially aligned with the longitudinal axis defined by the cylinder at a first stroke termination angle and the crankpin is located proximate the cylinder with respect to the longitudinal axis defined by the crankshaft, and
        a power stroke terminating when the radial axis of the crankshaft is substantially aligned with the longitudinal axis defined by the cylinder at a second stroke termination angle and the crankpin is located distal from the cylinder with respect to the longitudinal axis defined by the crankshaft,
    wherein the bushing control assembly comprises:
        a bushing control plate defining an elongated profile having a shape, and
        a bushing control rod configured to follow the elongated profile, such that oscillation of the bushing is controlled to delay initiation of the power stroke according to the shape of the elongated profile, and
    wherein the bushing control rod defines a longitudinal axis that extends parallel to the longitudinal axis defined by journals of the crankshaft.

2. The engine of claim 1, wherein the shape of the elongated profile is tailored to improve efficiency of the engine.

3. The engine of claim 1, wherein the shape of the elongated profile is tailored to improve power output of the engine.

4. The engine of claim 1, wherein the elongated profile is defined by an internal cam.

5. The engine of claim 1, wherein the bushing control rod is fixed with respect to the cylinder block.

6. The engine of claim 1, wherein the bushing control rod is movably mounted with respect to the cylinder block.

7. The engine of claim 6, wherein bushing control assembly is configured such that movement of the bushing control rod changes at least one of timing and magnitude of a delay of initiation of the power stroke.

8. The engine of claim 1, wherein the bushing control assembly is configured to delay initiation of the power stroke until the crankshaft has rotated at least about 15 degrees beyond the first stroke termination angle of the compression stroke.

9. The engine of claim 1, wherein the bushing control assembly is configured to delay initiation of the power stroke until the crankshaft has rotated at least about 20 degrees beyond the first stroke termination angle of the compression stroke.

10. The engine of claim 1, wherein the bushing control assembly is configured to delay initiation of the power stroke until the crankshaft has rotated at least about 25 degrees beyond the first stroke termination angle of the compression stroke.

11. The engine of claim 1, wherein the bushing control assembly is configured to delay initiation of the power stroke until the crankshaft has rotated at least about 30 degrees beyond the first stroke termination angle of the compression stroke.

12. The engine of claim 1, wherein the bushing control assembly is configured to delay initiation of the power stroke until the crankshaft has rotated at least about 35 degrees beyond the first stroke termination angle of the compression stroke.

13. The engine of claim 1, wherein the bushing control assembly is configured to delay initiation of the power stroke until the crankshaft has rotated at least about 40 degrees beyond the first stroke termination angle of the compression stroke.

14. The engine of claim 1, wherein the bushing control assembly comprises:
    an internal cam defining the elongated profile having a shape; and
    the bushing control rod defines a cam follower configured to follow the shape of the internal cam.

15. The engine of claim 14, wherein the bushing control plate is operably coupled to the crankpin via the bushing, and the cam follower is operably coupled to the cylinder block.

16. The engine of claim 14, wherein the bushing control assembly is configured to control oscillation of the bushing to delay initiation of the power stroke according to the shape of the internal cam.

17. The engine of claim 1, wherein the elongated profile of the bushing control plate comprises at least one curved portion.

18. An internal combustion engine comprising:
    a cylinder block defining a cylinder, the cylinder defining a longitudinal axis;
    a crankshaft defining a crankpin, wherein the crankshaft is rotatably received by the cylinder block and rotates along a longitudinal axis, wherein the crankpin defines a longitudinal axis parallel to and offset by a distance with respect to the longitudinal axis along which the crankshaft rotates, and wherein a line extending between the longitudinal axis along which the crankshaft rotates and the longitudinal axis of the crankpin defines a radial axis of the crankshaft;

a connecting rod defining a first end, a second end, and a longitudinal axis extending between the first and second ends, wherein the first end of the connecting rod defines an aperture operably coupled to the crankpin;

a piston operably coupled to the second end of the connecting rod;

a bushing defining an external circumferential diameter and an aperture defining an internal circumferential diameter, wherein a center defined by the external circumferential diameter and a center defined by the internal circumferential diameter are offset with respect to one another, and wherein the internal circumferential diameter is operably coupled to the crankpin and the external circumferential diameter is operably coupled to the aperture defined by the connecting rod, thereby operably coupling the connecting rod to the crankpin; and a bushing control assembly operably coupled to the bushing and configured to control oscillation of the bushing with respect to the aperture of the connecting rod, wherein rotation of the crankshaft results in reciprocating movement of the piston via the connecting rod within the cylinder, the reciprocating movement defining:

a compression stroke terminating when the radial axis of the crankshaft is substantially aligned with the longitudinal axis defined by the cylinder at a first stroke termination angle and the crankpin is located proximate the cylinder with respect to the longitudinal axis defined by the crankshaft, and a power stroke terminating when the radial axis of the crankshaft is substantially aligned with the longitudinal axis defined by the cylinder at a second stroke termination angle and the crankpin is located distal from the cylinder with respect to the longitudinal axis defined by the crankshaft, and wherein the bushing control assembly comprises:

a bushing control plate defining an internal cam having a shape, and a bushing control rod defining a cam follower configured to follow the shape of the internal cam, wherein the bushing control plate is operably coupled to the crankpin via the bushing, and the cam follower is operably coupled to the cylinder block, wherein oscillation of the bushing is controlled to delay initiation of the power stroke according to the shape of the internal cam, and wherein the bushing control rod defines a longitudinal axis that extends parallel to the longitudinal axis defined by journals of the crankshaft.

19. The engine of claim 18, wherein the shape of the internal cam is tailored to improve efficiency of the engine.

20. The engine of claim 18, wherein the shape of the internal cam is tailored to improve power output of the engine.

21. The engine of claim 18, wherein the bushing control rod is fixed with respect to the cylinder block.

22. The engine of claim 18, wherein the bushing control rod is movably mounted with respect to the cylinder block.

23. The engine of claim 22, wherein bushing control assembly is configured such that movement of the bushing control rod changes at least one of timing and magnitude of a delay of initiation of the power stroke.

24. The engine of claim 18, wherein the bushing control assembly is configured to delay initiation of the power stroke until the crankshaft has rotated at least about 15 degrees beyond the first stroke termination angle of the compression stroke.

25. The engine of claim 18, wherein the bushing control assembly is configured to delay initiation of the power stroke until the crankshaft has rotated at least about 20 degrees beyond the first stroke termination angle of the compression stroke.

26. The engine of claim 18, wherein the bushing control assembly is configured to delay initiation of the power stroke until the crankshaft has rotated at least about 25 degrees beyond the first stroke termination angle of the compression stroke.

27. The engine of claim 18, wherein the bushing control assembly is configured to delay initiation of the power stroke until the crankshaft has rotated at least about 30 degrees beyond the first stroke termination angle of the compression stroke.

28. The engine of claim 18, wherein the bushing control assembly is configured to delay initiation of the power stroke until the crankshaft has rotated at least about 35 degrees beyond the first stroke termination angle of the compression stroke.

29. The engine of claim 18, wherein the bushing control assembly is configured to delay initiation of the power stroke until the crankshaft has rotated at least about 40 degrees beyond the first stroke termination angle of the compression stroke.

30. The engine of claim 18, wherein the internal cam of the bushing control plate comprises at least one curved portion.

31. An internal combustion engine comprising:

a cylinder block defining a cylinder, the cylinder defining a longitudinal axis;

a crankshaft defining a crankpin, wherein the crankshaft is rotatably received by the cylinder block and rotates along a longitudinal axis, wherein the crankpin defines a longitudinal axis parallel to and offset by a distance with respect to the longitudinal axis along which the crankshaft rotates, and wherein a line extending between the longitudinal axis along which the crankshaft rotates and the longitudinal axis of the crankpin defines a radial axis of the crankshaft;

a connecting rod defining a first end, a second end, and a longitudinal axis extending between the first and second ends, wherein the first end of the connecting rod defines an aperture operably coupled to the crankpin;

a piston operably coupled to the second end of the connecting rod;

a bushing defining an external circumferential diameter and an aperture defining an internal circumferential diameter, wherein a center defined by the external circumferential diameter and a center defined by the internal circumferential diameter are offset with respect to one another, and wherein the internal circumferential diameter is operably coupled to the crankpin and the external circumferential diameter is operably coupled to the aperture defined by the connecting rod, thereby operably coupling the connecting rod to the crankpin; and a bushing control assembly operably coupled to the bushing and configured to control oscillation of the bushing with respect to the aperture of the connecting rod, wherein rotation of the crankshaft results in reciprocating movement of the piston via the connecting rod within the cylinder, the reciprocating movement defining:

a compression stroke terminating when the radial axis of the crankshaft is substantially aligned with the longitudinal axis defined by the cylinder at a first stroke termination angle and the crankpin is located proximate the cylinder with respect to the longitudinal axis defined by the crankshaft, and a power stroke terminating when the radial axis of the crankshaft is substantially aligned with the longitudinal axis defined by the cylinder at a second stroke termination angle and the crankpin is located distal from the cylinder with respect to the longitudinal axis defined by the crankshaft, wherein the bushing control assembly is configured to delay initiation of the power stroke until the crankshaft has rotated at least about 15 degrees beyond the first stroke termination angle of the compression stroke, and wherein the bushing control assembly comprises:
a bushing control plate defining an elongated profile having a shape; and
a bushing control rod configured to follow the shape of the elongated profile,
wherein the bushing control rod defines a longitudinal axis that extends parallel to the longitudinal axis defined by journals of the crankshaft.

32. The engine of claim 31, wherein the bushing control assembly is configured to delay initiation of the power stroke until the crankshaft has rotated at least about 20 degrees beyond the first stroke termination angle of the compression stroke.

33. The engine of claim 31, wherein the bushing control assembly is configured to delay initiation of the power stroke until the crankshaft has rotated at least about 25 degrees beyond the first stroke termination angle of the compression stroke.

34. The engine of claim 31, wherein the bushing control assembly is configured to delay initiation of the power stroke until the crankshaft has rotated at least about 30 degrees beyond the first stroke termination angle of the compression stroke.

35. The engine of claim 31, wherein the bushing control assembly is configured to delay initiation of the power stroke until the crankshaft has rotated at least about 35 degrees beyond the first stroke termination angle of the compression stroke.

36. The engine of claim 31, wherein the bushing control assembly is configured to delay initiation of the power stroke until the crankshaft has rotated at least about 40 degrees beyond the first stroke termination angle of the compression stroke.

37. The engine of claim 31, wherein:
the bushing control rod defines a cam follower configured to follow the elongated profile, such that the bushing control assembly is configured to control oscillation of the bushing to delay initiation of the power stroke according to the shape of the elongated profile.

38. The engine of claim 37, wherein the shape of the elongated profile is tailored to improve efficiency of the engine.

39. The engine of claim 37, wherein the shape of the elongated profile is tailored to improve power output of the engine.

40. The engine of claim 37, wherein the elongated profile is defined by an internal cam.

41. The engine of claim 37, wherein the bushing control rod is fixed with respect to the cylinder block.

42. The engine of claim 37, wherein the bushing control rod is movably mounted with respect to the cylinder block.

43. The engine of claim 42, wherein bushing control assembly is configured such that movement of the bushing control rod changes at least one of timing and magnitude of the delay of initiation of the power stroke.

44. The engine of claim 31, wherein the bushing control plate is operably coupled to the crankpin via the bushing, and the cam follower is operably coupled to the cylinder block.

45. The engine of claim 31, wherein the bushing control assembly is configured to control oscillation of the bushing to delay initiation of the power stroke according to the shape of the elongated profile.

46. A power train comprising:
the engine of any one of claims 1, 18, or 31;
a transmission operably coupled to the engine; and
a drive member configured to perform work, the drive member being operably coupled to the transmission.

47. The power train of claim 46, wherein the drive member comprises a propulsion device.

48. The power train of claim 47, wherein the propulsion device comprises at least one of a wheel and a propeller.

49. The power train of claim 46, further comprising:
a generator configured to convert rotational power into electrical power, the generator being operably coupled to the engine; and
a power storage device configured to store electrical power, the power storage device being operably coupled to the generator,
wherein the transmission comprises an electric motor.

50. A vehicle comprising:
the engine of any one of claim 1, 18, or 31;
a transmission operably coupled to the engine; and
a drive member configured to perform work, the drive member being operably coupled to the transmission.

51. The vehicle of claim 50, wherein the drive member comprises a propulsion device.

52. The vehicle of claim 50, wherein the propulsion device comprises at least one of a wheel and a propeller.

53. The vehicle of claim 50, further comprising:
a generator configured to convert rotational power into electrical power, the generator being operably coupled to the engine; and
a power storage device configured to store electrical power, the power storage device being operably coupled to the generator,
wherein the transmission comprises an electric motor.

54. The vehicle of claim 50, wherein the vehicle comprises one of a car, van, truck, boat, ship, train, and air vehicle.

55. The engine of claim 31, wherein the elongated profile of the bushing control plate comprises at least one curved portion.

* * * * *

UNITED STATES PATENT AND TRADEMARK OFFICE
CERTIFICATE OF CORRECTION

PATENT NO. : 9,341,110 B2  Page 1 of 1
APPLICATION NO. : 12/406417
DATED : May 17, 2016
INVENTOR(S) : Larry C. Wilkins It is certified that error appears in the above-identified patent and that said Letters Patent is hereby corrected as shown below:

In the Claims

Claim 50, col. 28, line 38, "claim 1, 18, or 31;" should read --claims 1, 18, or 31;--.

Signed and Sealed this
Second Day of August, 2016

Michelle K. Lee
*Director of the United States Patent and Trademark Office*